US012602135B2

(12) United States Patent
Lee et al.

(10) Patent No.: US 12,602,135 B2
(45) Date of Patent: Apr. 14, 2026

(54) DISPLAY DEVICE AND PEN TOUCH SYSTEM

(71) Applicant: LG Display Co., Ltd., Seoul (KR)

(72) Inventors: Jae Ho Lee, Paju-si (KR); Jisu Yoon, Paju-si (KR); DongRyul Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 50 days.

(21) Appl. No.: 18/773,441

(22) Filed: Jul. 15, 2024

(65) Prior Publication Data

US 2025/0036239 A1    Jan. 30, 2025

(30) Foreign Application Priority Data

Jul. 28, 2023    (KR) ........................ 10-2023-0099118

(51) Int. Cl.
G06F 3/042 (2006.01)
G06F 3/0354 (2013.01)
*G02B 5/20* (2006.01)

(52) U.S. Cl.
CPC ........ G06F 3/0421 (2013.01); G06F 3/03542 (2013.01); *G02B 5/201* (2013.01)

(58) Field of Classification Search
CPC .. G06F 3/0421; G06F 3/03542; G06F 3/0412; G06F 3/0317; G06F 3/042; G06F 3/04162; G06F 3/03545; G02B 5/201
See application file for complete search history.

(56) References Cited

U.S. PATENT DOCUMENTS

| | | | | |
|---|---|---|---|---|
| 4,806,221 A | * | 2/1989 | Gillery | C23C 14/086 |
| | | | | 204/192.27 |
| 2001/0040645 A1 | * | 11/2001 | Yamazaki | G02F 1/13454 |
| | | | | 349/42 |
| 2009/0268132 A1 | * | 10/2009 | Takama | G06F 3/0421 |
| | | | | 349/116 |
| 2013/0321357 A1 | * | 12/2013 | Yamada | G06F 3/0386 |
| | | | | 345/179 |
| 2014/0145066 A1 | | 5/2014 | Geaghan et al. | |
| 2014/0267191 A1 | * | 9/2014 | Takahara | G06F 3/03545 |
| | | | | 345/179 |
| 2015/0130726 A1 | * | 5/2015 | Min | G06F 3/0443 |
| | | | | 345/173 |

(Continued)

FOREIGN PATENT DOCUMENTS

EP        4216042 A1    7/2023

OTHER PUBLICATIONS

European Patent Office, Extended European Search Report, European Patent Application No. 24189716.4, Jan. 2, 2025, 12 pages.

*Primary Examiner* — Patrick N Edouard
*Assistant Examiner* — Joseph P Fox
(74) *Attorney, Agent, or Firm* — Fenwick & West LLP

(57)        ABSTRACT
A display device including a display panel comprises a transmissive area and a non-transmissive area, the display panel including: a first substrate, a pixel array layer located on the first substrate and including a plurality of subpixels and a plurality of signal lines in the non-transmissive area, and a code pattern layer including a plurality of code points in the non-transmissive area but not the transmissive area and a photoactive material that is responsive to light having a second wavelength that is different from the first wavelength.

20 Claims, 32 Drawing Sheets

10

100        110

(56) References Cited

U.S. PATENT DOCUMENTS

| 2021/0249619 A1* | 8/2021 | Seo | ........................ | H10K 50/11 |
| 2023/0229274 A1* | 7/2023 | Yoo | ..................... | G02F 1/13338 |
| | | | | 345/173 |
| 2023/0266854 A1* | 8/2023 | Yoo | ..................... | G06F 3/03545 |
| | | | | 345/174 |

* cited by examiner

10

100      110

210

DISPLAY DEVICE AND PEN TOUCH SYSTEM

CROSS-REFERENCE TO RELATED APPLICATION

This application claims the priority benefit of Republic of Korea Patent Application No. 10-2023-0099118, filed on Jul. 28, 2023 in the Korean Intellectual Property Office, which is hereby incorporated by reference in its entirety.

TECHNICAL FIELD

The present disclosure generally relates to electronic devices with displays, and more specifically, to a display device and a pen touch system.

BACKGROUND

As the information-oriented society has been developed, various needs for display devices for displaying an image have increased. Various types of display devices, such as liquid crystal display (LCD) devices, organic light emitting diode (OLED) display devices, and the like have been developed and widely used. Display devices may be stand-alone devices or integrate with other devices. Display devices have been applied to various electronic devices such as smart phones, digital cameras, laptop computers, navigation devices, smart televisions and the like.

In addition, in order to provide a more intuitive use environment, display devices have been increasingly provided with a user interface configured to allow a touch input by an object such as a user's body (e.g., a finger), a pen, and the like. Recently, to allow versatility of operation for various applications and more detailed input, development has been progressing on enhanced pen-touch capable display devices.

SUMMARY

One or more embodiments of the present disclosure may provide a display device and a pen touch system that are capable of more accurately sensing a pen touch based on an optical technique.

One or more embodiments of the present disclosure may provide a transparent display device and a pen touch system that are capable of sensing a pen touch based on an optical technique.

One or more embodiments of the present disclosure may provide a transparent display device and a pen touch system that are capable of sensing a pen touch based on an optical technique without deteriorating transparency.

One or more embodiments of the present disclosure may provide a display device and a pen touch system that include a display panel in which a light control structure capable of allowing a pen to sense a touch is integrated.

One or more embodiments of the present disclosure may provide a display device and a pen touch system that include a display panel in which a light control structure configured not to affect light emitting performance for image display is integrated.

One or more embodiments of the present disclosure may provide a display device and a pen touch system that include a display panel in which as a light control structure configured to enable pen touch sensing, a reflection structure and an absorption structure (or a radiation structure) are integrated.

One or more embodiments of the present disclosure may provide a display device and a pen touch system that include a display panel in which a pixel array layer used as a reflection structure is disposed, thereby, enabling pen touch sensing.

In one embodiment, a display device comprises: a display panel configured to display an image, the display panel comprising: a first substrate comprising a transmissive area that allows light having a first wavelength to transmit through the transmissive area and a non-transmissive area that is different from the transmissive area; a pixel array layer in the non-transmissive area, the pixel array layer comprising a plurality of subpixels and a plurality of signal lines; and a code pattern layer including a plurality of code points in the non-transmissive area but not the transmissive area and a photoactive material that is responsive to light having a second wavelength that is different from the first wavelength, wherein the light having the second wavelength is incident on the display device from outside of the display device.

In one embodiment, a pen touching system comprises: a display panel comprising a pixel array layer including a plurality of subpixels that emit light having a first wavelength and a code pattern layer that overlaps the pixel array layer, the code pattern layer including a photoactive material that is responsive to light having a second wavelength that is different from the first wavelength and a plurality of data cell areas that each include a different pattern of code points; and a pen configured to output the light having the second wavelength to the display panel and sense its location according to a pattern of light received from the display panel, the pattern of light received responsive to the light outputted by the pen interacting with the code pattern layer.

According to one or more embodiments of the present disclosure, a display device and a pen touch system may be provided that include a display panel in which a light control structure configured to allow a pen to sense a touch is integrated, and thereby, provide advantages of reducing the thickness of the display device and helping to simplify the assembly process of the display device. Thus, one or more aspects of the present disclosure can help to reduce the weight and optimize the process of the display device.

According to one or more embodiments of the present disclosure, a display device and a pen touch system may be provided that include a display panel including a pixel array layer and having a reflection structure for pen touch sensing using the pixel array layer, and thereby, provide advantages of further helping to reduce the weight of the display device.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1:
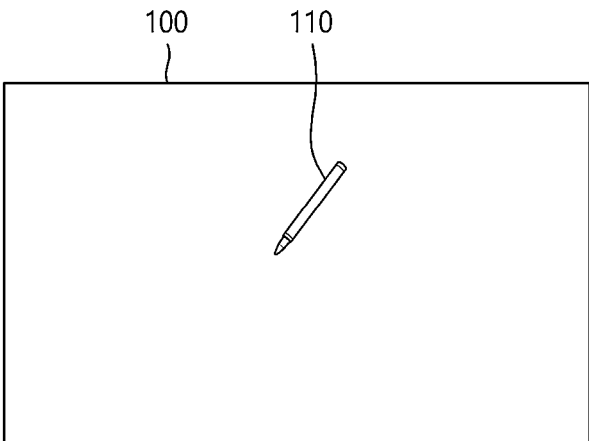
FIG. 1 illustrates an example pen touch system according to embodiments of the present disclosure.

Reference will now be made in detail to example embodiments of the present disclosure, examples of which may be illustrated in the accompanying drawings. In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," "A", "B", "(a)", or "(b)", and the like may be used herein to describe various elements, these elements should not be interpreted to be limited by these terms as they are not used to define a particular order or precedence. These terms are used only to distinguish one element from another; thus, related elements should not be interpreted to be limited by these terms as they are not used to define a particular order or precedence. Further, the expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed" or "interposed" between the elements or layers, unless otherwise specified. Further, the another element may be included in one or more of the two or more elements connected, combined, coupled, or contacted (to) one another.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers "disposed" or "interposed" between the elements or layers, unless otherwise specified.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In describing a temporal relationship, when the temporal order is described as, for example, "after," "subsequent," "next," or "before," a case which is not continuous may be included unless a more limiting term, such as "just," "immediate(ly)," or "direct(ly)," is used.

In construing an element, the element is to be construed as including an error or tolerance range even where no explicit description of such an error or tolerance range is provided. Further, the term "may" fully encompasses all the meanings of the term "can."

The term "at least one" should be understood as including any or all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

The expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

Hereinafter, various example embodiments of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

Hereinafter, various example embodiments of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

FIG. 1 illustrates an example pen touch system 10 according to embodiments of the present disclosure.

Referring to FIG. 1, in one or more example embodiments, the pen touch system 10 can recognize whether a touch is applied by a touch object and/or a location of the touch (or touch coordinates). Thereafter, the pen touch system 10 can obtain touch event information in accordance with the applied touch and/or the touch location, and thereafter, display an image (e.g., a still image or video image) corresponding to the obtained touch event information or the touch location on a screen, or perform an action corresponding to the obtained touch event information or touch location.

Referring to FIG. 1, in one or more example embodiments, the pen touch system 10 may include a display device 100 and a pen 110.

For example, a touch object detectable by the pen touch system 10 may basically include the pen 110 and may further include a finger, and the like. The touch event information may be information indicating that a touch has occurred, or may be information on a touch type such as a tap type (which may be also referred to as a click type), a double click type, a drag and drop type, a touch hold type, and the like.

Referring to FIG. 1, in one or more embodiments, the pen touch system 10 can recognize (or detect or sense) a touch by the pen 110 based on an optical technique. In one or more embodiments, the pen touch system 10 may use light having one or more wavelengths included in a specific wavelength band to perform pen touch sensing based on such an optical technique (hereinafter, which may be referred to as an optical pen touch sensing).

One or more wavelengths of light emitted from light emitting elements for image display may be included in a first wavelength band (e.g., a visible light wavelength band). One or more wavelengths of light used for optical pen touch sensing may be included in a second wavelength band, which is a specific wavelength band. Herein, one or more wavelengths of light emitted from light emitting elements for image display are referred to as a first wavelength, which is included in the first wavelength band. Further, one or more wavelengths of light used for pen touch sensing are referred to as a second wavelength, which is included in the second wavelength band.

The specific wavelength band used for optical pen touch sensing may be different from the first wavelength band (e.g., the visible light wavelength band) that includes one or more wavelengths of light emitted from light emitting elements for image display. Accordingly, the second wavelength included in the second wavelength band, which is the specific wavelength band used for optical pen touch sensing, may be different from the first wavelength included in the first wavelength band (e.g., the visible light wavelength band).

The second wavelength band may be associated with non-visible light. For example, the second wavelength band may be an infrared wavelength band. Light having the second wavelength may be infrared light having one or more wavelengths (the second wavelength) included in the infrared wavelength band (e.g., a wavelength range of approximately 780 nm to 1000 μm). In another example, the second wavelength band may be an ultraviolet wavelength band. Light having the second wavelength may be ultraviolet light having one or more wavelengths (the second wavelength) included in the ultraviolet wavelength band (e.g., a wavelength range of approximately 10 nm to 397 μm). One or more example embodiments of the present disclosure are not limited thereto. For example, the light having the second wavelength may be electromagnetic wave having various wavelengths. Hereinafter, for convenience of explanation, discussions are provided based on examples where the first wavelength band is the visible light wavelength band, the second wavelength band is the infrared wavelength band, the first wavelength is one or more visible light wavelengths, and the second wavelength is one or more infrared wavelengths. Accordingly, it is assumed that light having the first wavelength is visible light (including red light, green light, blue light, and the like), and light having the second wavelength is infrared light.

For example, the infrared wavelength band (e.g., approximately 780 nm to 1000 μm) may be classified into a near-infrared wavelength band (e.g., 750 nm to 3 μm), a mid-infrared wavelength band (e.g., 3 μm to 25 μm), and a far-infrared wavelength band (e.g., 25 μm to 1000 μm). In this example, the second wavelength may be included in the near-infrared wavelength band, or may also be included in the mid-infrared wavelength band or the far-infrared wavelength band. For example, the second wavelength band used for optical pen touch sensing may be the infrared wavelength band (e.g., 780 nm to 1000 μm), or may include one or more of the near-infrared wavelength band (e.g., 750 nm to 3 μm), the mid-infrared wavelength band (e.g., 3 μm to 25 μm), and the far-infrared wavelength band (e.g., 25 μm to 1000 μm).

In one or more embodiments, the pen 110 of the pen touch system 10 can perform a light output function, a light reception function, a touch sensing function, a communication function, and the like.

The pen 110 can output light having the second wavelength as the light output function.

Depending on an inside structure of the display device 100, a part of light having the second wavelength output from the pen 110 may be absorbed or converted to light having one or more other wavelengths at an inside of the display device 100, and the light having the one or more other wavelengths may be radiated to move outside of the display device 100. Further, another part of the light having the second wavelength output from the pen 110 may be reflected at an inside of the display device 100 and redirected to move outside of the display device 100.

As the light reception function, the pen 110 can receive light (hereinafter, which may be referred to as redirected light) that, after having been reflected or converted to light having one or more wavelengths different from the second wavelength at an inside of the display device 100, is redirected to move outside of the display device 100 in the form of light having the second wavelength or the light having the one or more other wavelengths. Further, as the touch sensing function, the pen 110 can sense whether a touch (e.g., a touch input) has been applied and/or a location of the touch (touch coordinates) based on information on a distribution, a shade difference, and/or a wavelength difference of the redirected light detected based on the received redirected light. Herein, after light having the second wavelength is output by the pen 110 to the display device 100, in a situation where the light having the second wavelength is reflected or converted into light having one or more other wavelengths at an inside of the display device 100, and the light having the second wavelength or the light having the one or more other wavelengths is redirected to move outside of the display device 100, the light having the second wavelength or the light having the one or more other wavelengths redirected to move outside of the display device 100 is referred to as redirected light. The redirected light may include at least one of reflected light and radiated light. The reflected light may be, among light having the second wavelength emitted from the pen 110, some light that is reflected at an inside of the display device 100 after being incident on the display device 100, and thereafter, redirected to move outside of the display device 100. The radiated light may be, among light having the second wavelength emitted from the pen 110, some light that is converted to light having one or more other wavelengths at an inside of the display device 100 after being incident on the display device 100, and thereafter, radiated to move outside of the display device 100 in the form of the light having the one or more other wavelengths.

The pen 110 can, as the communication function, communicate with the display device 100 by a predetermined communication method, and transmit sensing data including whether a touch or touch input has been applied and/or a location of the touch to the display device 100. For example, the sensing data may include touch event information and/or touch coordinate data. For example, the touch event information may be information indicating that a touch has occurred, or may be information on a touch type such as a tap type (click type), a double click type, a drag and drop type, a touch hold type, and the like. The touch coordinate data may be information on coordinates of a touch location.

As described above, depending on an inside structure of the display device 100, a part of light having the second wavelength output from the pen 110 may be absorbed or converted to light having one or more other wavelengths at an inside of the display device 100 and then, radiated to move outside of display device 100 in the form of the light having the one or more other wavelengths, and another part of the light having the second wavelength output from the pen 110 may be reflected at an inside of the display device 100 and then, redirected to move outside of display device 100 again.

Hereinafter, in one or more example embodiments, the display device 100 and the pen 110 included in the pen touch system 10 are described in more detail with reference to FIGS. 2, 3A, and 3B.

Figure 2:
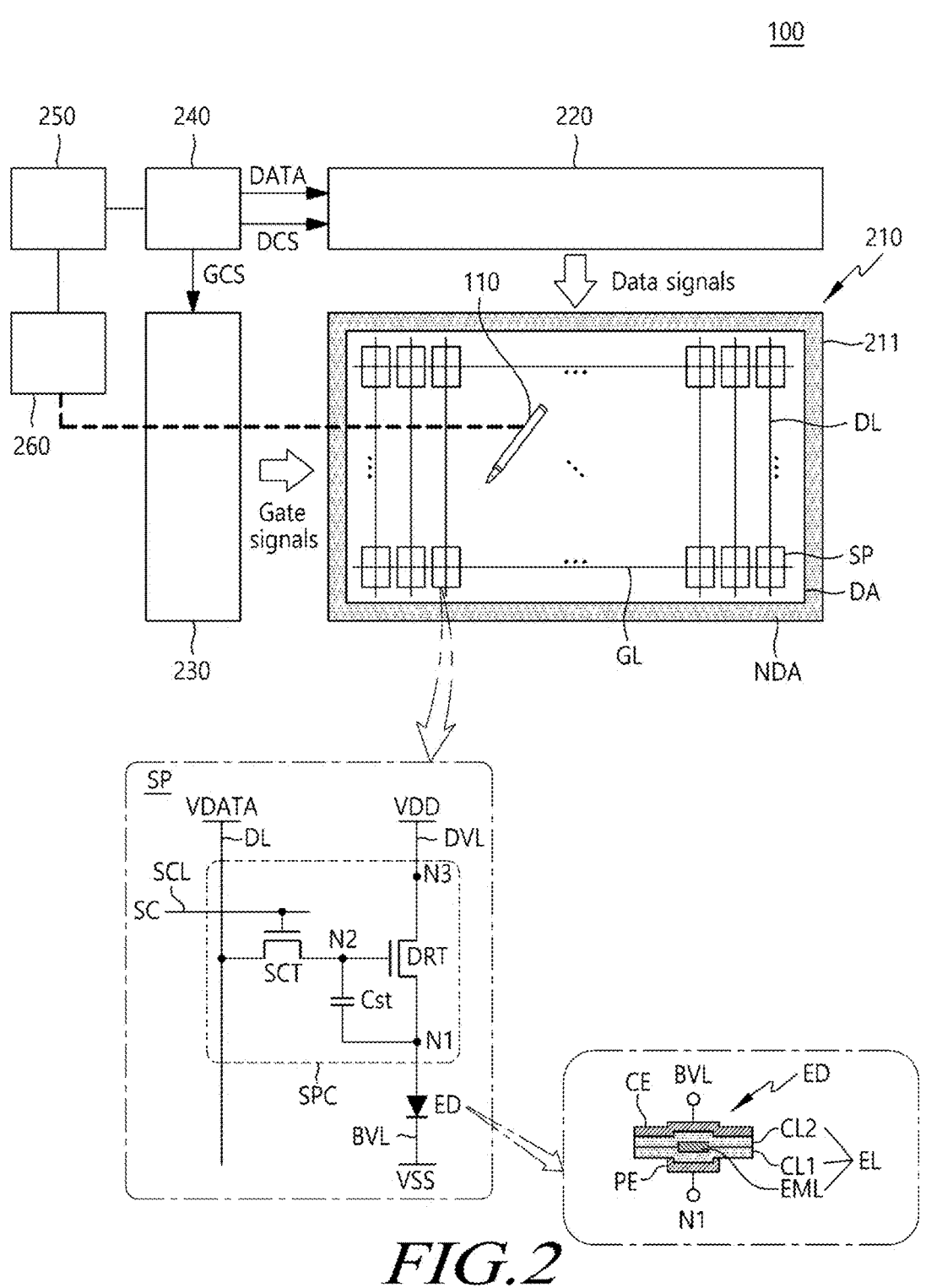
FIG. 2 illustrates an example display device according to embodiments of the present disclosure.

FIG. 2 illustrates an example display device 100 according to embodiments of the present disclosure. FIGS. 3A and 3B illustrate an example pen 110 according to embodiments of the present disclosure.

Referring to FIG. 2, in one or more example embodiments, the display device 100 may include a display panel 210 and a display driving circuit as components for displaying an image. The display driving circuit may be a circuit for driving the display panel 210, and include a data driving circuit 220, a gate driving circuit 230, a controller 240. In one or more aspects, the display driving circuit may further include a host system 250.

The display panel 210 may include a first substrate 211, a plurality of subpixels SP disposed on the first substrate 211, and various types of signal lines disposed on the first substrate 211 and configured to drive the plurality of subpixels SP.

The first substrate 211 may include a display area DA where the plurality of subpixels SP are disposed and a non-display area NDA located outside of the display area DA.

The non-display area NDA may include a pad area to which the data driving circuit 220 is connected. For example, the pad area may be located in a first direction in the display area DA. The first direction may be, for example, a column direction or a row direction.

The non-display area NDA may have a minimal size allowing only the pad area, and the like to be included. In one or more embodiments, the non-display area NDA of the display panel 210 may have a very small area. For example, even when the display panel 210 has the non-display area NDA, a boundary area between the display area DA and the non-display area NDA may be bent, and thereby the non-display area NDA may be located under the display area DA. In this example, when a user views the display device 100 in front thereof, all or most of the non-display area NDA may not be visible to the user.

In one or more embodiments, the display device 100 may be a liquid crystal display device, or the like, or a self-emission display device in which light is emitted from the display panel 210 itself. In an example where the display device 100 is a self-emission display device, each of the plurality of subpixels SP may include a light emitting element ED.

For example, the display device 100 according to embodiments of the present disclosure may be an organic light emitting display device in which the light emitting element ED is implemented using an organic light emitting diode (OLED). In another example, the display device 100 according to aspects of the present disclosure may be an inorganic light emitting display device in which the light emitting element ED is implemented using an inorganic material-based light emitting diode. In further another example, the display device 100 according to aspects of the present disclosure may be a quantum dot display device implemented with quantum dots, which are self-emission semiconductor crystals, as light emitting elements ED.

The structure of each of the plurality of subpixels SP may depend on types of display device 100. For example, when the display device 100 is a self-emission display device including self-emission subpixels SP, each subpixel SP may include a self-emission light emitting element ED and a subpixel circuit SPC configured to drive the light emitting element ED.

The various types of signal lines may include, for example, a plurality of data lines DL for carrying data signals (which may be referred to as data voltages or image signals), a plurality of gate lines GL for carrying gate signals (which may be referred to as scan signals), and the like. The various types of signal lines may further include at least one signal line for delivering a display driving voltage (e.g., a common voltage) different from the data signals and the gate signals.

In one or more embodiments, the plurality of data lines DL and the plurality of gate lines GL may intersect one another. Each of the plurality of data lines DL may be configured to extend in a first direction, and each of the plurality of gate lines GL may be con figured to extend in a second direction. For example, the first direction may be the column or vertical direction, and the second direction may be the row or horizontal direction. In another example, the first direction may be the row or horizontal direction, and the second direction may be the column or vertical direction. Hereinafter, discussions are provided based on examples where the first direction is the column direction and the second direction is the row direction.

The data driving circuit 220 may be a circuit for driving a plurality of data lines DL and can output data signals to the plurality of data lines DL.

The data driving circuit 220 can receive image data DATA in digital form from the controller 240, convert the received image data DATA into data signals in analog form, and output the resulting data signals to the plurality of data lines DL.

In one or more embodiments, the data driving circuit 220 may be connected to the display panel 210 by a tape-automated-bonding (TAB) technique, or connected to a conductive pad such as a bonding pad of the display panel 210 by a chip-on-glass (COG) technique or a chip-on-panel (COP) technique, or connected to the display panel 210 by a chip-on-film (COF) technique.

The data driving circuit 220 may be disposed outside of the display area DA of the display panel 210, or be disposed in the display area DA of the display panel 210.

The gate driving circuit 230 may be a circuit for driving a plurality of gate lines GL and can output gate signals to the plurality of gate lines GL.

The gate driving circuit 230 can receive various types of gate driving control signals GCS, and further, receive a first gate voltage corresponding to a turn-on level voltage and a second gate voltage corresponding to a turn-off level voltage. Thereby, the gate driving circuit 230 can generate gate signals and supply the generated gate signals to the plurality of gate lines GL.

In one or more embodiments, the gate driving circuit 230 included in the display device 100 may be disposed in the non-display area NDA. In one or more embodiments, the gate driving circuit 230 may be configured to overlap with the display area DA of the display panel 210. For example, the gate driving circuit 230 may be disposed throughout the entire display area DA, or may be disposed in at least one partial area (e.g., one or more of both side edges) within the display area DA. In an example where the gate driving circuit 230 is configured to overlap with the display area DA, the gate driving circuit 230 may be configured not to overlap with subpixels SP, or be configured to overlap with one or more, or all, of the subpixels SP.

In one or more embodiments, the gate driving circuit 230 included in the display device 100 may be embedded into the display panel 210 by a gate-in-panel (GIP) technique. In an example where the gate driving circuit 230 is implemented by the gate-in-panel (GIP) technique, the gate driving circuit 230 may be disposed on the first substrate 211 of the display panel 210 during the manufacturing process of the display panel 210 or display device 100.

The controller 240 may be a device configured to receive image data and various display driving control signals from the host system 250, supply image data DATA corresponding to the received image signal to the data driving circuit 220, and control the data driving circuit 220 and the gate driving circuit 230.

The controller 240 can generate at least one data drive control signal DCS for controlling data driving and at least one gate drive control signal GCS for controlling gate driving by using display control signals (e.g., a vertical synchronous signal, a horizontal synchronous signal, a data enable signal, a clock signal, and the like) received from the host system 250.

The controller 240 can control the operation and driving timing of the data driving circuit 220 by supplying the at least one data driving control signal DCS to the data driving circuit 220.

The controller 240 can control the operation and driving timing of the gate driving circuit 230 by supplying the at least one gate driving control signal GCS to the gate driving circuit 230.

The controller 240 can receive image data input from the host system 250 and supply image data DATA readable by the data driving circuit 220 based on the input image data to the data driving circuit 220.

The controller 240 may be implemented in a separate component from the data driving circuit 220, or integrated with the data driving circuit 220, so that the controller 240 and the data driving circuit 220 can be implemented in a single integrated circuit.

The controller 240 may be a timing controller used in the display technology or a control device capable of additionally performing other control functionalities in addition to the function of the timing controller. In one or more aspects, the controller 240 may be one or more other control circuits different from the timing controller, or a circuit or component in the control device. The controller 240 may be implemented using various circuits or electronic components such as an integrated circuit (IC), a field programmable gate array (FPGA), an application specific integrated circuit (ASIC), a processor, and/or the like.

The controller 240 may be mounted on a printed circuit board, a flexible printed circuit, or the like, and may be electrically connected to the data driving circuit 220 and the gate driving circuit 230 through the printed circuit board, the flexible printed circuit, and/or the like.

The controller 240 can transmit signals to, and receive signals from, the data driving circuit 220 via one or more predetermined interfaces. For example, such interfaces may include a low voltage differential signaling (LVDS) interface, an embedded clock point-point interface (EPI), a serial peripheral interface (SPI), and the like.

In one or more embodiments, to provide a touch sensing function, as well as an image display function, the display device 100 may include a touch sensor and a touch sensing circuit.

The touch sensing circuit can detect whether a touch (e.g., a finger touch, or a pen touch) has been applied by a touch object such as a finger, pen 110, or the like or detect a location of the touch by sensing the touch sensor. This touch sensing may be a touch sensing scheme different from optical pen touch sensing.

For example, the touch sensing circuit may include a touch driving circuit configured to drive and sense the touch sensor and generate and output touch sensing data, and a touch controller configured to detect the application of a touch or a touch location using the touch sensing data.

The touch sensor may include a plurality of sensor electrodes. The touch sensor may also be referred to as a touch panel or touch screen panel. The touch sensor may be an external type touch sensor configured to be located outside of the display panel 210 or an internal type touch sensor configured to be located inside of the display panel 210.

The display device 100 may further include a power supply circuit for supplying various types of power to the display driving circuit.

In some embodiments, the display device 100 may be a mobile terminal such as a smart phone, a tablet, or the like, or a monitor, a television (TV), or the like. Such devices may be configured in various types, sizes, and shapes. The display device 100 according to aspects of the present disclosure are not limited thereto, and may include various types, sizes, and shapes configured to display information or images.

Referring to FIG. 2, in an example where the display device 100 according to embodiments of the present disclosure is a self-emission display device, each of the plurality of subpixels SP may include a light emitting element ED and a subpixel circuit SPC for driving the light emitting element ED.

The subpixel circuit SPC may include a plurality of pixel driving transistors and at least one capacitor for driving the light emitting element ED.

The subpixel circuit SPC may be connected to a data line DL, a gate line GL, a first driving voltage line DVL, and a second driving voltage line BVL.

The plurality of pixel driving transistors may include a driving transistor DRT configured to actually drive the light emitting element ED by supplying a driving current to the light emitting element ED, and a scan transistor SCT configured to allow a data signal VDATA to be passed to a second node N2, which is the gate node of the driving transistor DRT.

The at least one capacitor may include a storage capacitor Cst configured to maintain a constant voltage during a display frame or a certain period of the display frame.

To drive one or more subpixels SP, at least one data signal VDATA, which is an image signal, and at least one scan signal SC, which is a gate signal, may be applied to one or more subpixels SP. Further, to drive one or more subpixels SP, common driving voltages including a first driving voltage VDD and a second driving voltage VSS may be applied to the subpixels SP.

The light emitting element ED may include a pixel electrode PE, an element intermediate layer EL, and a common electrode CE. The pixel electrode PE may be an electrode disposed in each subpixel SP, and the common electrode CE may be an electrode commonly disposed in all or some of a plurality of subpixels SP. The element intermediate layer EL may be a layer disposed between the pixel electrode PE and the common electrode CE, and may include an emission layer EML.

In an example where the light emitting element ED is an organic light emitting element such as an organic light emitting diode (OLED), the element intermediate layer EL may include the emission layer EML, a first common layer CL1 between the pixel electrode PE and the emission layer EML, and a second common layer CL2 between the emission layer EML and the common electrode CE. The emission layer EML may be disposed in each subpixel SP, and the first common layer CL1 and the second common layer CL2 may be commonly disposed in all or some of a plurality of subpixels SP. The emission layer EML may be disposed in each light emitting area. The first common layer CL1 and the second common layer CL2 may be disposed in corresponding light emitting areas of all or some of the plurality of subpixels SP, and further extend to a non-light emitting area. Each light emitting element ED may be configured by a portion where a corresponding pixel electrode PE, a corresponding emission layer EML, respective corresponding portions of the first common layer CL1 and the second common layer CL2, and a corresponding portion of the common electrode CE overlap with each other. A corresponding light emitting area may be formed by each light emitting element ED. That is, a corresponding light emitting area of each light emitting element ED may include an area where a corresponding pixel electrode PE, a corresponding element intermediate layer EL, and the common electrode CE overlap with each other.

For example, the pixel electrode PE may be an anode, and the common electrode CE may be a cathode. In another example, the pixel electrode PE may be a cathode, and the common electrode CE may be an anode.

For example, the common electrode CE may be electrically connected to the second driving voltage line BVL. The second driving voltage VSS, which is a type of common driving voltage, may be applied to the common electrode CE through the second driving voltage line BVL. The pixel electrode PE may be electrically connected to one node of a transistor (e.g., a first node N1 of the driving transistor DRT) included in a corresponding subpixel circuit SPC of each subpixel SP.

The driving transistor DRT may be a transistor configured to supply a driving current to the light emitting element ED. The driving transistor DRT may be connected between the first driving voltage line DVL and the light emitting element ED.

The driving transistor DRT may include a first node N1 electrically connected with the light emitting element ED, a second node N2 to which a data signal VDATA is applied, and a third node N3 to which a driving voltage VDD through the first driving voltage line DVL is applied.

In the driving transistor DRT, the second node N2 may be a gate node, the first node N1 may be a source node or a drain node, and the third node N3 may be the drain node or the source node. Hereinafter, for merely convenience of explanation, discussions may be provided based on examples where the first, second, and third nodes (N1, N2, and N3) of the driving transistor DRT are source, gate, and drain nodes, respectively. However, example embodiments of the present disclosure are not limited thereto.

The scan transistor SCT may be a switching transistor for allowing a data signal VDATA, which is an image signal, to be passed to the second node N2, which is the gate node of the driving transistor DT.

The scan transistor SCT can be turned on or turned off by a scan signal SC, which is a type of gate signal, carried by a scan line SCL, which is a type of gate line GL, and control an electrical connection between the second node N2 of the driving transistor DRT and a data line DL. The drain electrode or source electrode of the scan transistor SCT may be electrically connected to the data line DL. The source electrode or drain electrode of the scan transistor SCT may be electrically connected to the second node N2 of the driving transistor DRT. The gate electrode of the scan transistor SCT may be electrically connected to the scan line SCL.

The storage capacitor Cst may be electrically connected between the first node N1 and the second node N2 of the driving transistor DRT. The storage capacitor Cst may include a first capacitor electrode electrically connected to the first node N1 of the driving transistor DRT or corresponding to the first node N1 of the driving transistor DRT, and a second capacitor electrode electrically connected to the second node N2 of the driving transistor DRT or corresponding to the second node N2 of the driving transistor DRT.

Each of the driving transistor DRT and the scan transistor SCT may be an n-type transistor or a p-type transistor.

For example, at least a portion of the subpixel circuit SPC may overlap with at least a portion of the light emitting element ED in the vertical direction. In another example, the subpixel circuit SPC may not overlap the light emitting element ED in the vertical direction.

As shown in FIG. 2, the subpixel circuit SPC may include two transistors (2T: DRT and SCT) and one capacitor (1C: Cst) (which may be referred to as a "2T1C structure"), and in some implementations, may further include one or more transistors, or further include one or more capacitors.

The types and number of gate signals supplied to a subpixel SP, and/or the types and number of gate lines connected to the subpixel SP may vary depending on a structure of a corresponding subpixel circuit SPC. Further, the types and number of common driving voltages supplied to a subpixel SP may vary depending on a structure of a corresponding subpixel circuit SPC.

Since circuit elements (e.g., a light emitting element ED such as an organic light emitting diode (OLED) including an organic material) in each subpixel SP are vulnerable to external moisture or oxygen, an encapsulation layer may be disposed at the display panel 210 to prevent the external moisture or oxygen from penetrating into the circuit elements (e.g., the light emitting element ED). The encapsulation layer may be disposed in various shapes or configurations to prevent light emitting elements ED from contacting moisture or oxygen.

Referring to FIG. 2, in one or more embodiments, the display device 100 may include a communication module 260 (e.g., a circuit) for communicating with the pen 110.

The communication module 260 or communication circuit of the display device 100 can receive sensing data (e.g., touch event information and/or touch coordinate data) from the pen 110. For example, the communication module 260 may include a hardware module and a software module for communication.

Referring to FIG. 2, the host system 250 or the controller 240 can determine a touch location based on the sensing data received by the communication module 260 and perform an operation corresponding to the determined touch location. For example, the host system 250 or the controller 240 can perform operation of selecting an object (e.g., an icon, and the like) displayed at the touch location, and supply, to the controller 240 or the data driving circuit 220, input image data for displaying an image to be presented according to the selection of the object on the display panel 210. In another example, the host system 250 or the controller 240 can perform operation of selecting an object (e.g., an icon, and the like) displayed at the touch location and execute an application corresponding to the selected object.

Figure 3A:
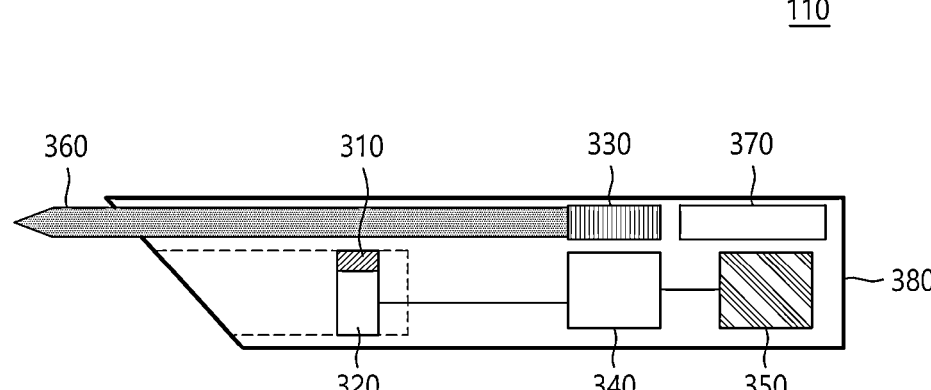
FIGS. 3A and 3B illustrate an example pen according to embodiments of the present disclosure.
Figure 3B:
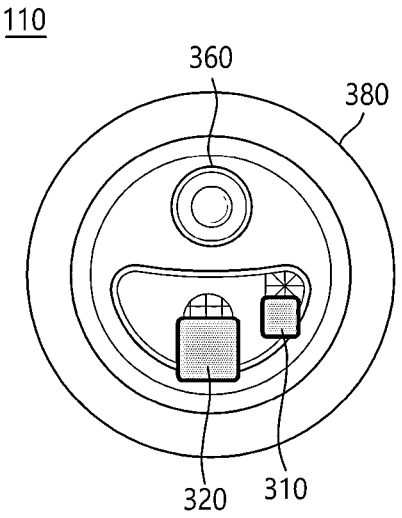

Referring to FIGS. 3A and 3B, in one or more example embodiments, the pen 110 included in the pen touch system 10 may include a light emitting device 310, a light receiving sensor 320, a control processor 340, and a communication device 350, a pen tip 360, and a case 380.

The pen tip 360 may be an element for contacting the display device 100.

The light emitting device 310 can emit light having the second wavelength. For example, the light having the second wavelength may be infrared light. In this example, the light emitting device 310 may include an infrared light emitting diode package.

The light receiving sensor 320 can receive and sense redirected light coming from the display panel 210. The redirected light coming from the display panel 210 may be light that has been reflected at an inside of the display panel 210 among the light having the second wavelength emitted from the light emitting device 310. For example, the light receiving sensor 320 may be implemented with a complementary metal-oxide semiconductor (CMOS). The light receiving sensor 320 may also be referred to as an image sensor or a camera. In an example where the light having the second wavelength emitted from the light emitting device 310 is infrared light, the light receiving sensor 320 (which may also be referred to as an infrared image sensor or an infrared camera) can receive and sense redirected light coming from the display panel 210 and generate an infrared image.

The control processor 340 can control and manage the overall operation and state of the pen 110, and can control the operations of the light emitting device 310, the light receiving sensor 320, and the communication device 350. The control processor 340 can generate sensing data by determining whether a touch has been applied and/or a location of the touch based on a distribution, a shade difference, or a wavelength difference of the redirected light received and sensed by the light receiving sensor 320.

The communication device 350 can communicate with the communication module 260 of the display device 110. The communication device 350 can transmit the sensing data (e.g., touch event information and/or touch coordinate data) generated by the control processor 340 to the communication module 260 of the display device 100. For example, the communication device 350 may include a hardware module and a software module for short-range wireless communication. For example, short-range wireless communication may include Bluetooth, wireless LAN, and the like.

The communication device 350 of the pen 110 and the communication module 260 of the display device 100 can communicate according to a predefined communication protocol.

In one or more embodiments, the pen 110 may further include a pressure sensor 330 for detecting a pressure with which the pen tip 360 presses the display device 100. The pressure sensor 330 may be connected to a portion of the pen tip 360 and can detect a pressure with which the pen tip 360 presses the display device 100.

The case 380 may accommodate the light emitting device 310, the light receiving sensor 320, the pressure sensor 330, the control processor 340, the communication device 350, and the pen tip 360.

In one or more embodiments, the pen 110 may include a power source such as a battery 370 for supplying power to the light emitting device 310, the light receiving sensor 320, the pressure sensor 330, the control processor 340, the communication device 350, and the like. The battery 370 may be a wired or wireless rechargeable battery.

Figure 4:
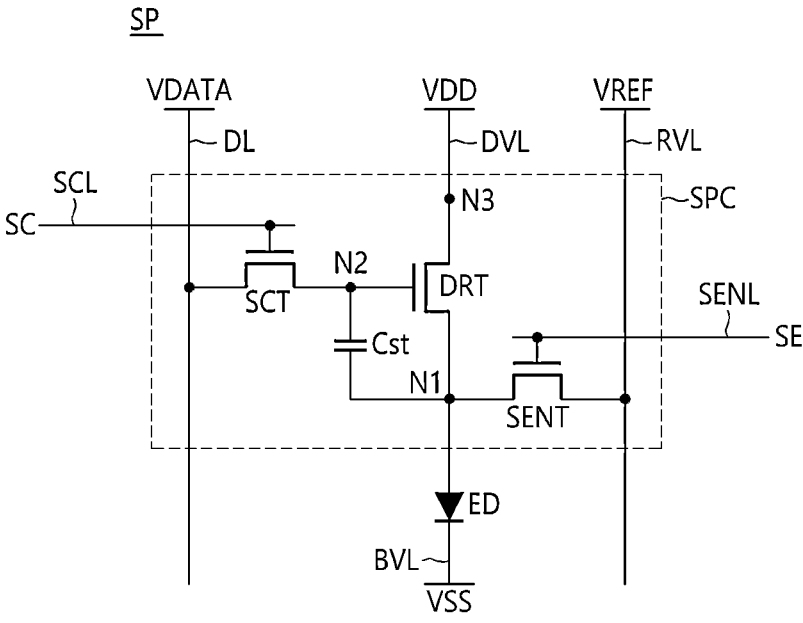
FIG. 4 illustrates an example equivalent circuit of a subpixel included in the display device according to embodiments of the present disclosure.

FIG. 4 illustrates an example equivalent circuit of a subpixel SP included in the display device 100 according to aspects of the present disclosure.

Referring to FIG. 4, each of a plurality of subpixels SP may include a light emitting element ED and a subpixel circuit SPC configured to drive the light emitting element ED. The subpixel circuit SPC of the subpixel SP illustrated in FIG. 4 may further include a sensing transistor SENT compared with the subpixel circuit SPC of the subpixel SP illustrated in FIG. 2. Hereinafter, discussions on the subpixel SP of FIG. 4 are provided by focusing on features different from the subpixel SP of FIG. 2. Thus, discussions on the same features as the subpixel SP of FIG. 2 are omitted for convenience of discussions.

Referring to FIG. 4, the subpixel circuit SPC may be connected to a data line DL, a gate line GL, a first driving voltage line DVL, a second driving voltage line BVL, and a reference voltage line RVL.

A plurality of pixel driving transistors may include a sensing transistor SENT in addition to a driving transistor DRT and a scan transistor SCT.

The sensing transistor SENT may be a transistor for controlling a voltage state of a first node N1 of the driving transistor DRT, and be connected between the first node N1 of the driving transistor DRT and the reference voltage line RVL.

The sensing transistor SENT can be turned on or turned off by a sensing signal SE, which is another type of gate signal, applied through a sensing line SENL, which is another type of gate line GL, and control an electrical connection between the first node N1 of the driving transistor DRT and the reference voltage line RVL through which a reference voltage VREF is delivered.

The drain electrode or source electrode of the sensing transistor SENT may be electrically connected to the reference voltage line RVL. The source electrode or drain electrode of the sensing transistor SENT may be connected to the first node N1 of the driving transistor DRT, and the gate electrode of the sensing transistor SENT may be electrically connected to the sensing line SENL.

Referring to FIG. 4, the scan signal SC may be referred to as a first scan signal, and the sensing signal SE may be referred to as a second scan signal. In this implementation, the scan transistor SCT may be referred to as a first scan transistor, and the sensing transistor SENT may be referred to as a second scan transistor.

Each of the driving transistor DRT, the scan transistor SCT, and the sensing transistor SENT may be an n-type transistor, or a p-type transistor.

In one or more embodiments, each of the plurality of subpixels SP may have a structure different from the structures (i.e., the equivalent circuits) of FIGS. 2 and 4. It should be noted that convenience of explanation, hereinafter, discussions are provided based on examples where each of a plurality of subpixels SP has the structure (i.e., the equivalent circuit) of FIG. 4.

Figure 5:
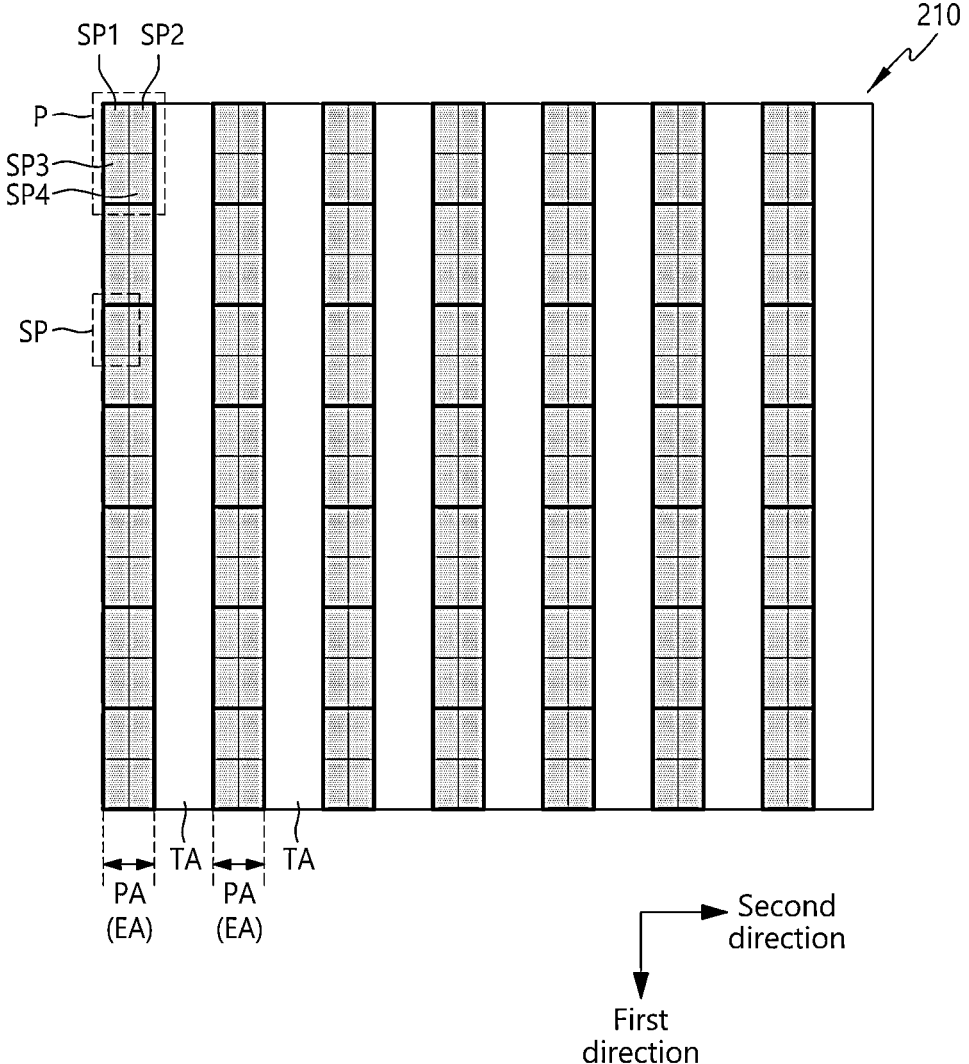
FIG. 5 is an example plan view of a display panel according to embodiments of the present disclosure.

FIG. 5 is an example plan view of the display panel 210 according to embodiments of the present disclosure.

Referring to FIG. 5, in one or more embodiments, the display device 100 may be a transparent display device. In this implementation, the display panel 210 may be a transparent display panel configured to allow light (e.g., light having the first wavelength) to pass through the front (top) and back (bottom) surfaces of the display panel 210.

Referring to FIG. 5, in one or more example embodiments, the display panel 210 may include a plurality of transmissive areas TA configured to allow light (e.g., light having the first wavelength) to pass through the front (top) and back (bottom) surfaces of the display panel 210.

The plurality of transmissive areas TA may be areas allowing light having one or more wavelengths (e.g., the first wavelength discussed above) included in the visible light wavelength band to be transmitted through the transmissive areas TA. By applying this configuration, the back surface or parts situated in the back of the display device 100 can be visible from the front of the display device 100. The plurality of transmissive areas TA may allow not only light having one or more wavelengths in the visible light wavelength band, but also light having one or more wavelengths (e.g., the second wavelength discussed above) included in the second wavelength band (e.g., the infrared wavelength band) to be transmitted through the transmissive area TA. The plurality of transmissive areas TA may also be referred to as transparent areas.

As shown in FIG. 5, for example, the display panel 210 may include a plurality of pixel array areas PA and a plurality of transmissive areas TA. The plurality of pixel array areas PA may also be referred to as non-transmissive areas, and may be areas not allowing light to be transmitted at all through the non-transmissive areas or allowing light to be transmitted with a transmittance lower than the transmissive areas TA. The display area DA of the display panel 210 may include a plurality of pixel array areas PA, which are non-transmissive areas, and a plurality of transmissive areas TA.

For example, as shown in FIG. 5, each of the plurality of pixel array areas PA may be an area where a plurality of subpixels SP are disposed, and be disposed in the first direction. The plurality of pixel array areas PA may be spaced apart from each other in the second direction. A transmissive area TA may be present between two adjacent pixel array areas PA among the plurality of pixel array areas PA.

Referring to FIG. 5, each of the plurality of pixel array areas PA may include a plurality of light emitting areas EA. The plurality of light emitting areas EA may be areas in which light from a plurality of light emitting elements ED included in the plurality of subpixels SP is emitted.

For example, referring to FIG. 5, a plurality of pixels P may be disposed in each of the plurality of pixel array areas PA. Each of the plurality of pixels P may include a first subpixel SP1, a second subpixel SP2, a third subpixel SP3, and a fourth subpixel SP4.

For example, the first subpixel SP1 can emit light of a first color, the second subpixel SP2 can emit light of a second color, the third subpixel SP3 can emit light of a third color, and the fourth subpixel SP1 can emit light of a fourth color. For example, each of the first color light, second color light, third color light, and fourth color light may be one of red light, green light, blue light, and white light.

Referring to FIG. 5, a ratio between a total area of the plurality of pixel array areas PA and a total area of the plurality of transmissive areas TA may be determined in various values depending on desired transparency of the display panel 210.

As described above, in the pen touch system 10 according to one or more example embodiments of the present disclosure, in order for the pen 110 to detect a touch, when light having the second wavelength emitted from the pen 110 is incident on the display panel 210 of the display device 100, a part of the light having the second wavelength may be, at an inside of the display panel 210, absorbed or converted to light having one or more other wavelengths and then be radiated to move outside of the display device 100 in the form of the light having the one or more other wavelengths. Further, another part of the light having the second wavelength may be reflected at an inside of the display panel 210, and then, redirected to move outside of the display device 100.

Accordingly, in one situation, a part of light having the second wavelength may be reflected at a certain point of the display panel 210, the resulting redirected light (the reflected light) being caused to move outside of the display device 100, and another part of the light having the second wavelength may be absorbed at another point of the display panel 210, this leading redirected light (reflected light) not to be produced.

In another situation, a part of light having the second wavelength may be reflected at a certain point of the display panel 210, the resulting redirected light (the reflected light) being caused to move outside of the display device 100, and another part of the light having the second wavelength may be converted to light having one or more other wavelengths at another point of the display panel 210 and radiated in the form of the light having the one or more other wavelengths, the resulting redirected light (the radiated light) being caused to move outside of the display device 100.

In one or more embodiments, the pen 110 can detect a touch location by the pen 110 by sensing a distribution, a shade difference, and/or a wavelength difference of redirected light coming from the display panel 210 or display device 100. For example, the pen 110 can detect a touch location by the pen 110 by sensing a shade difference of reflective light coming from the display panel 210. In another example, the pen 110 can detect a touch location by the pen 110 by sensing a wavelength difference of redirected light (reflective light and radiated light) coming from the display panel 210 or display device 100.

In one or more embodiments, the display panel 210 of the display device 100 may include a light control structure configured to cause a part of light having the second wavelength incident to an inside of the display panel 210 after being output from the pen 110 to be absorbed or radiated, and cause another part thereof to be reflected, thereby, leading the resulting redirected light (i.e., the radiated light and reflected light) to come from the display device 100.

In one or more embodiments, the light control structure included in the display panel 210 of the display device 100 may include a reflection structure configured to reflect light having the second wavelength and an absorption structure configured to absorb the light having the second wavelength.

The reflection structure can reflect light having the second wavelength included in the second wavelength band without changing the wavelength. Redirected light (reflected light) reflected by the reflection structure may be received by the pen 110.

The absorption structure can absorb light having the second wavelength (e.g., infrared light) included in the second wavelength band. The absorption structure absorbing the light having the second wavelength may cause a shade difference in the distribution of redirected light (e.g., the infrared light) received by the pen 110.

The absorption structure may not absorb light having the first wavelength (e.g., visible light) included in the first wavelength band (e.g., the visible light wavelength band) or may absorb a small amount of the light having the first wavelength. For example, the absorption structure can absorb light having the second wavelength included in the second wavelength band (e.g., the infrared wavelength band) not overlapping with the first wavelength band (e.g., the visible light wavelength band).

In one or more embodiments, the display device 100 may include a radiation structure instead of, or in addition to, the absorption structure. The radiation structure may include a structure configured to convert light having the second wavelength into light having one or more wavelengths different from the second wavelength, and thereafter, radiate the light having the one or more different wavelengths. The radiation structure may cause a wavelength difference of redirected light (e.g., infrared light) received by the pen 110 to occur.

For example, one or more other wavelengths converted from the second wavelength by the radiation structure may be included in the second wavelength band (e.g., the infrared wavelength band, or more specifically, the near-infrared wavelength band) including the second wavelength. In another example, one or more other wavelengths converted from the second wavelength by the radiation structure may be included in a wavelength band different from the second wavelength band (e.g., the infrared wavelength band) including the second wavelength.

Hereinafter, a light control structure of the display panel 210 of the display device 100 according to one or more example embodiments of the present disclosure is described.

Figure 6:
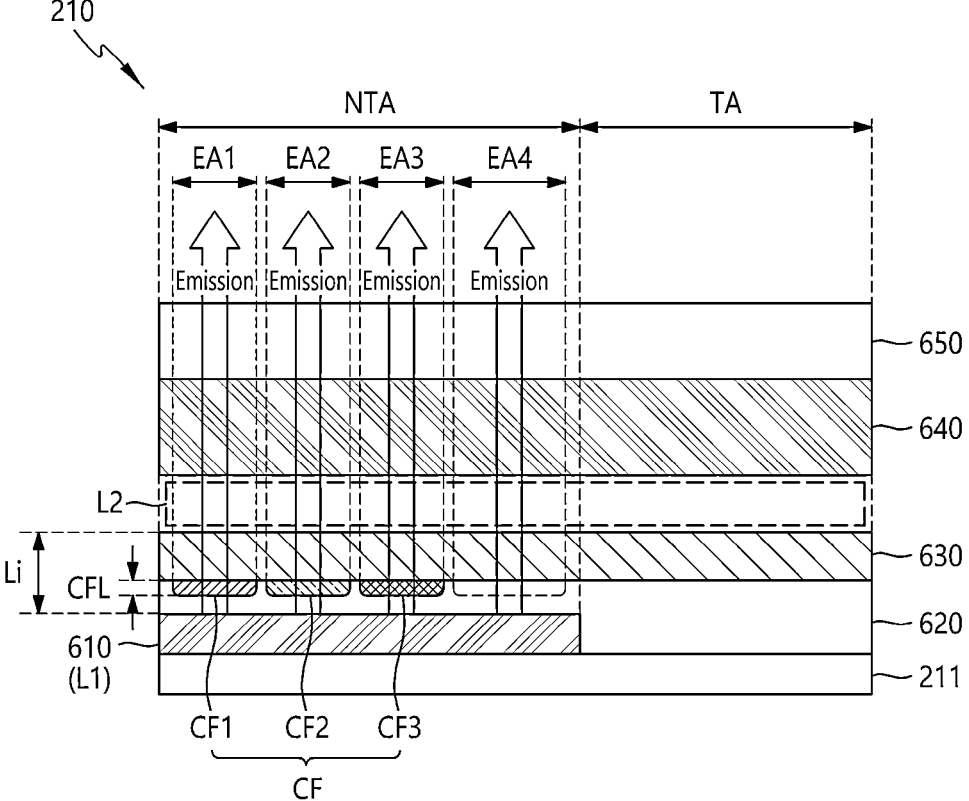
FIG. 6 is an example cross-sectional view of the display panel according to embodiments of the present disclosure.

FIG. 6 is a cross-sectional view of the display panel 210 according to embodiments of the present disclosure.

Referring to FIG. 6, in one or more embodiments, the display panel 210 may include at least one transmissive area TA and at least one non-transmissive area NTA. Herein, the non-transmissive area NTA may correspond to the pixel array area PA of FIG. 5.

Referring to FIG. 6, in one or more embodiments, the display panel 210 may include a first substrate 211, a pixel array layer 610, an insulating layer 620, an encapsulation layer 630, an adhesive layer 640, and a cover window 650.

The pixel array layer 610 may be located on the first substrate 211 and may include a plurality of subpixels SP and a plurality of signal lines disposed in the non-transmissive area NTA. According to this configuration, a plurality of transistors (DRT, SCT, SENT), a plurality of storage capacitors Cst, and a plurality of light emitting elements ED may be disposed in the pixel array layer 610, and the plurality of data lines DL, the plurality of gate lines GL, a plurality of first driving voltage lines DVL, a plurality of second driving voltage lines BVL, and a plurality of reference voltage lines RVL may be disposed in the pixel array layer 610.

Referring to FIG. 6, the insulating layer 620 may be located on the pixel array layer 610 and may be disposed in both the transmissive area TA and the non-transmissive area NTA.

The insulating layer 620 may also be referred to as a filler layer containing a filler material. The insulating layer 620 may have a planarization function.

Referring to FIG. 6, in one or more embodiments, the display panel 210 may further include a color filter layer CFL located over the pixel array layer 610. For example, the color filter layer CFL may be located under the encapsulation layer 630. In another example, the color filter layer CFL may be located on the encapsulation layer 630. The encapsulation layer 630 may be an encapsulation substrate.

Referring to FIG. 6, the pixel array layer 610 and the color filter layer CFL may not be disposed in the transmissive area TA, but may be disposed in the non-transmissive area NTA.

Referring to FIG. 6, the color filter layer CFL may be located between the pixel array layer 610 and a code pattern layer L2 and may include a plurality of color filters CF disposed in the non-transmissive area NTA.

Light emitted from the light emitting element ED may have one or more wavelengths (e.g., the first wavelength) different from the second wavelength.

Light passing through the color filter CF after being emitted from the light emitting element ED may have one or more wavelengths (e.g., the first wavelength) different from the second wavelength.

The plurality of color filters CF may include a first color filter CF1 allowing first color light to be transmitted, a second color filter CF2 allowing second color light to be transmitted, and a third color filter CF3 allowing third color light to be transmitted.

The pixel array layer 610 may include a first subpixel SP1 located under the first color filter CF1, a second subpixel SP2 located under the second color filter CF2, a third subpixel SP3 located under the third color filter CF3, and a fourth subpixel SP4 located under an area where a color filter is not disposed.

As in the example of FIG. 6, the first subpixel SP1 can emit red light, the second subpixel SP2 can emit green light, the third subpixel SP3 can emit blue light, and the fourth subpixel SP4 can emit white light. For example, red light may have a wavelength ranging from approximately 610 nm to 700 nm, green light may have a wavelength ranging from approximately 500 nm to 570 nm, and blue light may have a wavelength ranging from approximately 450 nm to 500 nm. White light may be a combination of all color light, and thus, have all wavelength properties. A first light emitting area EA1 where the first color filter CF1 is disposed may be an area where red light is emitted, a second light emitting area EA2 where the second color filter CF2 is disposed may be an area where green light is emitted, a third light emitting area EA3 where the third color filter CF3 is disposed may be an area where blue light is emitted, and a fourth light emitting area EA4 where the fourth color filter CF4 is disposed may be an area where white light is emitted.

Referring to FIG. 6, in one or more embodiments, the display panel 210 may include a light control structure for pen touch sensing, and the light control structure may include a reflective layer L1 corresponding to a reflection structure and a code pattern layer L2 corresponding to an absorption structure or a radiation structure. In one or more embodiments, the code pattern layer L2 may be a layer in which code patterns for pen touch sensing are formed or a layer for forming code patterns, and may also be referred to as a code pattern configuration layer.

Referring to FIG. 6, the light control structure may further include an intermediate layer Li located between the reflective layer L1 and the code pattern layer L2. As an example, the intermediate layer Li may include the insulating layer 620 and the encapsulation layer 630.

Referring to FIG. 6, in one or more embodiments, the reflective layer L1 included in the display panel 210 may not be a dedicated reflective layer used only for providing a light control structure. For example, the pixel array layer 610 may serve as the reflective layer L1.

Accordingly, since it is not necessary to separately form, in the display panel 210, a reflective layer L1 functioning as a light control structure for pen touch sensing, the thickness of the display panel 210 can be reduced, and the manufacturing process of the display panel 210 can be simplified.

Referring to FIG. 6, since the reflective layer L1 is located under the color filter layer CFL, the plurality of color filters CF disposed in the color filter layer CFL may include a material allowing light having the second wavelength to be transmitted. According to this implementation, light having the second wavelength can be normally reflected in the reflective layer L1, this enabling pen touch sensing to be normally performed.

Referring to FIG. 6, the code pattern layer L2 may be a layer including a photoactive material that is responsive to light having the second wavelength.

For example, the code pattern layer L2 may be located on the encapsulation layer 630. In another example, the code pattern layer L2 may be disposed between the pixel array layer 610 and the encapsulation layer 630.

In the code pattern layer L2, the photoactive material that is responsive to light having the second wavelength may not be disposed in the entire area of the code pattern layer L2. For example, the photoactive material included in the code pattern layer L2 may be disposed only at a plurality of code points, disposed at points except for the plurality of code points, or disposed such that the photoactive material disposed at the plurality of code points is thinner than the photoactive material disposed at other points except for the plurality of code points. The plurality of code points may be located in the non-transmissive area NTA.

Accordingly, in the code pattern layer L2, the transmittance or absorption rate of light having the second wavelength incident from outside of the display device 100 may be different for each location in the non-transmissive area NTA.

At a point where the photoactive material is present in the code pattern layer L2, light having the second wavelength incident on the display panel 210 may be absorbed by the photoactive material, or converted to light having one or more other wavelengths and then radiated in the form of the light having the one or more other wavelengths.

At a point where the photoactive material is not present in the code pattern layer L2, the light having the second wavelength incident on the display panel 210 may enter the code pattern layer L2 without being responded by the photoactive material of the code pattern layer L2, and then, be reflected in the pixel array layer 610.

Such redirected light (i.e., the radiated light or the reflected light) may be caused to move outside of the display panel 210. The redirected light coming from the display panel 210 may be received by the pen 110.

Referring to FIG. 6, in one or more embodiments, the display panel 210 may have a top emission structure in which the cover window 650 located at an opposite side of the first substrate 211 serves as the viewing surface.

In an example where the display panel 210 has the top emission structure, the code pattern layer L2 may be located on the pixel array layer 610, and at least a portion of a subpixel circuit SPC may overlap with a light emitting element ED.

In the example where the display panel 210 has the top emission structure, among a first electrode (e.g., a pixel electrode PE) and a second electrode (e.g., a common electrode CE) included in the light emitting element ED, the first electrode (the pixel electrode PE) close to the first substrate 211 may be a reflective electrode, and the second electrode (the common electrode CE) farther away from the first substrate 211 than the first electrode (the pixel electrode PE) may be a transparent electrode.

In the example where the display panel 210 has the top emission structure, it is desirable for visible light emitted from a light emitting element ED not to be absorbed by the photoactive material disposed in the code pattern layer L2.

Accordingly, the photoactive material disposed in the code pattern layer L2 may have a property of transmitting visible light emitted from light emitting elements ED.

According to this configuration, even when the photoactive material overlaps with one or more light emitting elements ED or one or more color filters CF, light (e.g., visible light) emitted from one or more light emitting elements ED or light (e.g., visible light) passing through one or more color filters CF after being emitted from one or more light emitting elements ED can pass through the photoactive material, and normally come from display panel 210. As a result, the display panel 210 can display images normally.

Figure 7:
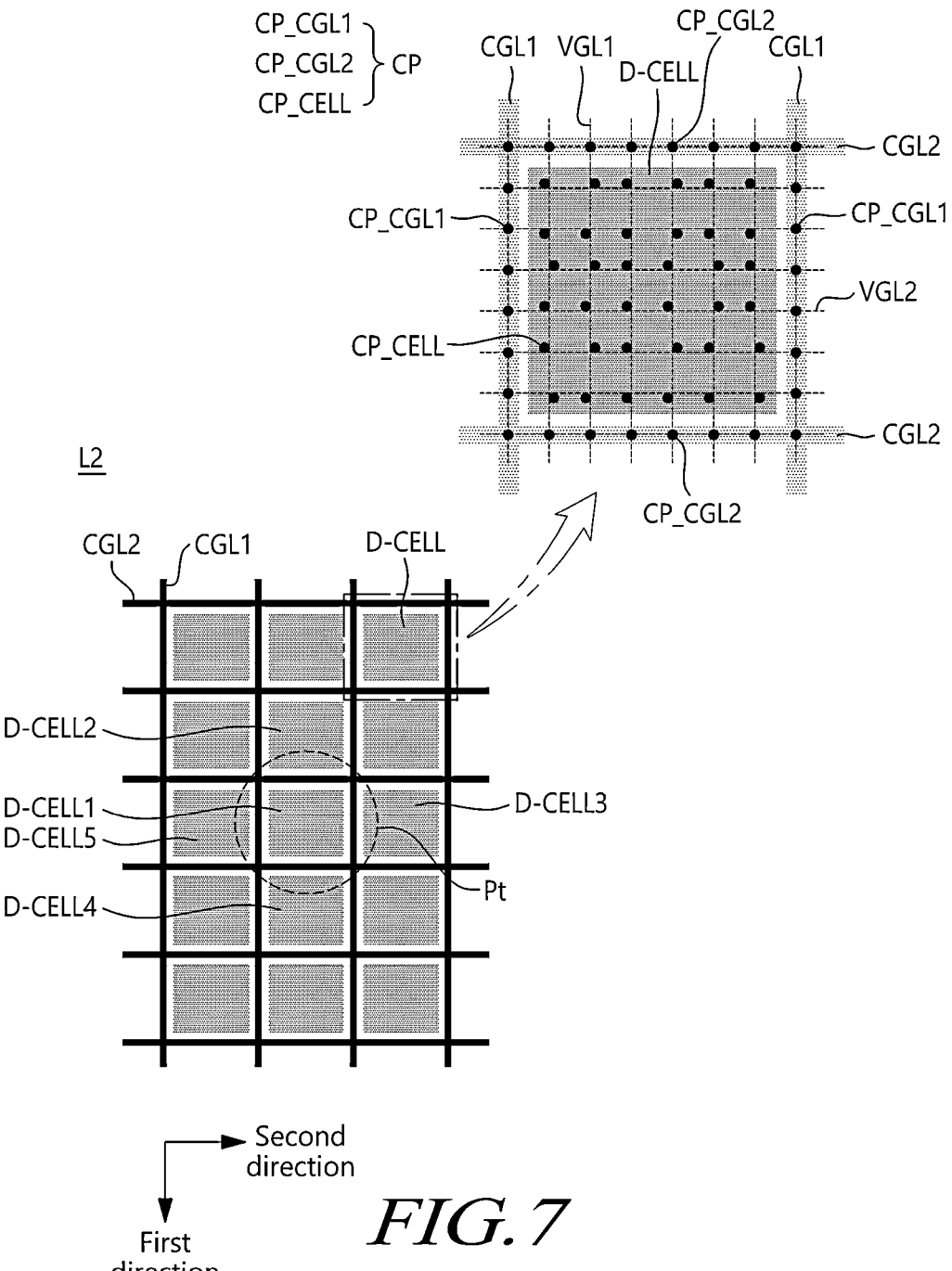
FIG. 7 illustrates an example configuration of code patterns in the display panel according to embodiments of the present disclosure.

FIG. 7 illustrates an example configuration of code patterns in the display panel 210 according to embodiments of the present disclosure.

Referring to FIGS. 6 and 7, the code pattern layer L2 may include a plurality of data cell areas D-CELL arranged in rows and columns, a plurality of first cell guide lines CGL1, each of which is disposed between adjacent data cell areas D-CELL in the second direction, and a plurality of second cell guide lines CGL2, each of which is disposed between adjacent data cell areas D-CELL in the first direction.

Each of the plurality of first cell guide lines CGL1 may extend in the first direction, and each of the plurality of second cell guide lines CGL2 may extend in the second direction.

Referring to FIG. 7, a plurality of code patterns CP may include a plurality of first guide code patterns CP_CGL1 for representing each of the plurality of first cell guide lines CGL1, a plurality of second guide code patterns CP_CGL2 for representing each of the plurality of second cell guide lines CGL2, and a plurality of data code patterns CP_CELL are disposed in each of the plurality of data cell areas D-CELL and arranged in rows and columns.

Referring to FIG. 7, a pattern in which the plurality of data code patterns CP_CELL are arranged may be different for each of the plurality of data cell areas D-CELL.

The plurality of data code patterns CP_CELL included in each of the plurality of data cell areas D-CELL may be arranged in a matrix pattern of m rows and n columns.

In each of the plurality of data cell areas D-CELL, the plurality of data code patterns CP_CELL may be arranged along virtual grid lines (VGL1, VGL2) in m rows and n columns.

Each of the plurality of data cell areas D-CELL may correspond to one coordinate data. A pattern of locations where the plurality of data code patterns CP_CELL included in each of the plurality of data cell areas D-CELL are respectively disposed may represent one coordinate data. According to this configuration, the plurality of data code patterns CP_CELL are arranged in m rows and n columns in each of the plurality of data cell areas D-CELL, but at least one or more of locations where the plurality of data code patterns CP_CELL are respectively disposed may be slightly different for each of the plurality of data cell areas D-CELL.

The plurality of data code patterns CP_CELL included in each of the plurality of data cell areas D-CELL may have a unique arrangement shape (which may be also referred to as a unique disposition location pattern) corresponding to a unique coordinate pair. That is the arrangement of the data code patterns CP_CELL of each data cell area D-CELL is unique to the data cell and signifies coordinates for the data cell area D-CELL.

A unique disposition location pattern of the plurality of data code patterns CP_CELL included in each of the plurality of data cell areas D-CELL may be an encrypted pattern representing a unique coordinate pair.

Referring to the example of FIG. 7, each of the plurality of data cell areas D-CELL may have, as a corresponding unique pattern, 36 data code patterns CP_CELL arranged in 6 rows and 6 columns to represent a unique coordinate pair using codes.

A first data cell area D-CELL1 may include 36 data code patterns CP_CELL to represent first coordinates. A second data cell area D-CELL2 may include 36 data code patterns CP_CELL to represent second coordinates. A third data cell area D-CELL3 may include 36 data code patterns CP_CELL to represent third coordinates. A fourth data cell area D-CELL4 may include 36 data code patterns CP_CELL to represent fourth coordinates. A fifth data cell area D-CELL5 may include 36 data code patterns CP_CELL to represent fifth coordinates.

A disposition location pattern of the 36 data code patterns CP_CELL included in the first data cell area D-CELL1 may be an encrypted pattern indicating first coordinates.

A disposition location pattern of the 36 data code patterns CP_CELL included in the second data cell area D-CELL2 may be an encrypted pattern indicating second coordinates.

A disposition location pattern of the 36 data code patterns CP_CELL included in the third data cell area D-CELL3 may be an encrypted pattern indicating third coordinate.

A disposition location pattern of the 36 data code patterns CP_CELL included in the fourth data cell area D-CELL4 may be an encrypted pattern indicating fourth coordinates.

A disposition location pattern of the 36 data code patterns CP_CELL included in the fifth data cell area D-CELL5 may be an encrypted pattern indicating fifth coordinates.

For example, the first coordinates corresponding to the first data cell area D-CELL1, the second coordinates corresponding to the second data cell area D-CELL2, the third coordinates corresponding to the third data cell area D-CELL3, the fourth coordinate corresponding to the fourth data cell area D-CELL4, and the fifth coordinate corresponding to the fifth data cell area D-CELL5 may be different from each other. Accordingly, the disposition location pattern of the 36 data code patterns CP_CELL included in the first data cell area D-CELL1, the disposition location pattern of the 36 data code patterns CP_CELL included in the second data cell area D-CELL2, the disposition location pattern of the 36 data code patterns CP_CELL included in the third data cell area D-CELL3, the disposition location pattern of the 36 data code patterns CP_CELL included in the fourth data cell area D-CELL4, and the disposition location pattern of the 36 data code patterns CP_CELL included in the 5th data cell area D-CELL5 may be different from each other.

Each of the plurality of data cell areas D-CELL may correspond to a corresponding portion of the display area DA. Each data cell area D-CELL may overlap with a group of two or more subpixels among a plurality of subpixels included in the display area DA. For example, the first data cell area D-CELL1 may overlap with a first group including two or more first subpixels, and the second data cell area D-CELL2 may overlap with a second group of two or more second subpixels. The two or more first subpixels included in the first group and the two or more second subpixels included in the second group may be different from each other.

The pen 110 can recognize a plurality of code patterns CP based on redirected light, recognize a plurality of first cell guide lines CGL1 and a plurality of second cell guide lines CGL2 based on the result of the recognizing, and recognize a plurality of data cell areas D-CELL partitioned by the plurality of first cell guide lines CGL1 and the plurality of second cell guide lines CGL2.

The pen 110 can recognize a disposition location pattern of a plurality of data code patterns CP_CELL included in at least one of the plurality of data cell areas D-CELL, and determine a location of the pen 110 (i.e., a touch location) based on the result of the recognizing.

Referring to FIG. 7, for example, when the pen 110 touches a location Pt at which the first data cell area D-CELL1 is centered, the pen 110 can recognize a corresponding disposition location pattern of a plurality of data code patterns CP_CELL included in each of the first to fifth data cell areas (D-CELL1 to D-CELL5) based on results obtained by sensing redirected light with shade differences or wavelength differences, and calculate a more precise touch location based on the first to fifth coordinates corresponding to the first to fifth data cell areas (D-CELL1 to D-CELL5) and differences in signal intensity of the redirected light.

Hereinafter, a method of forming code patterns CP in the display panel 210 will be described in more detail.

Figure 8:
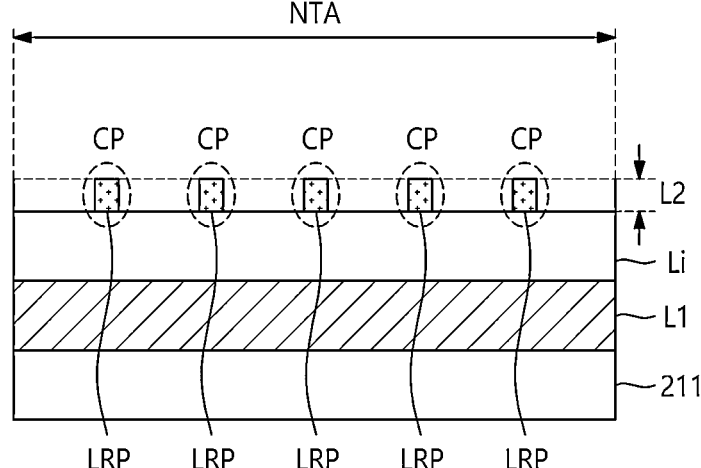
FIGS. 8 to 10 are example cross-sectional views of a non-transmissive area of the display panel according to embodiments of the present disclosure.
Figure 9:
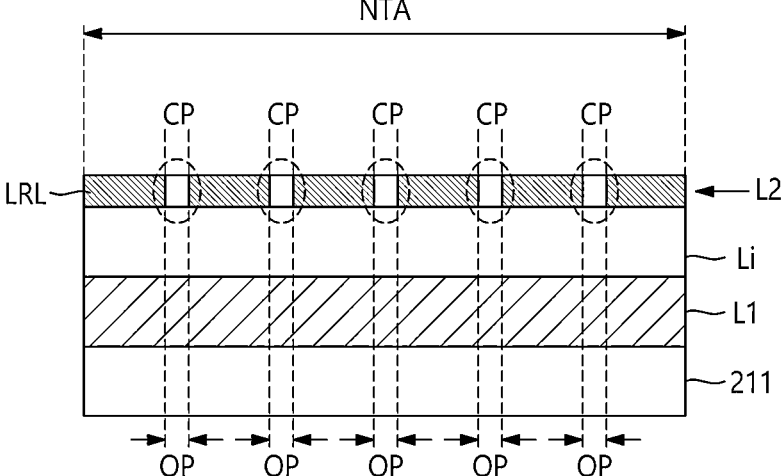
Figure 10:
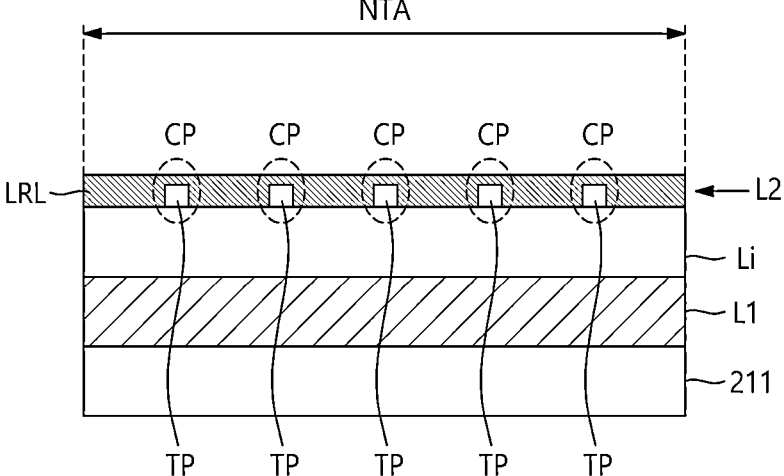

FIGS. 8 to 10 are example cross-sectional views of a non-transmissive area of the display panel 210 according to embodiments of the present disclosure.

Referring to FIGS. 8 to 10, in one or more example embodiments, the display panel 210 may include, as a light control structure for pen touch sensing, a reflective layer L1, which is a reflection structure, and a code pattern layer L2, which is an absorption structure or a radiation structure.

The reflective layer L1 may be located on a first substrate 211.

The code pattern layer L2 may be located over the reflective layer L1.

The code pattern layer L2 may be located closer to the viewing surface and a pen 110 than the reflective layer L1.

An intermediate layer Li may located between the reflective layer L1 and the code pattern layer L2.

Referring to FIG. 8, the code pattern layer L2 may include a photoactive material, and include a plurality of photoactive patterns LRP spaced apart from each other.

The plurality of photoactive patterns LRP may be located in the non-transmissive area NTA, and correspond to a plurality of code patterns CP.

The plurality of photoactive patterns LRP may be disposed at a plurality of code points in the non-transmissive area NTA, and correspond to the plurality of code patterns CP, respectively. Points where the plurality of photoactive patterns LRP are located may correspond to a plurality of code points where the plurality of code patterns CP are located.

The plurality of photoactive patterns LRP may absorb light having the second wavelength (e.g., infrared light, and the like) or radiate light having one or more wavelengths different from the second wavelength in response to the light having the second wavelength. For example, the plurality of photoactive patterns LRPs may include an absorption material absorbing light having the second wavelength (e.g., the infrared light), or include a radiation material (e.g., a phosphor) radiating light having one or more wavelengths different from the second wavelength in response to the light having the second wavelength.

A part of the light having the second wavelength emitted from the pen 110 and incident on the display panel 210 may be absorbed by the plurality of photoactive patterns LRP located at the plurality of code points, or converted to light having one or more other wavelengths and then radiated in the form of the light having one or more other wavelengths.

Another part of the light having the second wavelength incident on the display panel 210 after being emitted from the pen 110 may pass through a space between the plurality of photoactive patterns LRP.

The another part of the light having the second wavelength incident on the display panel 210 after being emitted from the pen 110 may pass through a space between the plurality of photoactive patterns LRP, be reflected by the reflective layer L1, and then, be redirected to move outside of the display panel 210.

Accordingly, the redirected light, which was reflected by the reflective layer L1 of the display panel 210 and thereafter caused to move outside of the display panel 210, may have been present at (or have passed through) points other than the plurality of code points, and have not been present at (or have not passed through) the plurality of code points or have been present (or have passed) in the formed of light having one or more other wavelengths.

As a result, a difference in shade or wavelength of the redirected light received by the pen 110 may occur. The pen 110 can detect the difference in shade or wavelength of the redirected light, recognize locations of the plurality of photoactive patterns LRP as locations of a plurality of code patterns CP, and determine a location of the pen 110 (i.e., a touch location) based on the recognized locations of the plurality of code patterns CP.

Referring to FIG. 9, the code pattern layer L2 may include a photoactive layer LRL including a photoactive material.

The photoactive layer LRL may have a plurality of openings OP spaced apart from each other.

The plurality of openings OP formed in the photoactive layer LRL may be disposed at a plurality of code points in the non-transmissive area NTA, and correspond to a plurality of code patterns CP, respectively. The photoactive material of the photoactive layer LRL is located at remaining locations of the photoactive layer LR that exclude the plurality of code points.

A plurality of points where the plurality of openings OP formed in the photoactive layer LRL are located may correspond to a plurality of code points where the plurality of code patterns CP are located.

The photoactive layer LRL may absorb light having the second wavelength or radiate light having one or more wavelengths different from the second wavelength in response to the light having the second wavelength. For example, the photoactive layer LRL may include a photoactive material (e.g., dye, pigment) absorbing light having the second wavelength (e.g., the infrared light, and the like), or include a photoactive material (e.g., phosphor) radiating light having one or more wavelengths different from the second wavelength in response to light having the second wavelength.

A part of light having the second wavelength incident on the display panel 210 after being emitted from the pen 110 may be absorbed by the photoactive layer LRL, or may be converted to light having one or more wavelengths different from the second wavelength and then radiated in the form of the light having one or more other wavelengths.

Another part of the light having the second wavelength incident on the display panel 210 after being emitted from the pen 110 may pass through the plurality of openings OP formed in the photoactive layer LRL.

The another part of the light having the second wavelength incident on the display panel 210 after being emitted from the pen 110 may pass through the plurality of openings OP formed in the photoactive layer LRL, be reflected by the reflective layer L1, and then, be redirected to move outside of the display panel 210.

Accordingly, the redirected light emitted to outside of the display panel 210 may have been present at the plurality of code points, and have not been present at points other than the plurality of code points or have been present in the formed of light having one or more wavelengths different from the second wavelength at points other than the plurality of code points.

As a result, a difference in shade or wavelength of the redirected light received by the pen 110 may occur. The pen 110 can detect the difference in shade or wavelength of the redirected light, recognize locations of the plurality of openings OP formed in the photoactive layer LRL as locations of a plurality of code patterns CP, and determine a location of the pen 110 (i.e., a touch location) based on the recognized locations of the plurality of code patterns CP.

Referring to FIG. 10, the code pattern layer L2 may include a plurality of transparent patterns TP spaced apart from each other and a photoactive layer LRL covering an upper surface and side surfaces of the plurality of transparent patterns TP.

The plurality of transparent patterns TP may be disposed at a plurality of code points in the non-transmissive area NTA, and correspond to a plurality of code patterns CP, respectively.

The plurality of transparent patterns TP may include a material allowing light having the second wavelength to be transmitted. For example, the plurality of transparent patterns TP may be clear resin.

A plurality of points where the plurality of transparent patterns TP are located may correspond to a plurality of code points where the plurality of code patterns CP are located.

The photoactive layer LRL may include a photoactive material.

The photoactive layer LRL may absorb light having the second wavelength or radiate light having one or more wavelengths different from the second wavelength in response to the light having the second wavelength. For example, the photoactive layer LRL may include a photoactive material absorbing light having the second wavelength (e.g., the infrared light, and the like), or include a photoactive material (e.g., phosphor) radiating light having one or more wavelengths different from the second wavelength in response to light having the second wavelength.

In contrast, the plurality of transparent patterns TP can allow light having the second wavelength to be transmitted.

A portion of the photoactive layer LRL overlapping with the plurality of transparent patterns TP may be thinner than a portion not overlapping with the plurality of transparent patterns TP.

Accordingly, a part of light having the second wavelength incident on the display panel 210 after being emitted from the pen 110 may be absorbed by the photoactive layer LRL, or may be converted to light having one or more wavelengths different from the second wavelength and then radiated in the form of the light having one or more different wavelengths. Another part of the light having the second wavelength incident on the display panel 210 after being emitted from the pen 110 may pass through the plurality of transparent patterns TP covered by a portion of the photoactive layer LRL with a thin thickness, be reflected by the reflective layer L1, and then, be redirected to move outside of the display panel 210.

Accordingly, the redirected light emitted to outside of the display panel 210 may have been present at the plurality of code points, and have not been present at points other than the plurality of code points or have been present in the formed of light having one or more wavelengths different from the second wavelength at points other than the plurality of code points.

As a result, a difference in shade or wavelength of the redirected light received by the pen 110 may occur. The pen 110 can detect the difference in shade or wavelength of the redirected light, recognize locations of the plurality of transparent patterns TP as locations of a plurality of code patterns CP, and determine a location of the pen 110 (i.e., a touch location) based on the recognized locations of the plurality of code patterns CP.

Figure 11:
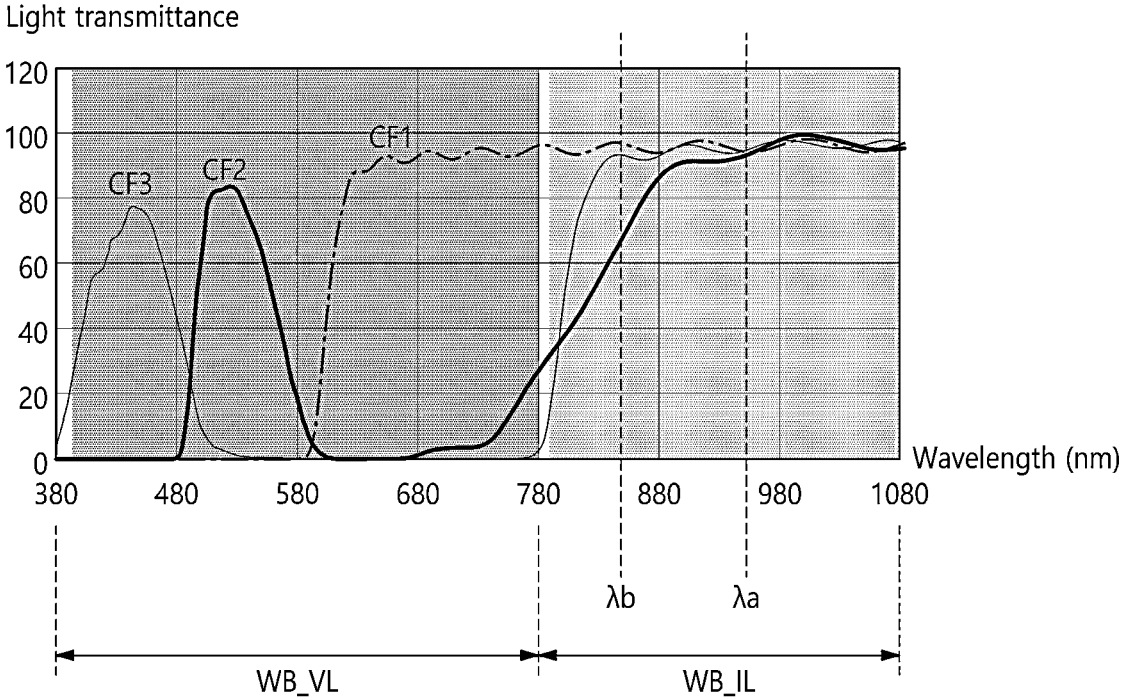
FIG. 11 illustrates example light transmission spectra of color filters disposed in the display panel according to embodiments of the present disclosure.

FIG. 11 illustrates example light transmission spectra of color filters (CF1, CF2, and CF3) disposed in the display panel 210 according to aspects of the present disclosure.

Referring to FIG. 11, in one or more example embodiments, a color filter layer CFL of the display panel 210 may include a first color filter CF1 capable of transmitting first color light, a second color filter CF2 capable of transmitting second color light, and a third color filter CF3 capable of transmitting third color light.

The transmission spectrum of FIG. 11 shows respective light transmittance of the first color filter CF1, the second color filter CF2, and the third color filter CF3, in the visible light wavelength band WB_VL of approximately 380 nm to 780 nm and the infrared wavelength band WB_IL of approximately 780 nm to 1080 nm.

Referring to FIG. 11, the first color filter CF1 may transmit red light in the visible light wavelength band WB_VL, the second color filter CF2 may transmit green light in the visible light wavelength band WB_VL, and the third color filter CF3 may transmit blue light in the visible light wavelength band WB_VL.

Referring to FIG. 11, the first color filter CF1 may transmit, with a high transmittance, infrared light included in the infrared wavelength band WB_IL of approximately 780 nm to 1080 nm.

The second color filter CF2 may have a high transmittance for infrared light having wavelengths greater than or equal to a first specific wavelength $\lambda$a in the infrared wavelength band WB_IL of approximately 780 nm to 1080 nm, and may have a low transmittance for infrared light having wavelengths in the wavelength band of 780 nm to the first specific wavelength $\lambda$a.

The third color filter CF3 may have a high transmittance for infrared light having wavelengths greater than or equal to a second specific wavelength $\lambda$b in the infrared wavelength band WB_IL of approximately 780 nm to 1080 nm, and may have a low transmittance for infrared light having wavelengths in the wavelength band of 780 nm to the second specific wavelength $\lambda$b. Here, the second specific wavelength $\lambda$b may be shorter than the first specific wavelength $\lambda$a.

As described above with reference to FIG. 6, the first to third color filters (CF1, CF2, and CF3) may be disposed between the pixel array layer 610 serving as the reflective layer L1 and the code pattern layer L2 including a photoactive material.

Therefore, for pen touch sensing, the first to third color filters (CF1, CF2, and CF3) may be present in a path through which light having the second wavelength passes.

Accordingly, when the light having the second wavelength is infrared light, the first to third color filters (CF1, CF2, and CF3) are required to fully transmit the light having the second wavelength.

Therefore, as shown in FIG. 11, the second wavelength may be set to be equal to or greater than the first specific wavelength $\lambda$a in which all of the first to third color filters (CF1, CF2, and CF3) have high transmittance. For example, the second wavelength may be 940 nm or more.

Hereinafter, the display panel 210 configured with the top emission structure and having a light control structure for pen touch sensing is described in more detail with reference to FIGS. 12 to 25.

Figure 12:
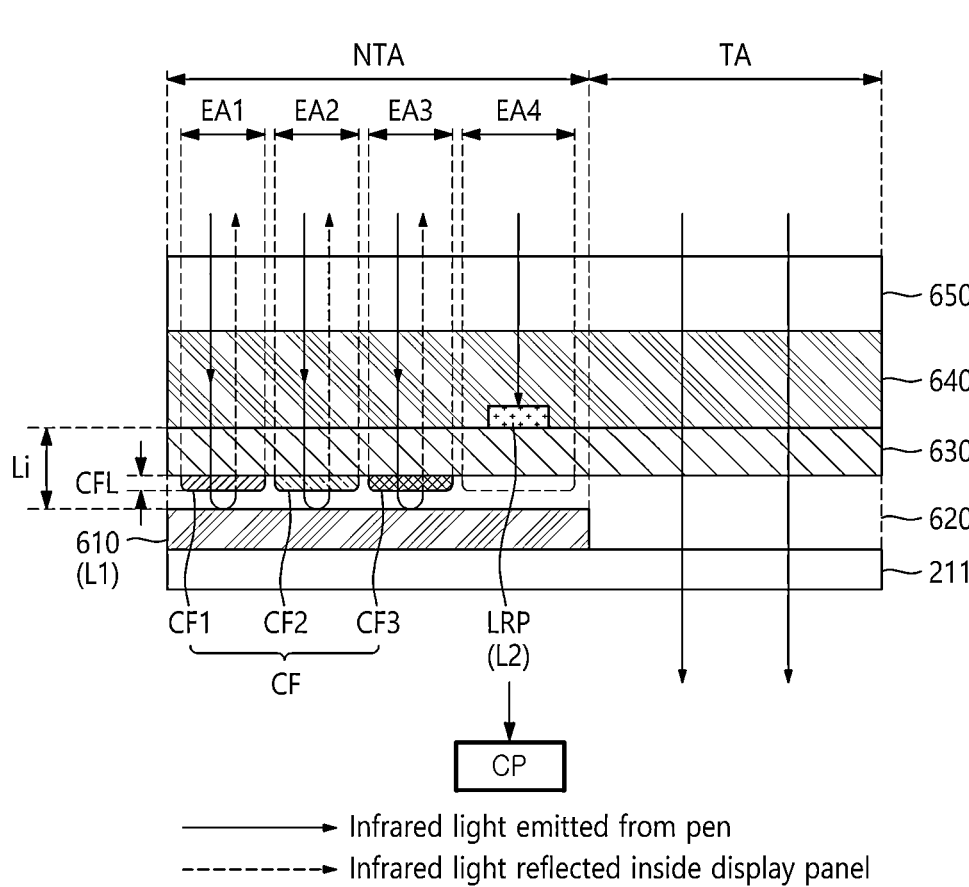
FIGS. 12 and 13 are example cross-sectional views of the display panel in which photoactive patterns as code patterns are arranged according to embodiments of the present disclosure.
Figure 13:
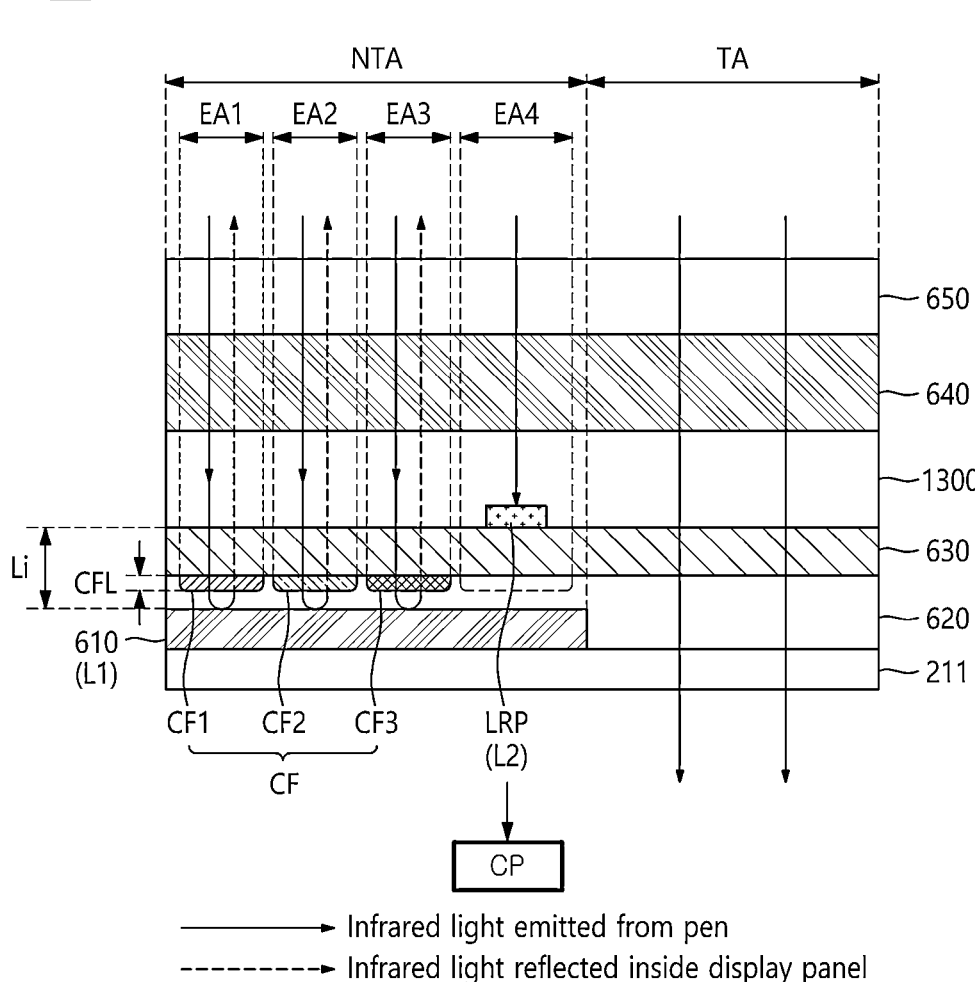

FIGS. 12 and 13 are example cross-sectional views of the display panel 210 in which photoactive patterns as code patterns are arranged according to embodiments of the present disclosure. It should be noted that light having the second wavelength in FIGS. 12 and 13 is infrared light.

FIGS. 12 and 13 are cross-sectional views of example implementations of the code pattern layer L2 in the cross-sectional view of FIG. 6. Hereinafter, discussion are provided by focusing on features different from the cross-sectional view of FIG. 6.

Referring to FIGS. 12 and 13, in one or more embodiments, the display panel 210 may include at least one transmissive area TA and at least one non-transmissive area NTA. The non-transmissive area NTA may correspond to the pixel array area PA of FIG. 5.

Referring to FIGS. 12 and 13, in one or more embodiments, the display panel 210 may include the first substrate 211, the pixel array layer 610, the insulating layer 620, the encapsulation layer 630, the adhesive layer 640, and the cover window 650.

Referring to FIGS. 12 and 13, the pixel array layer 610 may be located on the first substrate 211 and be disposed in the non-transmissive area NTA.

The pixel array layer 610 may include a plurality of metal layers and a plurality of various insulating layers for forming various transistors (e.g., DRT, SCT, SENT), various capacitors (e.g., Cst), and various signal lines (e.g., DL, SCL, SENL, DVL, BVL, and the like).

As such, since many metals for various purposes are disposed in the pixel array layer 610, the pixel array layer 610 can serve as a reflective layer L1 for reflecting light having the second wavelength.

Referring to FIGS. 12 and 13, in one or more embodiments, the display panel 210 may further include the color filter layer CFL located over the pixel array layer 610. For example, the color filter layer CFL may be located under the encapsulation layer 630. In another example, the color filter layer CFL may be located on the encapsulation layer 630. The encapsulation layer 630 may be an encapsulation substrate.

Referring to FIGS. 12 and 13, the pixel array layer 610 and the color filter layer CFL may not be disposed in the transmissive area TA, but may be disposed in the non-transmissive area NTA.

Referring to FIGS. 12 and 13, the color filter layer CFL may be located between the pixel array layer 610 and the code pattern layer L2 and may include the plurality of color filters CF disposed in the non-transmissive area NTA. The plurality of color filters CF may include a first color filter CF1 allowing first color light to be transmitted, a second color filter CF2 allowing second color light to be transmitted, and a third color filter CF3 allowing third color light to be transmitted.

Light emitted from a light emitting element ED may have one or more wavelengths different from the second wavelength. Light passing through the color filter CF after being emitted from the light emitting element ED may have one or more wavelengths different from the second wavelength.

The plurality of color filters CF may transmit light having the second wavelength (e.g., the infrared light).

The pixel array layer 610 may include a first subpixel SP1 located under the first color filter CF1, a second subpixel SP2 located under the second color filter CF2, a third subpixel SP3 located under the third color filter CF3, and a fourth subpixel SP4 located under an area where a color filter is not disposed.

Referring to FIGS. 12 and 13, in one or more embodiments, the display panel 210 may include a light control structure for pen touch sensing, and the light control structure may include a reflective layer L1 corresponding to a reflection structure and a code pattern layer L2 corresponding to an absorption structure or a radiation structure. The light control structure may further include an intermediate layer Li located between the reflective layer L1 and the code pattern layer L2. As an example, the intermediate layer Li may include the insulating layer 620 and the encapsulation layer 630.

Referring to FIGS. 12 and 13, since the reflective layer L1 is located under the color filter layer CFL, the plurality of color filters CF disposed on the color filter layer CFL may include a material allowing light having the second wavelength to be transmitted.

Referring to FIGS. 12 and 13, the code pattern layer L2 may be a layer including a photoactive material that is responsive to light having the second wavelength. For example, the code pattern layer L2 may be located on the encapsulation layer 630. In another example, the code pattern layer L2 may be disposed between the pixel array layer 610 and the encapsulation layer 630.

Referring to FIGS. 12 and 13, a plurality of photoactive patterns LRP may be configured to be spaced apart from each other in the code pattern layer L2.

The plurality of photoactive patterns LRP may be configured to be spaced apart from each other in the non-transmissive area NTA. The plurality of photoactive patterns LRP may be disposed at a plurality of code points in the non-transmissive area NTA, and correspond to a plurality of code patterns CP, respectively.

The plurality of photoactive patterns LRP may include a photoactive material that is responsive to light having the second wavelength. For example, the plurality of photoactive patterns LRP may include a light absorption material absorbing light having the second wavelength. In another example, the plurality of photoactive patterns LRP may include a wavelength conversion material (e.g., phosphor) capable of converting the second wavelength to one or more other wavelengths in response to light having the second wavelength and radiating the light having the one or more other wavelengths.

Figure 16:
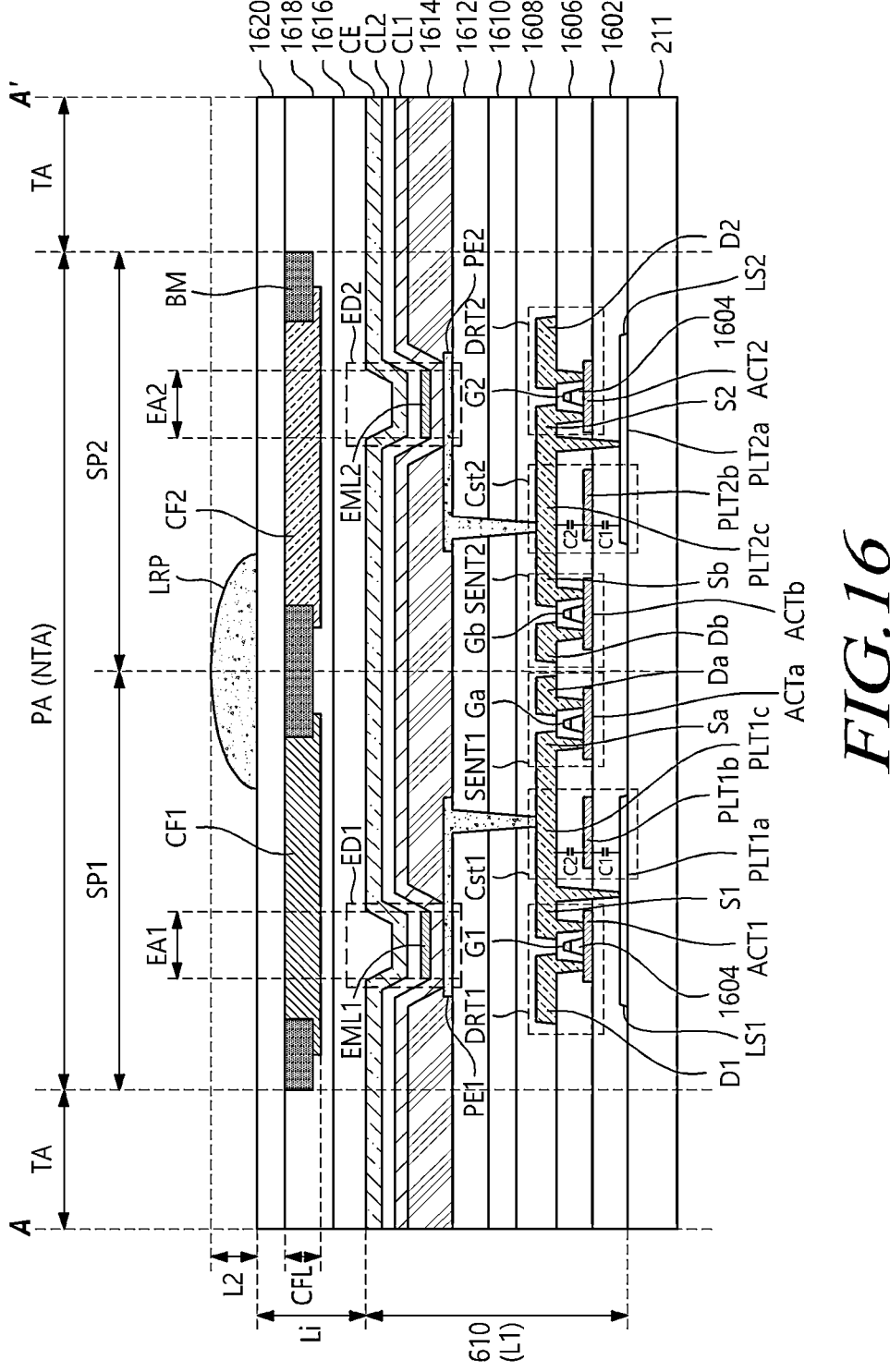
FIG. 16 is an example cross-sectional view taken along line A-A' of FIGS. 14 and 15 according to embodiments of the present disclosure.

As shown in FIGS. 12 and 13, at least one of the plurality of photoactive patterns LRP may overlap with at least a corresponding portion of at least one of light emitting areas (EA1, EA2, EA3, and EA4). In the examples of FIGS. 12 and 13, the photoactive pattern LRP may overlap with a light emitting area EA4 configured to emit white light. In another example, the photoactive pattern LRP may not overlap with light emitting areas (EA1 and EA2) as shown in FIG. 16.

The photoactive material included in the plurality of photoactive patterns LRP may have a property of transmitting visible light emitted from a light emitting element ED. According to this configuration, even when the photoactive material overlaps with one or more light emitting elements ED or one or more color filters CF, light (e.g., visible light) emitted from one or more light emitting elements ED or light (e.g., visible light) passing through one or more color filters CF after being emitted from one or more light emitting elements ED can pass through the photoactive material and normally come from the display panel 210. As a result, the display panel 210 can display images normally.

Referring to FIGS. 12 and 13, a part of the light having the second wavelength incident on the display panel 210 after being emitted from the pen 110 may be absorbed by a plurality of photoactive patterns LRP located at a plurality of code points, or converted to light having one or more other wavelengths and then radiated in the form of the light having one or more other wavelengths.

Another part of the light having the second wavelength incident on the display panel 210 after being emitted from the pen 110 may pass through a space between the plurality of photoactive patterns LRP, be reflected by the reflective layer L1, and then, be redirected to move outside of the display panel 210.

Accordingly, the redirected light, which was reflected by the reflective layer L1 of the display panel 210 and thereafter caused to move outside of the display panel 210, may have been present at (or have passed through) points other than the plurality of code points, and have not been present at (or have not passed through) the plurality of code points or have been present (or have passed) in the formed of light having one or more other wavelengths. Due to the pattern of the code points, the light that is redirected by the pixel array layer 610 and received by the pen 110 has a pattern that signifies the location of the pen 110.

As a result, the pattern of light having a difference in shade or wavelength of the redirected light received by the pen 110 may occur. The pen 110 can detect the pattern (e.g., the difference in shade or wavelength of the redirected light), recognize locations of the plurality of photoactive patterns LRP as locations of a plurality of code patterns CP, and determine a location of the pen 110 (i.e., a touch location) based on the recognized locations of the plurality of code patterns CP.

Referring to FIG. 13, in one or more embodiments, the display panel 210 may further include a planarization layer 1300 disposed on the plurality of photoactive patterns LRP. The planarization layer 1300 can reduce steps caused by the plurality of photoactive patterns LRP.

Figure 14:
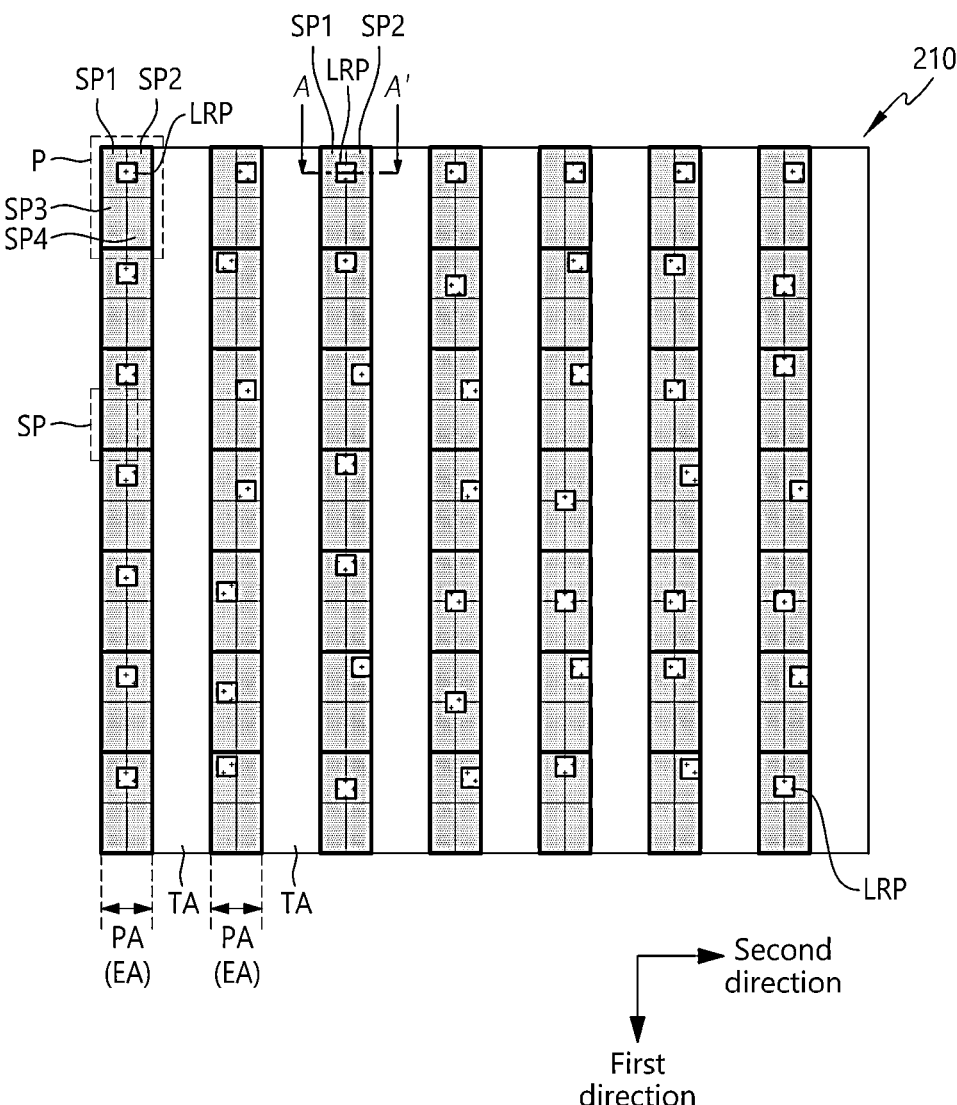
FIGS. 14 and 15 are example plan views of the display panel in which a plurality of photoactive patterns as a plurality of code patterns are arranged according to embodiments of the present disclosure.
Figure 15:
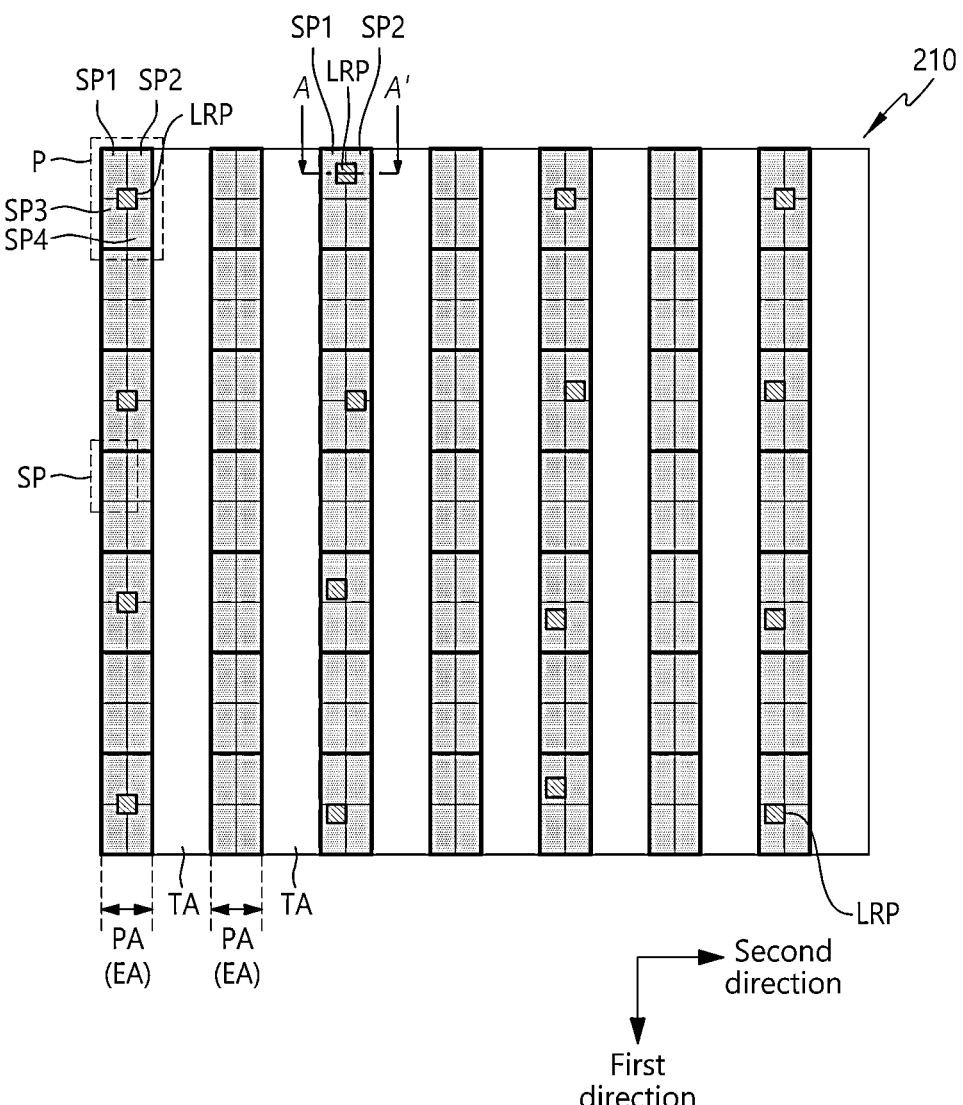

FIGS. 14 and 15 are example plan views of the display panel 210 in which a plurality of photoactive patterns LRP as a plurality of code patterns CP are arranged according to embodiments of the present disclosure.

Referring to FIGS. 14 and 15, the display panel 210 may include a plurality of pixel array areas PA and a plurality of transmissive areas TA. A plurality of pixels P may be disposed in each of the pixel array areas PA, and each of the plurality of pixels P may include a plurality of subpixels (SP1, SP2, SP3, and SP4). Each of the plurality of pixel array areas PA may include a plurality of light emitting areas EA.

Referring to FIGS. 14 and 15, each of the plurality of pixel array areas PA may be a long area extending in the first direction, and each of the plurality of transmissive areas TA may be a long area extending in the first direction. A transmissive area TA may be present between two adjacent pixel array areas PA in the second direction among the plurality of pixel array areas PA.

Referring to FIGS. 14 and 15, a plurality of code points in the non-transmissive area NTA may correspond to a plurality of code patterns CP. For example, a plurality of photoactive patterns LRP disposed at the plurality of code points in the non-transmissive area NTA may correspond to the plurality of code patterns CP.

Referring to FIGS. 14 and 15, for example, at least one or more of the plurality of code patterns CP may overlap with one or more light emitting areas in the non-transmissive area NTA. In another example, at least one or more of the plurality of code patterns CP may overlap with a non-light emitting area in the non-transmissive area NTA.

Referring to FIG. 14, for example, a respective photoactive pattern LRP may be disposed in each area where one pixel P is disposed.

In another example, a respective photoactive pattern LRP may be disposed in each area where two or more pixels P are disposed. For example, as shown in FIG. 15, a plurality of photoactive patterns LRP may be disposed in odd-numbered pixel array areas PA among a plurality of pixel array areas PA, and a plurality of photoactive patterns LRP may not be disposed in even-numbered pixel array areas PA among the plurality of pixel array areas PA. Photoactive patterns LRP may be disposed only in the odd-numbered pixels P among a plurality of pixels P disposed in the odd-numbered pixel array areas PA.

Referring to FIGS. 14, 15, and 7, at least some of photoactive patterns LRP shown in FIGS. 14 and 15 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of photoactive patterns LRP shown in FIGS. 14 and 15 may correspond to code patterns (CP_CGL1, CP_CGL2) corresponding to first and second cell guide lines (CGL1, CGL2) around a data cell area D-CELL.

FIG. 16 is an example cross-sectional view taken along line A-A' of FIGS. 14 and 15 according to one embodiment.

Referring to FIG. 16, a first subpixel SP1 and a second subpixel SP2 may be disposed in a pixel array area PA, which is a non-transmissive area NTA, and transmissive areas TA may be disposed on both sides of the pixel array area PA, which is the non-transmissive area NTA.

Referring to FIG. 16, for example, the first subpixel SP1 and the second subpixel SP2 may have the structure of FIG. 4. Accordingly, the first subpixel SP1 may include a first light emitting element ED1, a first driving transistor DRT1, a first sensing transistor SENT1, and a first storage capacitor Cst1, and include a first scan transistor SCT although not shown in FIG. 16. The second subpixel SP2 may include a second light emitting element ED2, a second driving transistor DRT2, a second sensing transistor SENT2, and a second storage capacitor Cst2, and include a second scan transistor SCT although not shown in FIG. 16.

Referring to FIG. 16, a first light shield LS1 and a second light shield LS2 may be disposed on a first substrate 211. The first light shield LS1 may be disposed under the first driving transistor DRT1 and prevent the channel of the first driving transistor DRT1 from being exposed to light. The second light shield LS2 may be disposed under the second driving transistor DRT2 and prevent the channel of the second driving transistor DRT2 from being exposed to light.

Referring to FIG. 16, a portion of the first light shield LS1 may serve as a first capacitor electrode PLT1*a* of a first storage capacitor Cst1, and a portion of the second light shield LS2 may serve as a first capacitor electrode PLT2*a* of a second storage capacitor Cst2.

Referring to FIG. 16, a buffer layer 1602 may be disposed on the first light shield LS1 and the second light shield LS2. The active layer ACT1 of the first driving transistor DRT1, the active layer ACTa of a first sensing transistor SENT1, the active layer ACT2 of the second driving transistor DRT2, and the active layer ACTb of a second sensing transistor SENT2 may be disposed on the buffer layer 1602.

Further, a second capacitor electrode PLT1*b* of the first storage capacitor Cst1 and a second capacitor electrode PLT2*b* of the second storage capacitor Cst2 may also be disposed on the buffer layer 1602.

The second capacitor electrode PLT1*b* of the first storage capacitor Cst1 and the second capacitor electrode PLT2*b* of the second storage capacitor Cst2 may include the same semiconductor material as the active layers (ACT1, ACTa, ACT2, and ACTb). For example, the semiconductor material may be an oxide semiconductor material or a silicon-based semiconductor material. For example, the second capacitor electrode PLT1*b* of the first storage capacitor Cst1 and the second capacitor electrode PLT2*b* of the second storage capacitor Cst2 may be electrodes including a conductivity-enabled semiconductor material. Here, the semiconductor material can be changed into a conductivity-enabled material through an ion implantation process (which may also referred to as a doping process).

Referring to FIG. 16, a gate insulating layer 1604 may be disposed on the active layer ACT1 of the first driving transistor DRT1, the active layer ACTa of the first sensing transistor SENT1, the active layer ACT2 of the second driving transistor DRT2, and the active layer ACTb of the second sensing transistor SENT2.

Referring to FIG. 16, the gate electrode G1 of the first driving transistor DRT1, the gate electrode Ga of the first sensing transistor SENT1, the gate electrode G2 of the second driving transistor DRT2, and the gate electrode Gb of the second sensing transistor SENT2 may be disposed on the gate insulating layer 1604.

Referring to FIG. 16, an interlayer insulating layer 1606 may be disposed on the gate electrode G1 of the first driving transistor DRT1, the gate electrode Ga of the first sensing transistor SENT1, the gate electrode G2 of the second driving transistor DRT2, and the gate electrode Gb of the second sensing transistor SENT2.

Referring to FIG. 16, the source and drain electrodes (S1 and D1) of the first driving transistor DRT1, the source and drain electrodes (Sa and Da) of the first sensing transistor SENT1, the source and drain electrodes (S2 and D2) of the second driving transistor DRT2, and the source and drain electrodes (Sb and Db) of the second sensing transistor SENT2 may be disposed on an interlayer insulating layer 1606.

The source electrode S1 and the drain electrode D1 of the first driving transistor DRT1 may be connected to the active layer ACT1 of the first driving transistor DRT1 through contact holes of the interlayer insulating layer 1606. The source electrode Sa and drain electrode Da of the first sensing transistor SENT1 may be connected to the active layer ACTa of the first sensing transistor SENT1 through contact holes of the interlayer insulating layer 1606. The source electrode S2 and the drain electrode D2 of the second driving transistor DRT2 may be connected to the active layer ACT2 of the second driving transistor DRT2 through contact holes of the interlayer insulating layer 1606. The source electrode Sb and drain electrode Db of the second sensing transistor SENT2 may be connected to the active layer ACTb of the second sensing transistor SENT2 through contact holes of the interlayer insulating layer 1606.

The source electrode S1 of the first driving transistor DRT1 and the source electrode Sa of the first sensing transistor SENT1 may be electrically connected or integrated with each other.

For example, the source electrode S1 of the first driving transistor DRT1 and the source electrode Sa of the first sensing transistor SENT1 may be electrically connected to a third capacitor electrode PLT1*c* of the first storage capacitor Cst1. In another example, the source electrode S1 of the first driving transistor DRT1, the source electrode Sa of the first sensing transistor SENT1, and the third capacitor electrode PLT1*c* of the first storage capacitor Cst1 may be integrated with each other (i.e., integrally formed as one piece).

The source electrode S2 of the second driving transistor DRT2 and the source electrode Sb of the second sensing transistor SENT2 may be electrically connected or integrated with each other.

For example, the source electrode S2 of the second driving transistor DRT2 and the source electrode Sb of the second sensing transistor SENT2 may be electrically connected to a third capacitor electrode PLT2*c* of the second storage capacitor Cst2. In another example, the source electrode S2 of the second driving transistor DRT2, the source electrode Sb of the second sensing transistor SENT2, and the third capacitor electrode PLT2c of the second storage capacitor Cst2 may be integrated with each other (i.e., integrally formed as one piece).

The first storage capacitor Cst1 may be configured with the first capacitor electrode PLT1a, the second capacitor electrode PLT1b, and the third capacitor electrode PLT1c.

In the first storage capacitor Cst1, the first capacitor electrode PLT1a and the third capacitor electrode PLT1c may be electrically connected to the source electrode S1 of the first driving transistor DRT1, and the second capacitor electrode PLT1b may be electrically connected to the gate electrode G1 of the first driving transistor DRT1.

Accordingly, the first storage capacitor Cst1 formed between the source electrode S1 and the gate electrode G1 of the first driving transistor DRT1 may have a structure in which a first capacitor C1 between the first capacitor electrode PLT1a and the second capacitor electrode PLT1b and a second capacitor C2 between the second capacitor electrode PLT1b and the third capacitor electrode PLT1c are connected in parallel to each other.

The second storage capacitor Cst2 may be configured with the first capacitor electrode PLT2a, the second capacitor electrode PLT2b, and the third capacitor electrode PLT2c.

In the second storage capacitor Cst2, the first capacitor electrode PLT2a and the third capacitor electrode PLT2c may be electrically connected to the source electrode S2 of the second driving transistor DRT2, and the second capacitor electrode PLT2b may be electrically connected to the gate electrode G2 of the second driving transistor DRT2.

Accordingly, the second storage capacitor Cst2 formed between the source electrode S2 and the gate electrode G2 of the second driving transistor DRT2 may have a structure in which a first capacitor C1 between the first capacitor electrode PLT2a and the second capacitor electrode PLT2b and a second capacitor C2 between the second capacitor electrode PLT2b and the third capacitor electrode PLT2c are connected in parallel to each other.

Referring to FIG. 16, a first protective layer 1608 may be disposed on the source and drain electrodes (S1 and D1) of the first driving transistor DRT1, the source and drain electrodes (Sa and Da) of the first sensing transistor SENT1, the source and drain electrodes (S2 and D2) of the second driving transistor DRT2, and the source and drain electrodes (Sb and Db) of the second sensing transistor SENT2, and a second protective layer 1610 may be disposed on the first protective layer 1608. A planarization layer 1612 may be disposed on the second protective layer 1610.

Referring to FIG. 16, a first pixel electrode PE1 of a first light emitting element ED1 and a second pixel electrode PE2 of a second light emitting element ED2 may be disposed on the planarization layer 1612.

The first pixel electrode PE1 of the first light emitting element ED1 may be electrically connected to the source electrode S1 of the first driving transistor DRT1 through contact holes of the planarization layer 1612, the second protective layer 1610, and the first protective layer 1608. The second pixel electrode PE2 of the second light emitting element ED2 may be electrically connected to the source electrode S2 of the second driving transistor DRT2 through contact holes of the planarization layer 1612, the second protective layer 1610, and the first protective layer 1608.

Referring to FIG. 16, a bank 1614 may be disposed on the first pixel electrode PE1 of the first light emitting element ED1 and the second pixel electrode PE2 of the second light emitting element ED2. The bank 1614 may have a first opening configured to expose a portion of the first pixel electrode PE1 and a second opening configured to expose a portion of the second pixel electrode PE2.

The bank 1614 may be disposed not only in the non-transmissive area NTA, which is the pixel array area PA, but also in the transmissive area TA.

Referring to FIG. 16, a first common layer CL1 may be disposed on the bank 1614. For example, the first common layer CL1 may be disposed on a portion of the first pixel electrode PE1 exposed through the first opening of the bank 1614, and be also disposed on a portion of the second pixel electrode PE2 exposed through the second opening of the bank 1614.

Referring to FIG. 16, a first emission layer EML1 may be disposed on the first common layer CL1, overlap with the first opening of the bank 1614, and overlap with the first pixel electrode PE1. A second emission layer EML2 may be disposed on the first common layer CL1, overlap the second opening of the bank 1614, and overlap the second pixel electrode PE2.

Referring to FIG. 16, a second common layer CL2 may be disposed on the first and second emission layers (EML1 and EML2). The second common layer CL2 may be disposed on the first common layer CL1 such that the second common layer CL2 extends to an area where the first and second emission layers (EML1 and EML2) are not disposed.

Referring to FIG. 16, a common electrode CE may be disposed on the second common layer CL2.

Referring to FIG. 16, the first emission layer EML1 may be disposed only in an area of the first subpixel SP1 in which the first light emitting element ED1 is formed, and the second emission layer EML2 may be disposed only in an area of the second subpixel SP2 in which the second light emitting element ED2 is formed. The first common layer CL1, the second common layer CL2, and the common electrode CE may be disposed not only in the non-transmissive area NTA, which is the pixel array area PA, but also in the transmissive area TA.

Referring to FIG. 16, the first light emitting element ED1 may be configured by a portion where the first pixel electrode PE1, the first common layer CL1, the first emission layer EML1, the second common layer CL2, and the common electrode CE are overlapped and stacked. The second light emitting element ED2 may be configured by a portion where the second pixel electrode PE2, the first common layer CL1, the second emission layer EML2, the second common layer CL2, and the common electrode CE are overlapped and stacked.

Referring to FIG. 16, a vertical area where the transistors (DRT1, SENT1, DRT2, and SENT2), the capacitors (Cst1 and Cst2), and light emitting elements (ED1 and ED2) are stacked may correspond to a pixel array layer 610.

Many metals for electrodes of the transistors (DRT1, SENT1, DRT2, and SENT2), the capacitors (Cst1 and Cst2), and light emitting elements (ED1 and ED2) may be disposed in the pixel array layer 610. Accordingly, the pixel array layer 610 may function as a reflective layer L1 configured to reflect light having the second wavelength.

Referring to FIG. 16, a filler layer 1616 may be disposed on the common electrode CE, and an overcoat layer 1618 may be disposed on the filler layer 1616.

A color filter layer CFL may be disposed on the overcoat layer 1618.

The color filter layer CFL may include a first color filter CF1 and a second color filter CF2. The color filter layer CFL may further include a black matrix BM disposed between the first color filter CF1 and the second color filter CF2, between the first color filter CF1 and the transmissive area TA, and between the second color filter CF2 and the transmissive area TA.

The first color filter CF1 and the second color filter CF2 may overlap with the first light emitting element ED1 and the second light emitting element ED2, respectively. The first color filter CF1 and the second color filter CF2 may overlap with a first light emitting area EA1 formed by the first light emitting element ED1 and a second light emitting area EA2 formed by the second light emitting element ED2, respectively.

Referring to FIG. 16, a second substrate 1620 may be disposed on the color filter layer CFL. For example, the second substrate 1620 may function as an encapsulation layer 630 or an encapsulation substrate.

Referring to FIG. 16, a code pattern layer L2 may be located on the second substrate 1620. An intermediate layer Li, which is located between the reflective layer L1 and the code pattern layer L2, may be configured with the filler layer 1616, the overcoat layer 1618, the color filter layer CFL, and the second substrate 1620.

Referring to FIG. 16, a photoactive pattern LRP may be disposed in the code pattern layer L2 on the second substrate 1620. The photoactive pattern LRP may be disposed in the non-transmissive area NTA.

The photoactive pattern LRP may be disposed between the first emission area EA1 and the second emission area EA2. For example, the photoactive pattern LRP may not overlap with the first emission area EA1 and the second emission area EA2. In another example, the photoactive pattern LRP may overlap with at least a portion of at least one of the first emission area EA1 and the second emission area EA2.

For example, the photoactive pattern LRP may not overlap with the first color filter CF1 and the second color filter CF2. In another example, the photoactive pattern LRP may overlap with at least a portion of at least one of the first color filter CF1 and the second color filter CF2.

Referring to FIG. 16, in an example where the display panel 210 has the top emission structure, at least respective portions of subpixel circuits SPC included in the first subpixel SP1 and the second subpixel SP2 may overlap with the first light emitting element ED1 and second light emitting element ED2, respectively. The subpixel circuit SPC included in the first subpixel SP1 may include the first driving transistor DRT1, the first sensing transistor SENT1, and the first storage capacitor Cst1. The subpixel circuit SPC included in the second subpixel SP2 may include the second driving transistor DRT2, the second sensing transistor SENT2, and the second storage capacitor Cst2.

Referring to FIG. 16, in an example where the display panel 210 has the top emission structure, among first electrodes (e.g., the first pixel electrodes PE1 and the second pixel electrodes PE2) and a second electrode (e.g., the common electrode CE) included in the first light emitting element ED1 and the second light emitting element ED2, the first electrodes (e.g., the first pixel electrodes PE1 and the second pixel electrodes PE2) close to the first substrate 211 may be reflective electrodes, and the second electrode (e.g., the common electrode CE) away from the first substrate 211 may be a transparent electrode.

Referring to FIG. 16, in an example where the display panel 210 has the top emission structure, the code pattern layer L2 in which a photoactive pattern LRP is disposed may be located on the pixel array layer 610. A photoactive material included in the photoactive pattern LRP may have the property of transmitting visible light emitted from the light emitting elements (ED1 and ED2). Accordingly, the photoactive pattern LRP may not interfere with visible light emission (emitting light or moving of emitted light) for image display even when the photoactive pattern LRP is disposed close to the viewing surface.

Figure 17:
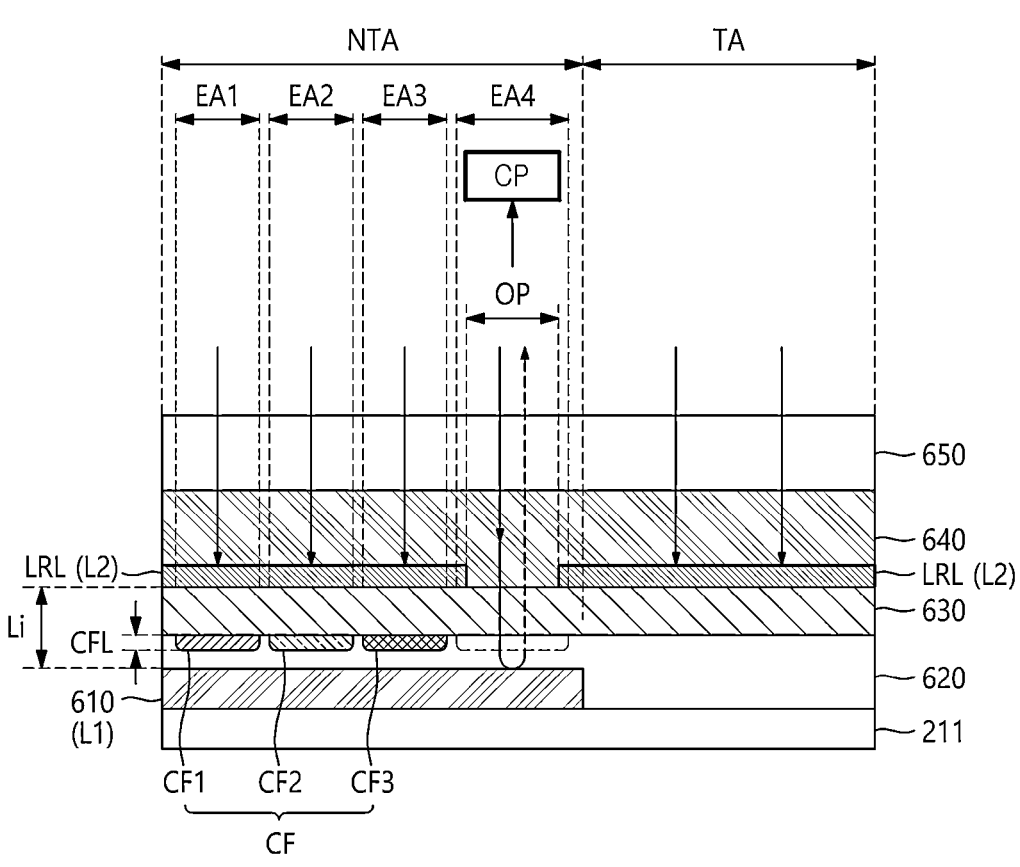
FIG. 17 is an example cross-sectional view of the display panel in which a photoactive layer having a plurality of openings as a plurality of code patterns is disposed according to embodiments of the present disclosure.
Figure 18:
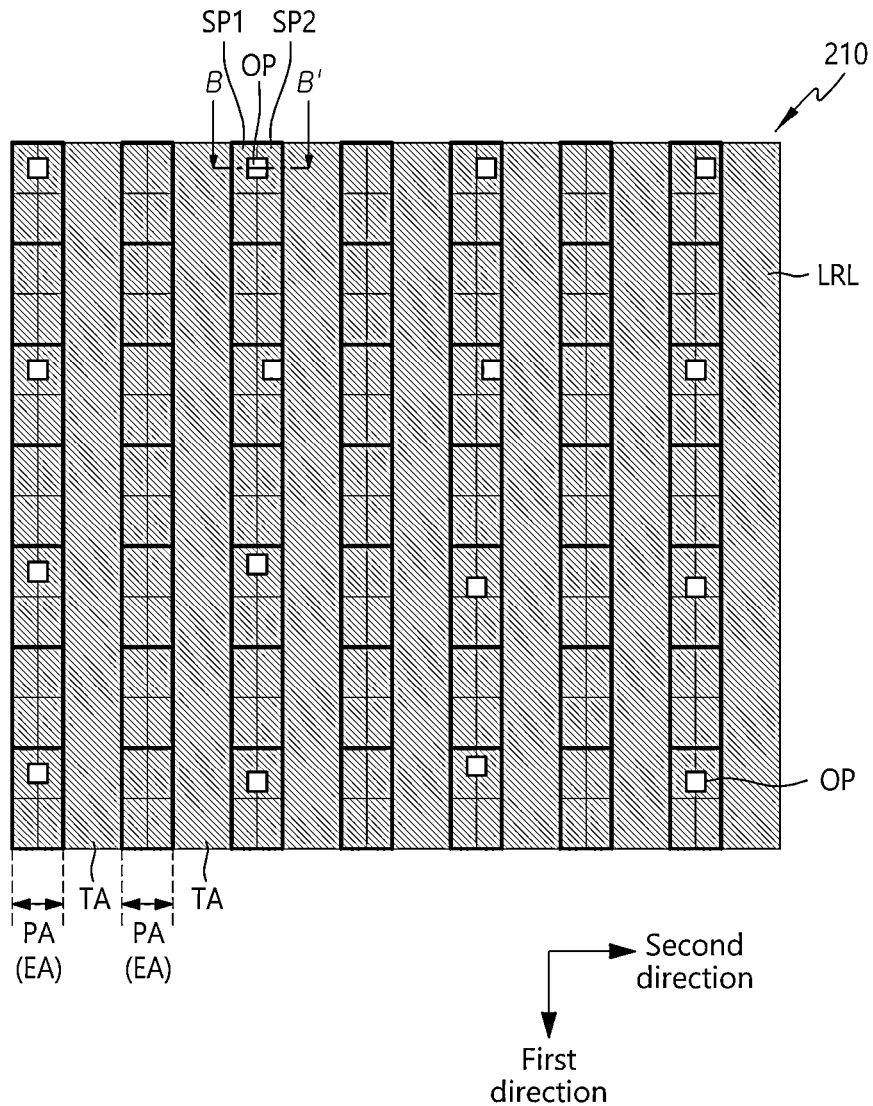
FIG. 18 is an example plan view of the display panel in which a photoactive layer having a plurality of openings as a plurality of code patterns is disposed according to embodiments of the present disclosure.
Figure 19:
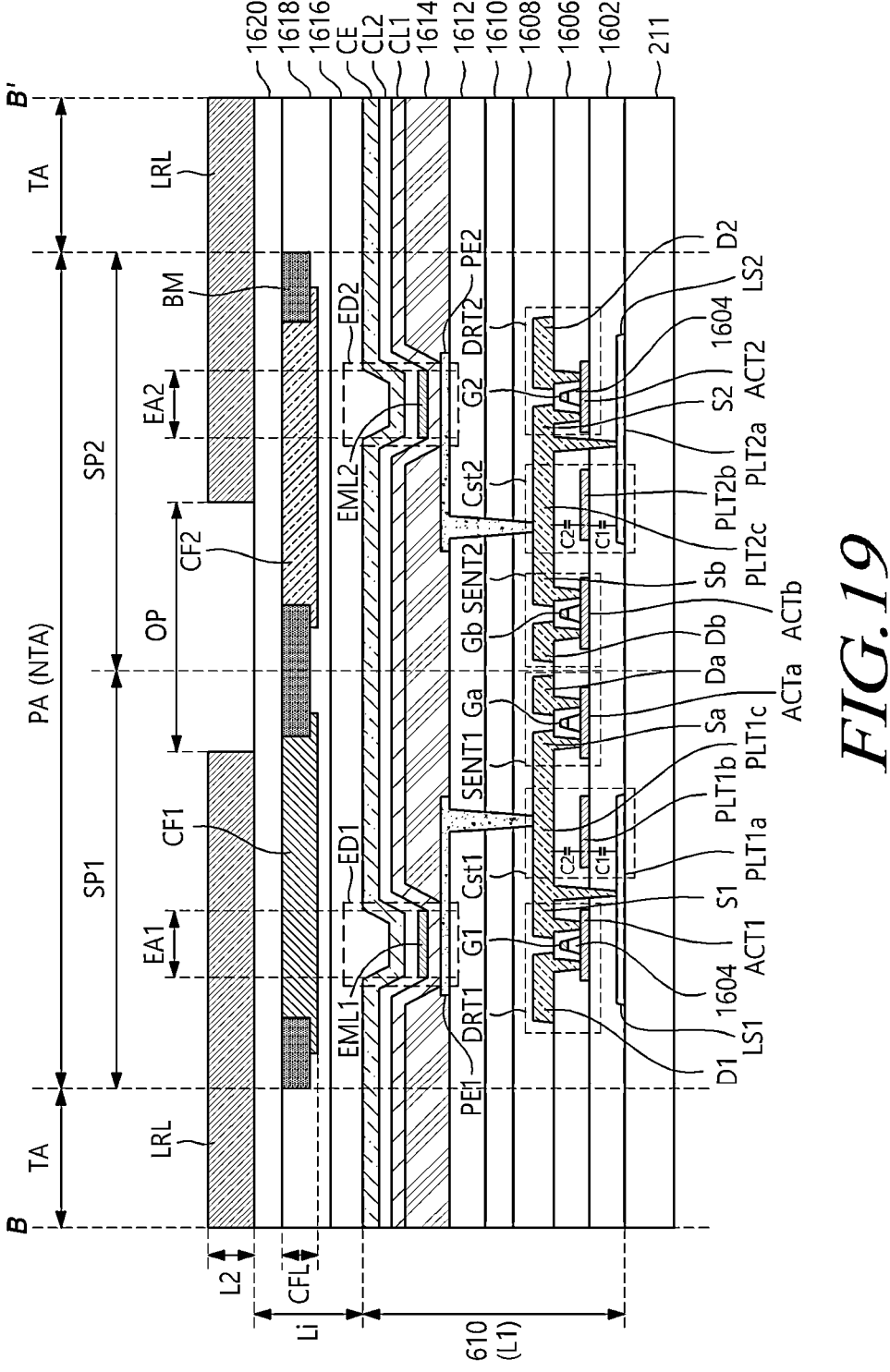
FIG. 19 is an example cross-sectional view taken along line B-B' of FIG. 18 according to embodiments of the present disclosure.

FIG. 17 is an example cross-sectional view of the display panel 210 in which a photoactive layer LRL having a plurality of openings as a plurality of code patterns is disposed (in a predefined area or entire area of the display area DA) according to embodiments of the present disclosure. FIG. 18 is an example plan view of the display panel 210 in which a photoactive layer LRL having a plurality of openings as a plurality of code patterns is disposed (in a predefined area or entire area of the display area DA) according to embodiments of the present disclosure. FIG. 19 is an example cross-sectional view taken along line B-B' of FIG. 18.

It should be noted here that in the following description, for convenience of description, discussions on the configurations of FIGS. 17, 18, and 19 are provided by focusing on different features between the cross-sectional view of FIG. 17 and the cross-sectional view of FIG. 12, different features between the plan view of FIG. 18 and the plan view of FIG. 15, and different features between the cross-sectional view of FIG. 19 and the cross-sectional view of FIG. 16. Hereinafter, discussions are provided based on examples where light having the second wavelength is infrared light.

Referring to FIGS. 17 to 19, a photoactive layer LRL having a plurality of openings OP may be disposed in a code pattern layer L2.

Referring to FIGS. 17 to 19, the photoactive layer LRL may be disposed in an area including a non-transmissive area NTA and a transmissive area TA.

Referring to FIGS. 17 to 19, the openings OP of the photoactive layer LRL may be located in the non-transmissive area NTA, which is a pixel array area PA. The openings OP of the photoactive layer LRL may correspond to code patterns CP.

Referring to FIGS. 17 to 19, each of the opening OP of the photoactive layer LRL may overlap with one or more of light emitting areas (EA1, EA2, EA3, and EA4). For example, as shown in FIG. 17, an opening OP of the photoactive layer LRL may overlap with a light emitting area EA4 configured to emit white light. In another example, as shown in 19, an opening OP of the photoactive layer LRL may not overlap with the light emitting areas EA1 and EA2.

Referring to FIGS. 17 to 19, a part of light having the second wavelength incident on the display panel 210 after being output from the pen 110 may be absorbed by the photoactive layer LRL. Another part of the light having the second wavelength incident on the display panel 210 after being output from the pen 110 may pass through one or more openings OP and be reflected by the pixel array layer 610, which is a reflective layer L1, and then, the resulting redirected light may pass through the one or more openings OP and come from the display panel 210.

Referring to FIGS. 17 to 19, in an example where light having the second wavelength is infrared light, in the transmissive area TA, visible light may be transmitted from the front to the back of the display panel 210. However, in the transmissive area TA, infrared light cannot be transmitted from the front to the back of the display panel 210, and thus, may be absorbed or radiated by the photoactive layer LRL.

Referring to FIGS. 18, and 7, at least some of openings OP of the photoactive layer LRL shown in FIG. 18 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of the openings OP of the photoactive layer LRL shown in FIG. 18 may correspond to code patterns (CP_CGL1, CP_CGL2) corresponding to first and second cell guide lines (CGL1, CGL2) around a data cell area D-CELL. Due to the pattern of the code points at which the openings are located, the light that is redirected by the pixel array layer 610 and received by the pen 110 has a pattern that signifies the location of the pen 110.

Figure 20:
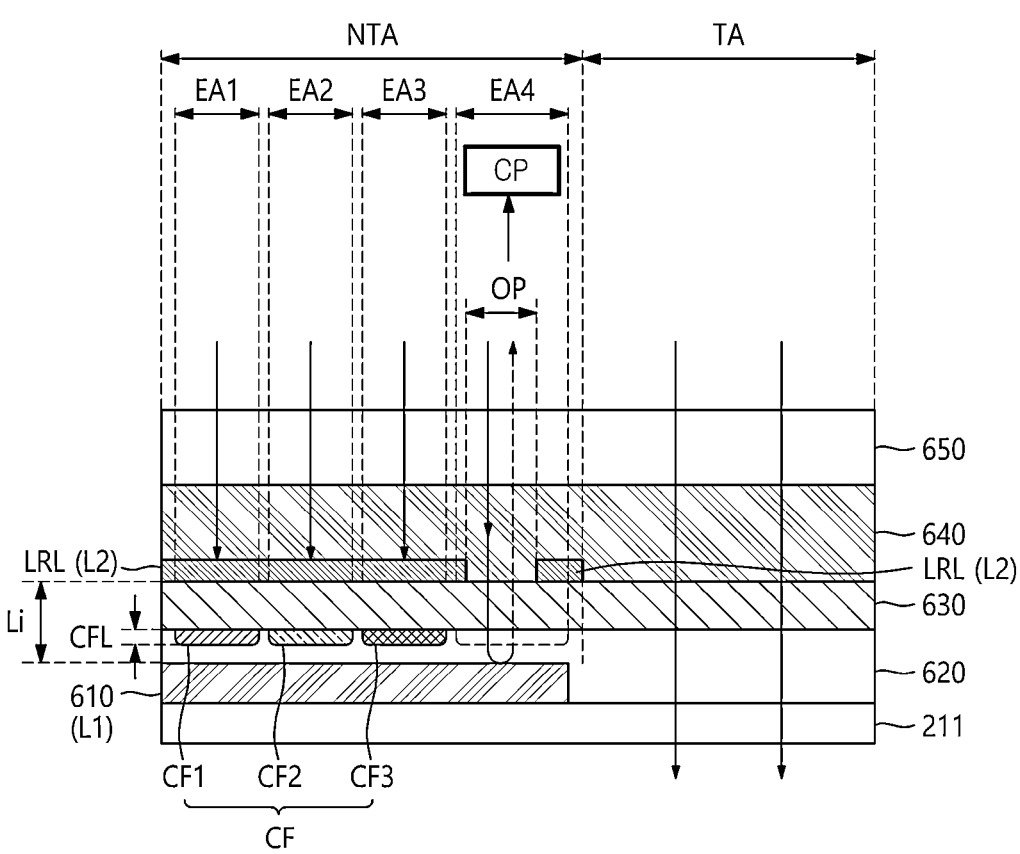
FIG. 20 is an example cross-sectional view of the display panel in which a photoactive layer having a plurality of openings as a plurality of code patterns is disposed in a non-transmissive area according to embodiments of the present disclosure.
Figure 21:
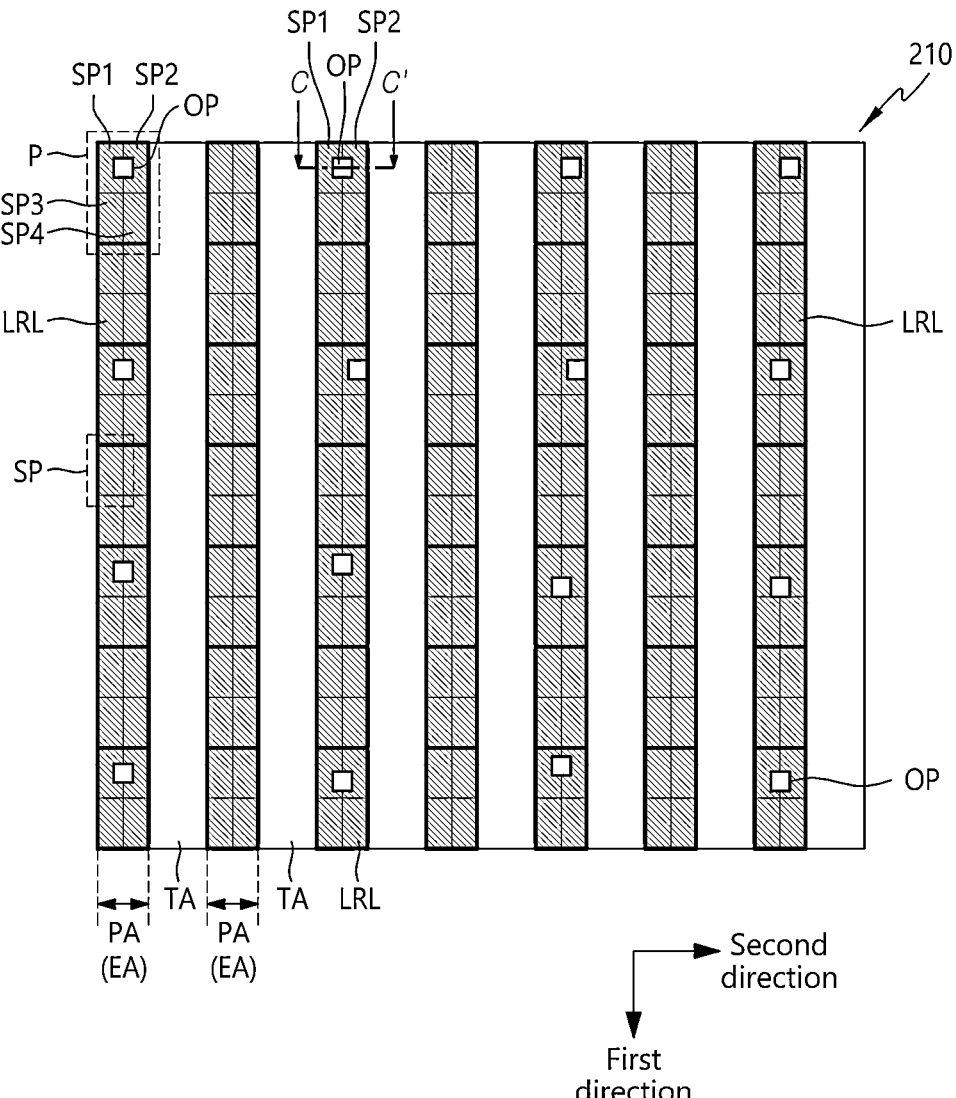
FIG. 21 is an example plan view of the display panel in which a photoactive layer having a plurality of openings as a plurality of code patterns is disposed in a non-transmissive area according to embodiments of the present disclosure.
Figure 22:
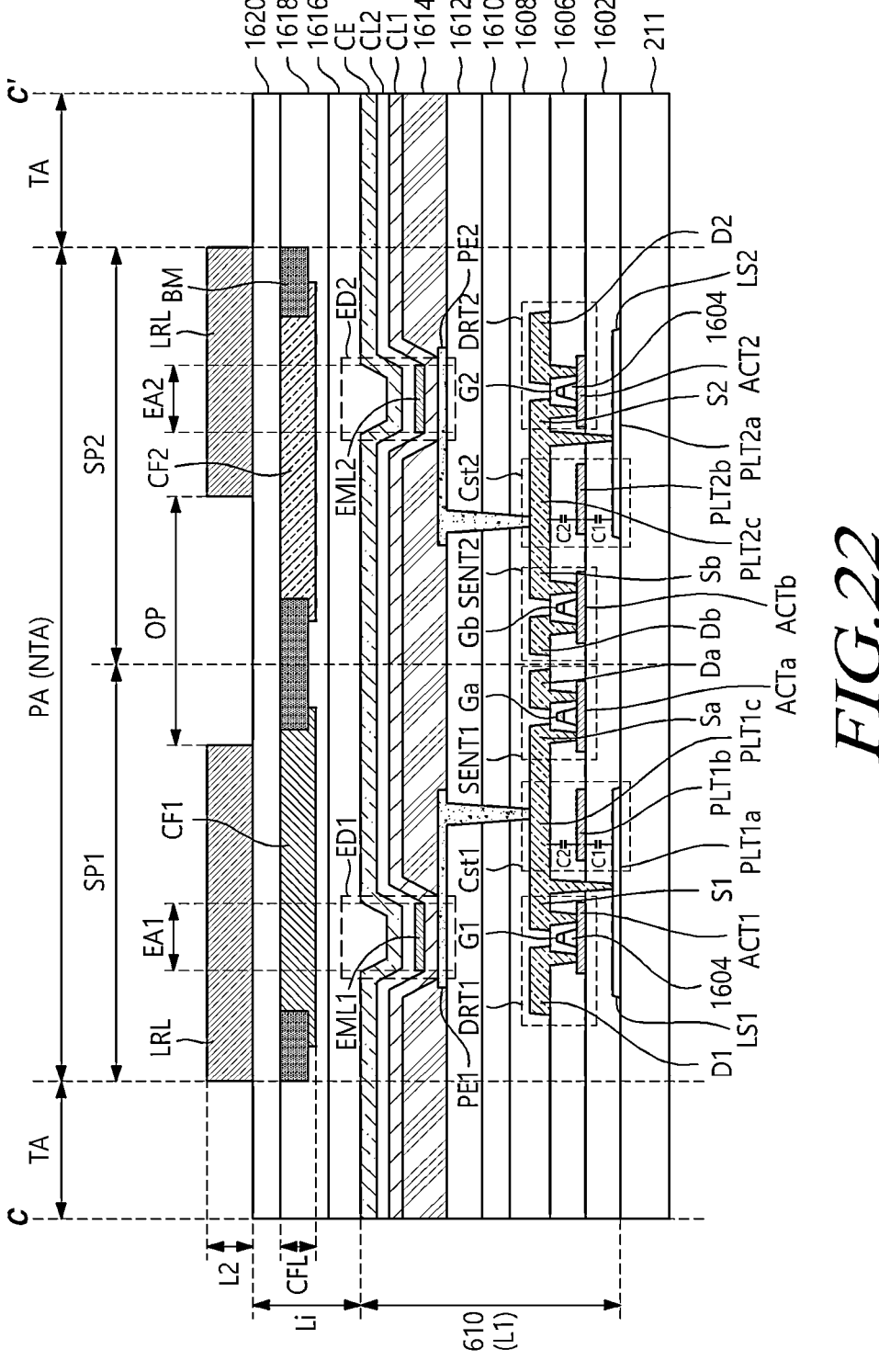
FIG. 22 is an example cross-sectional view taken along line C-C' of FIG. 21 according to embodiments of the present disclosure.

FIG. 20 is an example cross-sectional view of the display panel 210 in which a photoactive layer LRL having a plurality of openings OP as a plurality of code patterns CP is disposed in a non-transmissive area NTA according to embodiments of the present disclosure. FIG. 21 is an example plan view of the display panel 210 in which a photoactive layer LRL having a plurality of openings OP as a plurality of code patterns CP is disposed in a non-transmissive area NTA according to embodiments of the present disclosure. FIG. 22 is an example cross-sectional view taken along line C-C' of FIG. 21 according to embodiments of the present disclosure. Hereinafter, discussions are provided based on examples where light having the second wavelength is infrared light.

It should be noted here that in the following description, for convenience of description, discussions on the configurations of FIGS. 20, 21, and 22 are provided by focusing on different features between the cross-sectional view of FIG. 20 and the cross-sectional views of FIGS. 12 and 17, different features between the plan view of FIG. 21 and the plan views of FIGS. 15 and 18, and different features between the cross-sectional view of FIG. 22 and the cross-sectional views of FIGS. 16 and 19.

Referring to FIGS. 20 to 22, the photoactive layer LRL having the plurality of openings OP may be disposed in a code pattern layer L2.

Referring to FIGS. 20 to 22, the photoactive layer LRL may be disposed in a non-transmissive area NTA, but not be disposed in a transmissive area TA.

Referring to FIGS. 20 to 22, the openings OP of the photoactive layer LRL may be located in the non-transmissive area NTA, which is a pixel array area PA. The openings OP of the photoactive layer LRL may correspond to code patterns CP.

Referring to FIGS. 20 to 22, the openings OP of the photoactive layer LRL may overlap with one or more of light emitting areas (EA1, EA2, EA3, and EA4). For example, as shown in FIG. 20, an opening OP of the photoactive layer LRL may overlap with a light emitting area EA4 configured to emit white light. In another example, as shown in 22, an opening OP of the photoactive layer LRL may not overlap with the light emitting areas EA1 and EA2.

Referring to FIGS. 20 to 22, a part of light having the second wavelength incident on the display panel 210 after being output from the pen 110 may be absorbed by the photoactive layer LRL. Another part of the light having the second wavelength incident on the display panel 210 after being output from the pen 110 may pass through one or more openings OP and be reflected by the pixel array layer 610, which is a reflective layer L1, and then, the resulting redirected light may pass through the one or more openings OP and come from the display panel 210.

Referring to FIGS. 20 to 22, when light having the second wavelength output from the pen 110 is incident in the transmissive area TA of the display panel 210, the light having the second wavelength may be transmitted from the front to the back of the display panel 210 in the transmission area TA.

Referring to FIGS. 20 to 22, in an example where light having the second wavelength is infrared light, in the transmissive area TA, both visible light and infrared light may be transmitted from the front to the back of the display panel 210.

Referring to FIGS. 21, and 7, at least some of openings OP of a plurality of photoactive layers LRL shown in FIG. 21 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of openings OP of the plurality of photoactive layer LRL shown in FIG. 21 may correspond to code patterns (CP_CGL1, CP_CGL2) corresponding to first and second cell guide lines (CGL1, CGL2) around a data cell area D-CELL.

Figure 23:
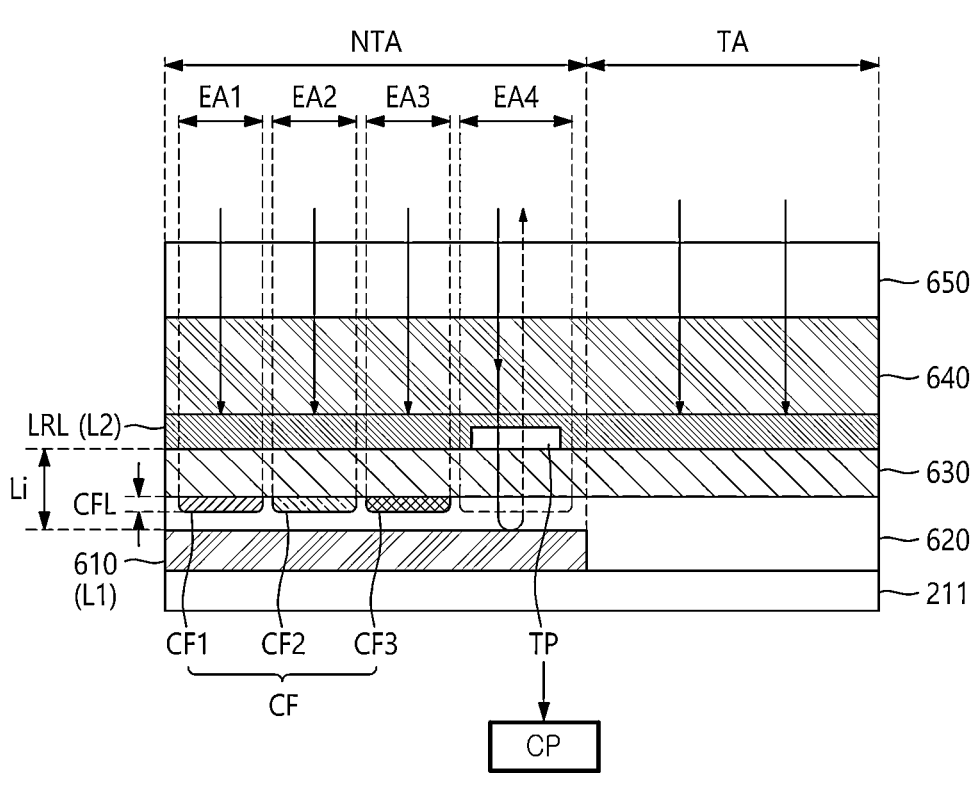
FIG. 23 is an example cross-sectional view of the display panel in which a plurality of transparent patterns as a plurality of code patterns and a photoactive layer covering the transparent patterns are disposed according to embodiments of the present disclosure.
Figure 24:
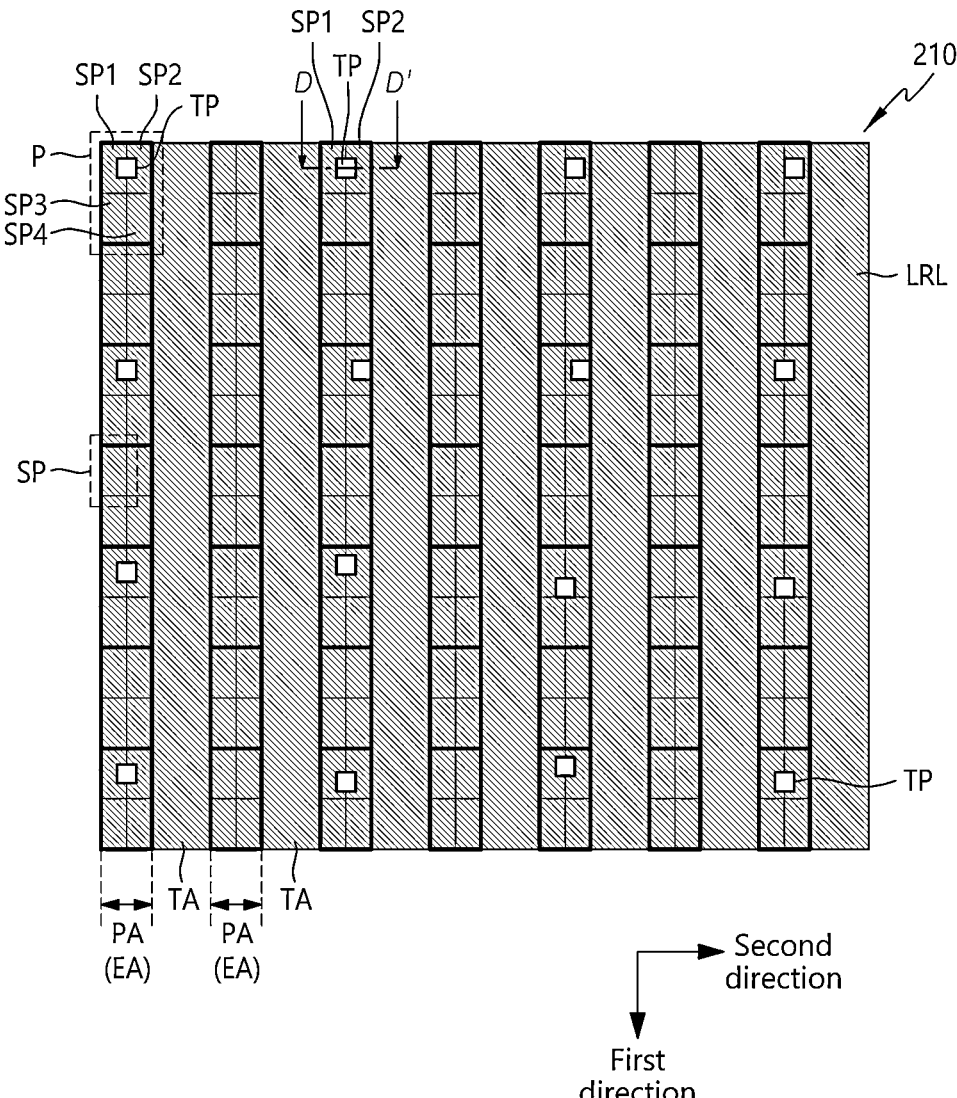
FIG. 24 is an example plan view of the display panel in which a plurality of transparent patterns as a plurality of code patterns and a photoactive layer covering the transparent patterns are disposed according to embodiments of the present disclosure.
Figure 25:
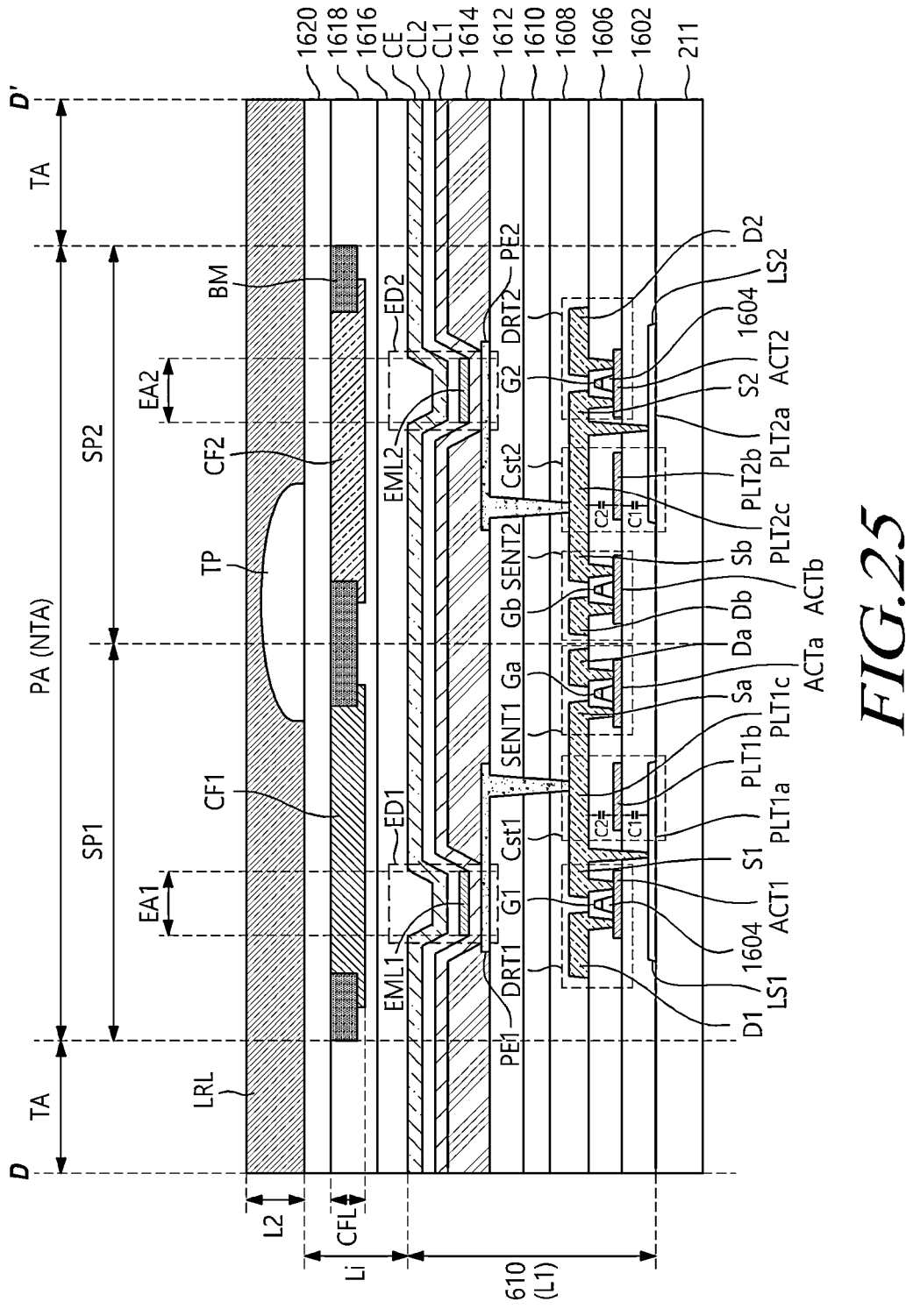
FIG. 25 is an example cross-sectional view taken along line D-D' of FIG. 24 according to embodiments of the present disclosure.

FIG. 23 is an example cross-sectional view of the display panel 210 in which a plurality of transparent patterns TP as a plurality of code patterns CP and a photoactive layer LRL covering the transparent patterns TP are disposed according to embodiments of the present disclosure. FIG. 24 is an example plan view of the display panel 210 in which a plurality of transparent patterns TP as a plurality of code patterns CP and a photoactive layer LRL covering the transparent patterns TP are disposed according to embodiments of the present disclosure. FIG. 25 is an example cross-sectional view taken along line D-D' of FIG. 24 according to embodiments of the present disclosure.

It should be noted here that in the following description, for convenience of description, discussions on the configurations of FIGS. 23, 24, and 25 are provided by focusing on different features between the cross-sectional view of FIG. 23 and the cross-sectional views of FIGS. 12 and 17, different features between the plan view of FIG. 24 and the plan views of FIGS. 15 and 18, and different features between the cross-sectional view of FIG. 25 and the cross-sectional views of FIGS. 16 and 19.

Referring to FIGS. 23 to 25, the plurality of transparent patterns TP and the photoactive layer LRL covering the transparent patterns TP may be disposed in a code pattern layer L2.

Referring to FIGS. 23 to 25, for example, the photoactive layer LRL may be disposed in an area including a non-transmissive area NTA and a transmissive area TA. In another example, the photoactive layer LRL may be disposed in a corresponding portion of the non-transmissive area NTA, but not be disposed in the transmissive area TA.

Referring to FIGS. 23 to 25, the plurality transparent patterns TP may be located in the non-transmissive area NTA, which is a pixel array area PA. The transparent patterns TP may be disposed at code points, and correspond to code patterns CP. As shown in FIGS. 23 to 25, a portion of the photoactive material that overlaps an upper surface of the transparent pattern TP is thinner than remaining portions of the photoactive material in the photoactive layer LRL.

Referring to FIGS. 23 to 25, the transparent patterns TP may overlap with one or more of light emitting areas EA. For example, as shown in FIG. 23, a transparent pattern TP may overlap with a light emitting area EA configured to emit white light. In another example, as shown in 25, a transparent pattern TP may not overlap with light emitting areas EA1 and EA2.

Referring to FIGS. 23 to 25, a part of light having the second wavelength incident on the display panel 210 after being output from the pen 110 may be absorbed by the photoactive layer LRL. Another part of the light having the second wavelength incident on the display panel 210 after being output from the pen 110 may pass through one or more transparent patterns TP and be reflected by the pixel array layer 610, which is a reflective layer L1. Thereby, the resulting redirected light may pass through the one or more transparent patterns TP and come from the display panel 210. That is, due to the pattern of the code points, the light that is redirected by the pixel array layer 610 and received by the pen 110 has a pattern that signifies the location of the pen 110.

Referring to FIGS. 23 to 25, in an example where light having the second wavelength is infrared light, in the transmissive area TA, visible light may be transmitted from the front to the back of the display panel 210. However, in the transmissive area TA, infrared light cannot be transmitted from the front to the back of the display panel 210, and thus, may be absorbed or radiated by the photoactive layer LRL.

In one or more embodiments, the display device 100 may include a first substrate 211, a pixel array layer 610 including a plurality of subpixels SP and a plurality of signal lines, and a code pattern layer L2 in which a photoactive material, which is responsive to light having the second wavelength incident from the outside, is disposed.

The pen 110 can output light having the second wavelength to the display device 100, receive some of light having the second wavelength reflected from an inside of the display device 100, and output sensing data obtained based on the received light to the display device 100.

For example, the photoactive material disposed in the code pattern layer L2 may be disposed only at a plurality of code points, not be disposed only at the plurality of code points, or be disposed such that the photoactive material disposed at the plurality of code points is thinner than the photoactive material disposed at points other than the plurality of code points.

The plurality of code points may be located in the non-transmissive area NTA.

The plurality of code points in the non-transmissive area NTA may correspond to a plurality of code patterns CP.

Referring to FIGS. 24, and 7, at least some of transparent patterns TP overlapping with the photoactive layer LRL shown in FIG. 24 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of the transparent patterns TP overlapping with the photoactive layer LRL shown in FIG. 24 may correspond to code patterns (CP_CGL1, CP_CGL2) corresponding to first and second cell guide lines (CGL1, CGL2) around a data cell area D-CELL.

Hereinafter, discussions are provided on an example where a light control structure for pen touch sensing is configured in the display panel 210 having the bottom emission structure.

Figure 26:
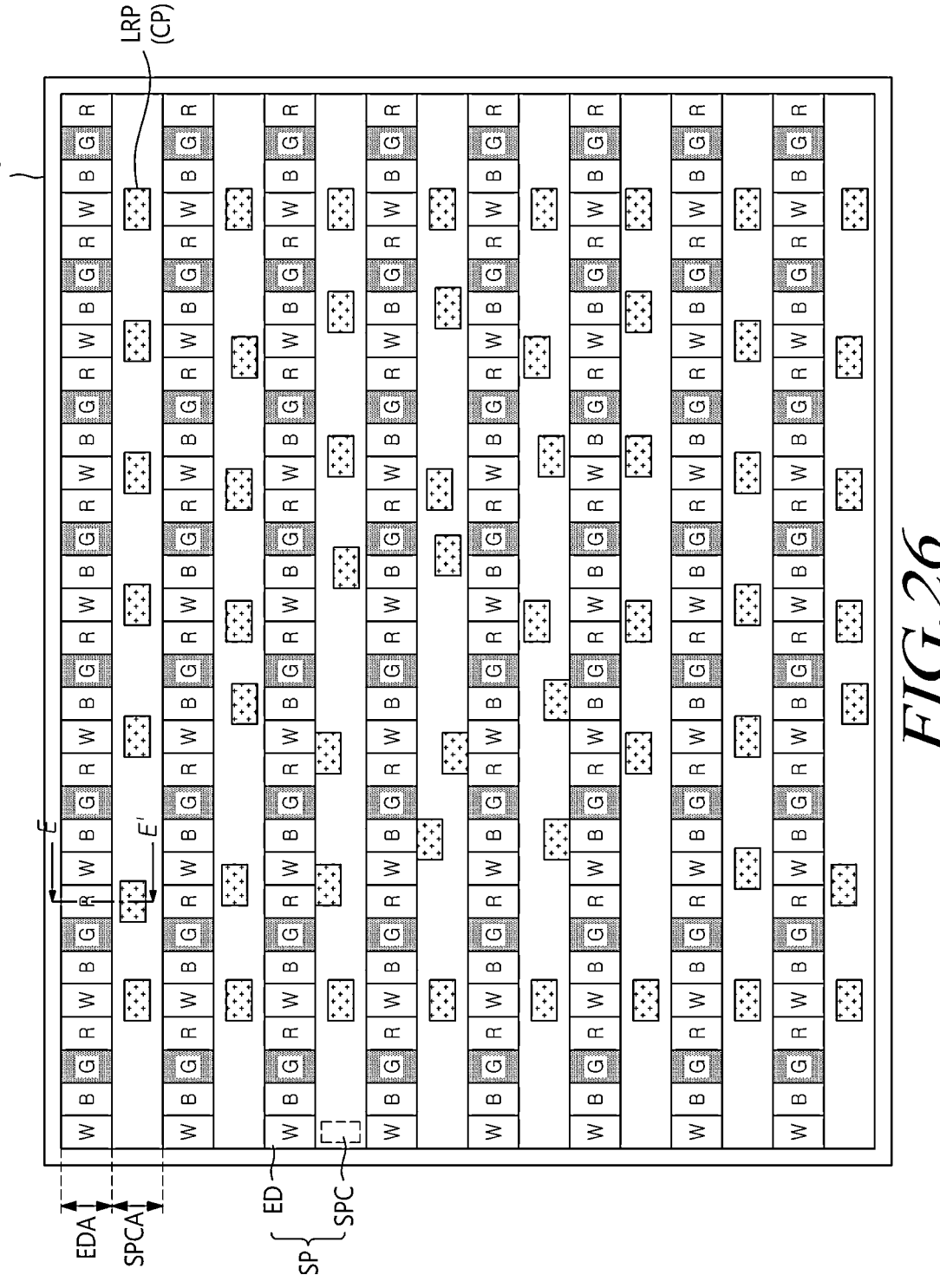
FIG. 26 is an example plan view of the display panel in which a plurality of photoactive patterns as a plurality of code patterns are disposed when the display panel has a bottom emission structure according to embodiments of the present disclosure.

FIG. 26 is an example plan view of the display panel 210 in which a plurality of photoactive patterns LRP as a plurality of code patterns CP are disposed when the display panel 210 has the bottom emission structure according to embodiments of the present disclosure.

Referring to FIG. 26, each of a plurality of subpixels SP may include a light emitting element ED and a subpixel circuit SPC for driving the light emitting element ED. In an example where the display panel 210 has the bottom emission structure, to increase the aperture ratio, a light emitting element ED and a subpixel circuit SPC included in one subpixel SP may be configured not to overlap with each other.

The display panel 210 having the bottom emission structure may include a light emitting element array area EDA and a subpixel circuit array area SPCA, which do not overlap with each other. Light emitting elements ED may be arranged in the light emitting element array area EDA, and subpixel circuits SPC may be arranged in the subpixel circuit array area SPCA.

Referring to FIG. 26, light emitting elements ED arranged in the light emitting element array area EDA may include one or more light emitting elements ED configured to emit red light R, one or more light emitting elements ED configured to emit white light W, one or more light emitting elements ED configured to emit blue light B, and one or more light emitting elements ED configured to emit green light G.

Referring to FIG. 26, the light emitting element array area EDA may include light emitting areas formed by light emitting elements ED, and the subpixel circuit array area SPCA may be a non-light emitting area.

Referring to FIG. 26, in one or more embodiments, the display panel 210 may include a plurality of photoactive patterns LRP as a plurality of code patterns CP for pen touch sensing. The plurality of photoactive patterns LRP may be disposed in the subpixel circuit array area SPCA, which is the non-light emitting area.

Referring to FIGS. 26, and 7, at least some of photoactive patterns LRP shown in FIG. 26 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of the photoactive patterns LRP shown in FIG. 26 may correspond to code patterns (CP_CGL1, CP_CGL2) corresponding to first and second cell guide lines (CGL1, CGL2) around a data cell area D-CELL.

Figure 27:
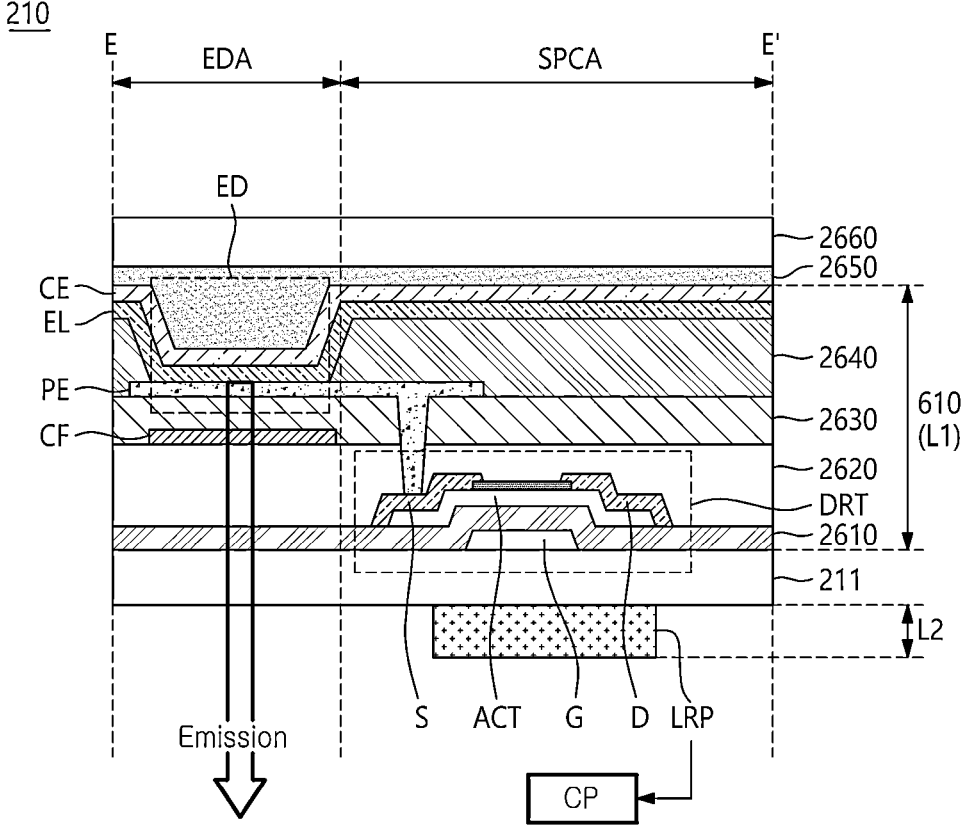
FIGS. 27 and 28 are example cross-sectional views taken along line E-E' of FIG. 26 according to embodiments of the present disclosure.
Figure 28:
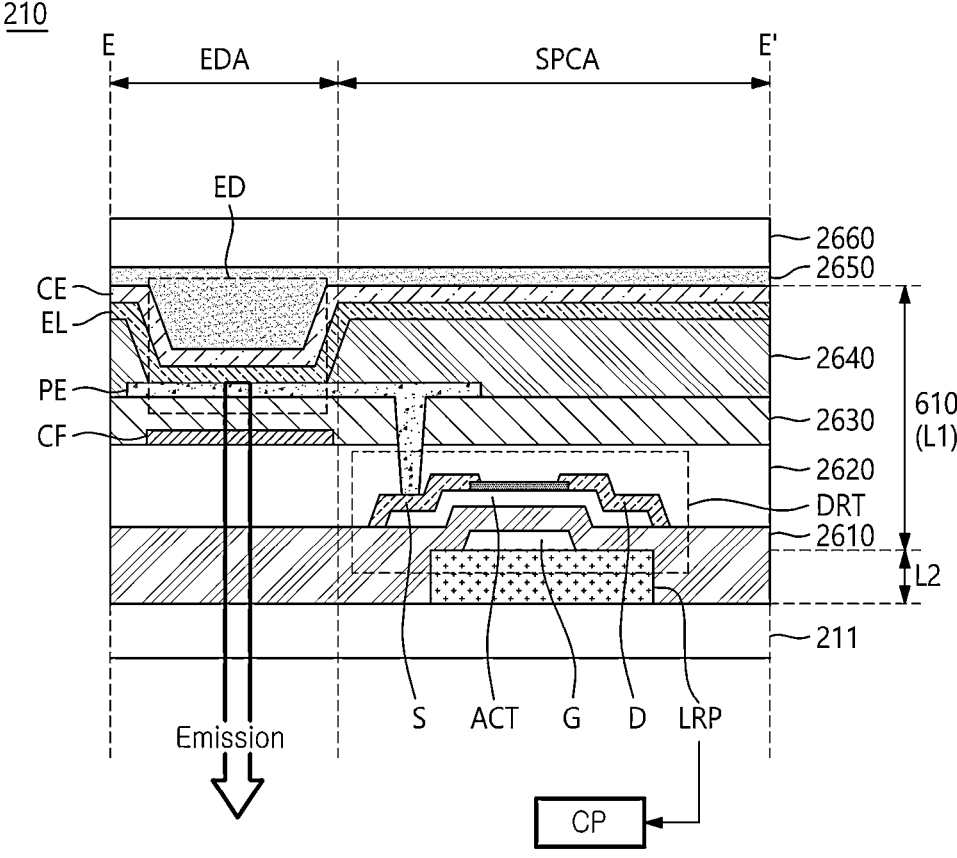

FIGS. 27 and 28 are example cross-sectional views taken along line E-E' of FIG. 26.

Referring to FIGS. 27 and 28, in one or more embodiments, the display panel 210 may include a light emitting element array area EDA and a subpixel circuit array area SPCA. A light emitting element ED may be disposed in the light emitting element array area EDA, and a subpixel circuit SPC may be disposed in the subpixel circuit array area SPCA.

FIGS. 27 and 28 are cross-sectional views of an area where the light emitting element ED and the subpixel circuit SPC included in one subpixel SP are disposed. For convenience of explanation, FIGS. 27 and 28 illustrate only a driving transistor DRT among two or more transistors (e.g., DRT, SCT) and one or more capacitors (e.g., Cst) included in an example subpixel circuit SPC.

Referring to FIGS. 27 and 28, the gate electrode G of the driving transistor DRT may be disposed on the first substrate 211, and a gate insulating layer 2610 may be disposed on the gate electrode G of the driving transistor DRT.

Referring to FIGS. 27 and 28, an active layer ACT may be disposed on the gate insulating layer 2610, and the source electrode S and drain electrode D of the driving transistor DRT may be disposed on the active layer ACT. The source electrode S of the driving transistor DRT may be connected to a first side of the active layer ACT, and the drain electrode D of the driving transistor DRT may be connected to a second opposing side of the active layer ACT.

Referring to FIGS. 27 and 28, a protective layer 2620 may be disposed on the driving transistor DRT, a color filter CF may be disposed on the protective layer 2620, and an overcoat layer 2630 may be configured to cover the color filter CF.

Referring to FIGS. 27 and 28, a pixel electrode PE may be disposed on the overcoat layer 2630. The pixel electrode PE may be electrically connected to the source electrode S of the driving transistor DRT through contact holes of the overcoat layer 2630 and the protective layer 2620. At least a portion of the pixel electrode PE may overlap with the color filter CF.

Referring to FIGS. 27 and 28, a bank 2640 may be disposed on the pixel electrode PE, and the bank 2640 may include an opening having a size corresponding to an area where the light emitting element ED is formed. A portion of the pixel electrode PE may be exposed through the opening of the bank 2640.

Referring to FIGS. 27 and 28, an element intermediate layer EL including an emission layer may be disposed on the bank 2640. The element intermediate layer EL may contact the pixel electrode PE in the opening of the bank 2640. A common electrode CE may be disposed on the element intermediate layer EL. At the opening of the bank 2640, the light emitting element ED may be configured with the pixel electrode PE, the element intermediate layer EL, and the common electrode CE.

Referring to FIGS. 27 and 28, an adhesive layer 2650 may be disposed on the common electrode CE, and a metal layer 2660 may be disposed on the adhesive layer 2650. The adhesive layer 2650 and the metal layer 2660 may serve as an encapsulation layer or an encapsulation substrate.

Referring to FIGS. 27 and 28, the display panel 210 may include a reflective layer L1 and a code pattern layer L2 for pen touch sensing.

Referring to FIGS. 27 and 28, a vertical area between the first substrate 211 and the adhesive layer 2650 may be referred to as a pixel array layer 610. Since the pixel array layer 610 includes various metals, the pixel array layer 610 can serve as the reflective layer L1 for pen touch sensing.

Referring to FIGS. 27 and 28, in an example where the display panel 210 has the bottom emission structure, light having the second wavelength emitted from the pen 110 may be incident on the first substrate 211.

Referring to FIGS. 27 and 28, the code pattern layer L2 may include photoactive patterns LRP including a photoactive material capable of absorbing light having the second wavelength or radiating light having one or more wavelengths different from the second wavelength, and the photoactive patterns LRP may be disposed at code points in the subpixel circuit array area SPCA, which is the non-light emitting area. The photoactive patterns LRP may correspond to code patterns CP for pen touch sensing.

As shown in FIG. 27, the code pattern layer L2 may be located under the first substrate 211. Thus, the photoactive patterns LRP may be disposed under the first substrate 211.

As shown in FIG. 28, the code pattern layer L2 may be located on the first substrate 211. Thus, the photoactive patterns LRP may be disposed on the first substrate 211.

The photoactive material may be disposed outside of the pixel array layer 610, and absorb light having the second wavelength or radiate light having one or more wavelengths different from the second wavelength. The color filter CF may be disposed in the pixel array layer 610 and transmit light having the second wavelength.

Among a first electrode (e.g., the pixel electrode PE) and a second electrode (e.g., the common electrode CE) included in the light emitting element ED, the first electrode (e.g., the pixel electrode PE) close to the first substrate 211 may be a transparent electrode, and the second electrode (e.g., the common electrode CE) away from the first substrate 211 may be a reflective electrode.

The color filter CF may be disposed between the first electrode (e.g., the pixel electrode PE) and the first substrate 211, and light emitted from the light emitting element ED may have one or more wavelengths (e.g., one or more visible light wavelengths) different from the second wavelength (e.g., one or more infrared wavelengths).

As described above, a plurality of code patterns CP for pen touch sensing may be formed with a plurality of photoactive patterns LRP. In one or more aspects, a plurality of code patterns CP for pen touch sensing may be formed with a plurality of openings OP formed in a photoactive layer LRL. This will be described in more detail below.

Figure 29:
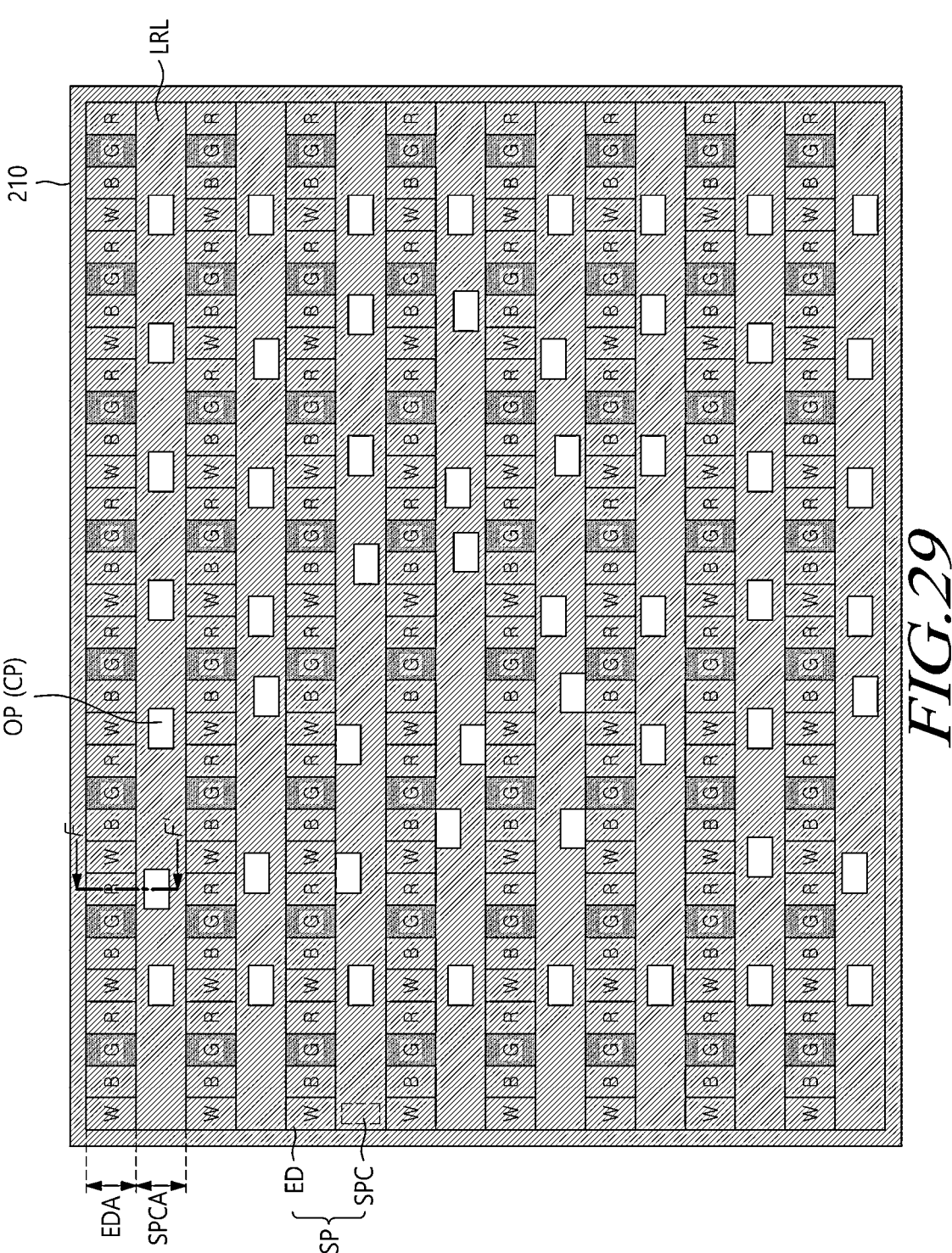
FIG. 29 is an example plan view of the display panel in which a photoactive layer having a plurality of openings as a plurality of code patterns is disposed when the display panel has the bottom emission structure according to embodiments of the present disclosure.
Figure 30:
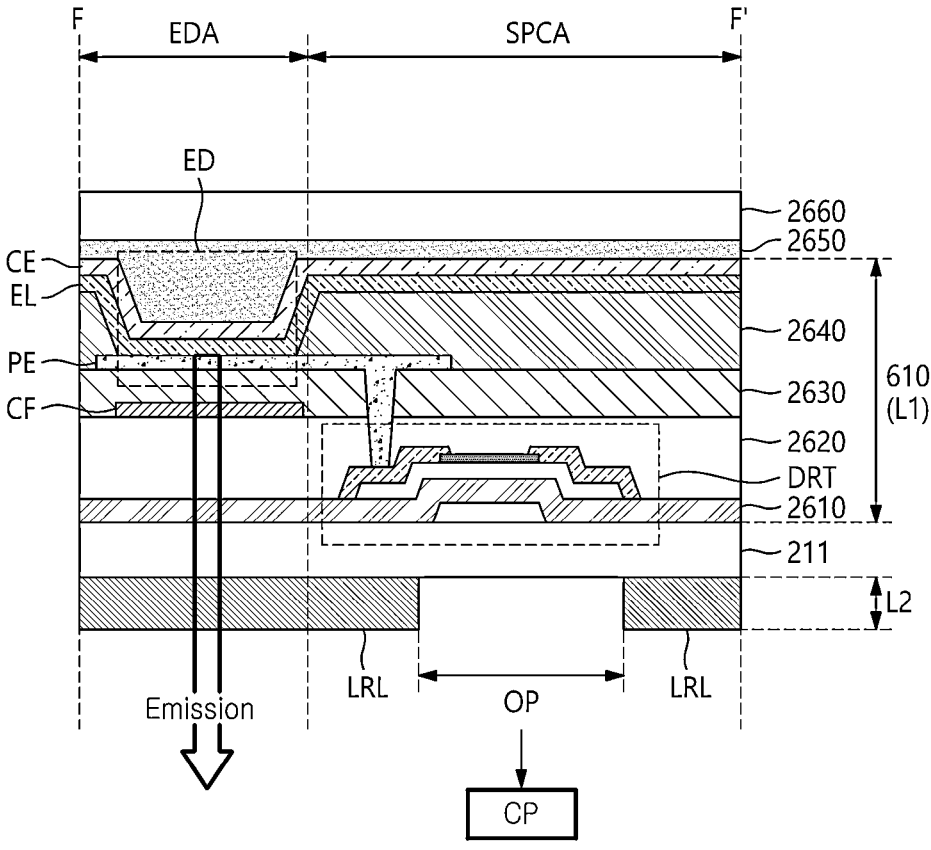
FIGS. 30 and 31 are example cross-sectional views taken along line F-F' of FIG. 29 according to embodiments of the present disclosure.
Figure 31:
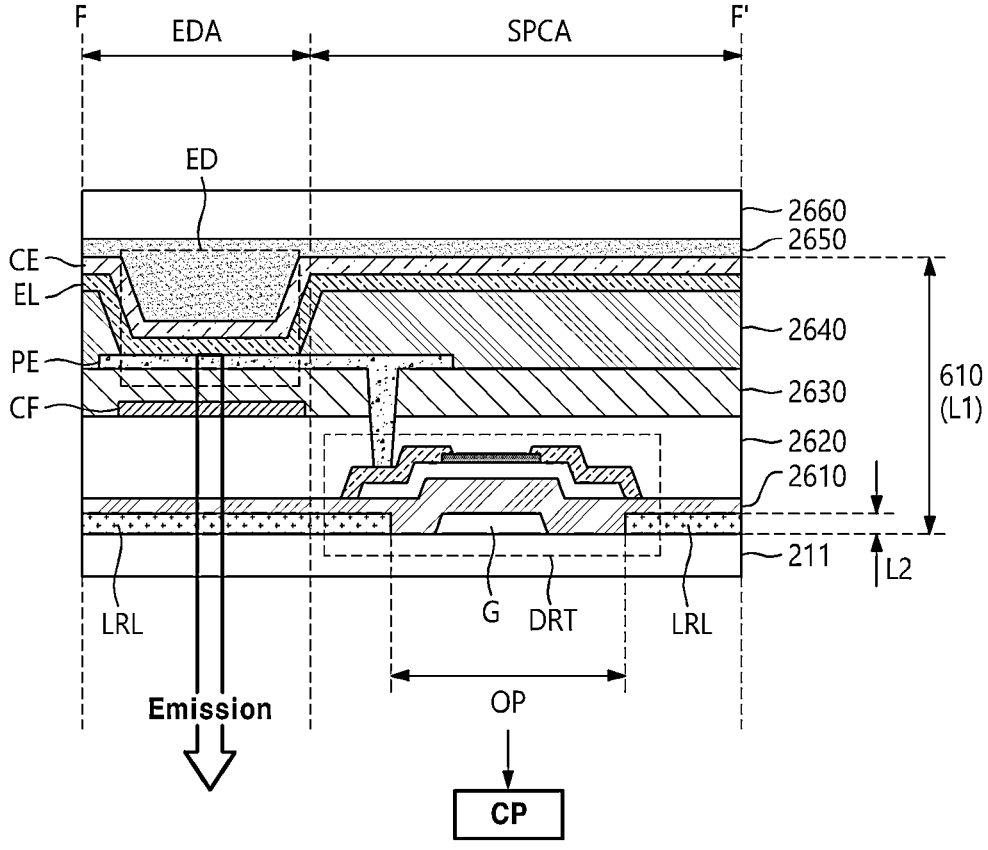

FIG. 29 is an example plan view of the display panel 210 in which a photoactive layer LRL having a plurality of openings OP as a plurality of code patterns CP is disposed when the display panel 210 has the bottom emission structure according to aspects of the present disclosure. FIGS. 30 and 31 are example cross-sectional views taken along line F-F' of FIG. 29. For convenience of description, discussions on the configurations of FIGS. 29, 30 and 31 are provided by focusing on features different from the configurations of FIGS. 26, 27 and 28.

Referring to FIG. 29, in one or more aspects, the display panel 210 may include a photoactive layer LRL having a plurality of openings OP as a plurality of code patterns CP for pen touch sensing.

The photoactive layer LRL may be disposed in both one or more light emitting element array areas EDA including light emitting areas, and one or more subpixel circuit array areas SPCA, which are non-light emitting areas. It should be noted that the plurality of openings OP may be located in the one or more subpixel circuit array areas SPCA, which are the non-light emitting areas.

Referring to FIGS. 30 and 31, in one or more embodiments, the display panel 210 may include a light emitting element array area EDA and a subpixel circuit array area SPCA. A light emitting element ED may be disposed in the light emitting element array area EDA, and a subpixel circuit SPC may be disposed in the subpixel circuit array area SPCA.

FIGS. 30 and 31 are cross-sectional views of an area where the light emitting element ED and the subpixel circuit SPC included in one subpixel SP among a plurality of subpixels SP are disposed. For convenience of explanation, FIGS. 27 and 28 illustrate only a driving transistor DRT among two or more transistors (e.g., DRT, SCT) and one or more capacitors (e.g., Cst) included in one subpixel circuit SPC.

Referring to FIGS. 30 and 31, the display panel 210 may include a reflective layer L1 and a code pattern layer L2 for pen touch sensing.

Referring to FIGS. 30 and 31, a vertical area between a first substrate 211 and an adhesive layer 2650 may be referred to as a pixel array layer 610. Since the pixel array layer 610 includes various metals, the pixel array layer 610 can serve as the reflective layer L1 for pen touch sensing.

Referring to FIGS. 30 and 31, in an example where the display panel 210 has the bottom emission structure, light having the second wavelength emitted from the pen 110 may be incident on the first substrate 211.

Referring to FIGS. 30 and 31, the code pattern layer L2 may include the photoactive layer LRL including a photoactive material capable of absorbing light having the second wavelength or radiating light having one or more wavelengths different from the second wavelength.

The photoactive layer LRL may be disposed in both the light emitting element array area EDA including light emitting areas, and the subpixel circuit array area SPCA, which are the non-light emitting areas.

The photoactive layer LRL may have a plurality of openings OP located at a plurality of code points in the subpixel circuit array area SPCA, which is the non-light emitting area. The plurality of openings OP may correspond to code patterns CP for pen touch sensing.

As shown in FIG. 30, the code pattern layer L2 may be located under the first substrate 211. Thus, the photoactive layer LRL having the plurality of openings OP may be disposed under the first substrate 211.

As shown in FIG. 31, the code pattern layer L2 may be located on the first substrate 211. Thus, the photoactive layer LRL having the plurality of openings OP may be disposed on the first substrate 211.

Referring to FIG. 31, for example, the code pattern layer L2 may be included in the pixel array layer 610. The photoactive layer LRL having the plurality of openings OP may be disposed on at least one side of a corresponding gate electrode G of at least one of transistors including a driving transistor DRT.

The photoactive material included in the photoactive layer LRL may be disposed inside or outside of the pixel array layer 610, and absorb light having the second wavelength or radiate light having one or more wavelengths different from the second wavelength. A color filter CF may be disposed in the pixel array layer 610, and transmit light having the second wavelength.

The photoactive material included in the photoactive layer LRL may transmit light emitted from the light emitting element ED. The photoactive material included in the photoactive layer LRL may transmit light passing through the color filter CF after being emitted from the light emitting element ED. According to these configurations, even when the photoactive layer LRL overlaps with the light emitting element ED, image display can be normally performed without the reduction of light emission performance.

Referring to FIGS. 29, and 7, at least some of openings OP of the photoactive layer LRL shown in FIG. 29 may correspond to code patterns CP_CELL disposed in two or more data cell areas D-CELL, correspond to code patterns CP_CELL disposed in one data cell area D-CELL, or correspond to code patterns CP_CELL disposed in a portion of one data cell area D-CELL.

In addition, some of the openings OP of the photoactive layer LRL shown in FIG. 29 may correspond to code patterns (CP_CGL1, CP_CGL2) corresponding to first and second cell guide lines (CGL1, CGL2) around a data cell area D-CELL.

The example embodiments described herein can be briefly discussed as follows.

According to the example embodiments described herein, a display device can be provided that includes a display panel configured to display an image, and including a first substrate including a transmissive area allowing light having a first wavelength to be transmitted and a non-transmissive area different from the transmissive area, a pixel array layer disposed on the first substrate, and including a plurality of subpixels and a plurality of signal lines disposed in the non-transmissive area, and a code pattern layer in which a photoactive material responsive to light having a second wavelength different from the first wavelength is disposed, the light having the second wavelength being incident from outside of the display device.

For example, the photoactive material may be disposed only at the plurality of code points, disposed at points other than the plurality of code points, or disposed such that the photoactive material disposed at the plurality of code points is thinner than the photoactive material disposed at the points other than the plurality of code points.

In one or more aspects, the plurality of code points may be located in the non-transmissive area.

In one or more aspects, the light having the second wavelength may be reflected from the pixel array layer.

For example, the code pattern layer may include the photoactive material, and include a plurality of photoactive patterns spaced apart from each other.

In one or more aspects, the plurality of photoactive patterns may be disposed at the plurality of code points in the non-transmissive area, and correspond to the plurality of code patterns, respectively.

In one or more aspects, light may pass through a space between the plurality of photoactive patterns.

In one or more aspects, each of the plurality of photoactive patterns may absorb the light having the second wavelength, or convert the light having the second wavelength to light having one or more other wavelengths, and radiate the light having the one or more other wavelengths.

In another example, the code pattern layer may include a photoactive layer including the photoactive material. In one or more aspects, the photoactive layer may include a plurality of openings spaced apart from each other. The plurality of openings may be disposed at the plurality of code points in the non-transmissive area, and correspond to the plurality of code patterns, respectively.

In one or more aspects, the light having the second wavelength may pass through the plurality of openings, and the photoactive layer may absorb the light having the second wavelength, or convert the light having the second wavelength to light having one or more other wavelengths and radiate the light having the one or more other wavelengths.

In another example, the code pattern layer may include a plurality of transparent patterns spaced apart from each other, include the photoactive material, and include a photoactive layer covering the plurality of transparent patterns.

In one or more aspects, the plurality of transparent patterns may be disposed at the plurality of code points in the non-transmissive area, and correspond to the plurality of code patterns, respectively.

In one or more aspects, the light having the second wavelength may pass through the plurality of transparent patterns. A portion of the photoactive layer overlapping with the plurality of transparent patterns may be thinner than a portion of the photoactive layer overlapping not overlapping with the plurality of transparent patterns.

In one or more aspects, the photoactive layer may absorb the light having the second wavelength, or convert the light having the second wavelength to light having one or more other wavelengths and radiate the light having the one or more other wavelengths.

In one or more aspects, the first wavelength may be included in a visible light wavelength band. In one or more aspects, the second wavelength may be a wavelength not being included in the visible light wavelength band. For example, the second wavelength may be included in an infrared wavelength band.

In one or more aspects, the display panel may further include a plurality of color filters located between the pixel array layer and the code pattern layer and disposed in the non-transmissive area, In one or more aspects, the plurality of color filters may include a material capable of transmitting the light having the second wavelength.

In one or more aspects, the display panel may further include a plurality of color filters located in the pixel array layer. In one or more aspects, the plurality of color filters may allow the light having the second wavelength to be transmitted.

In one or more aspects, at a point of the code pattern layer at which the photoactive material is located, the light having the second wavelength incident on the display panel may be absorbed by the photoactive material, or converted to light having one or more other wavelengths by the photoactive material, and radiated in the form of light having the one or more other wavelengths.

In one or more aspects, at a point of the code pattern layer where the photoactive material is not present, the light having the second wavelength incident on the display panel may pass through the code pattern layer without being responded by the photoactive material in the code pattern layer and be reflected by the pixel array layer, thereby, the reflected light coming from the display panel.

For example, each of the plurality of subpixels may include a light emitting element and a subpixel circuit, and at least a portion of the subpixel circuit may overlap with the light emitting element. In this example, among first and second electrodes included in the light emitting element, the first electrode close to the first substrate may be a reflective electrode, and the second electrode away from the first substrate may be a transparent electrode.

In this implementation, the code pattern layer may be located in the pixel array layer. For example, the code pattern layer may be located on or over at least one transistor and the light emitting element.

In one or more aspects, the photoactive material may have the property of transmitting the light having the first wavelength emitted from the light emitting element.

In one or more aspects, the display panel may further include an encapsulation layer located on the pixel array layer, and the code pattern layer may be located on the encapsulation layer or between the pixel array layer and the encapsulation layer.

In another example, each of a plurality of subpixels included in the display panel may include a light emitting element and a subpixel circuit, and the subpixel circuit may not overlap with the light emitting element. In this example, among first and second electrodes included in the light emitting element, the first electrode close to the first substrate may be a transparent electrode, and the second electrode away from the first substrate may be a reflective electrode.

In this implementation, the code pattern layer may be located in or under the pixel array layer. For example, the code pattern layer may be located under at least one transistor and the light emitting element.

In one or more aspects, at least one or more of the plurality of code points in the non-transmissive area may overlap with one or more of light emitting areas in the non-transmissive area. In one or more aspects, at least one or more of the plurality of code points in the non-transmissive area may overlap with a non-light emitting area in the non-transmissive area.

In one or more aspects, the plurality of code points in the non-transmissive area may correspond to a plurality of code patterns for pen touch sensing.

For example, at least one or more of the plurality of code patterns may overlap with one or more of light emitting areas in the non-transmissive area. In another example, at least one or more of the plurality of code pattern may overlap with a non-light emitting area in the non-transmissive area.

In one or more aspects, the display device may further include a communication module configured to receive sensing data from a pen, and a controller configured to control an image corresponding to the sensing data or an application screen corresponding to coordinate data to be displayed on the display panel.

According to the example embodiments described herein, a pen touch system can be provided that includes a display device, and a pen. In one or more aspects, the display device may include a first substrate including a transmissive area allowing light having a first wavelength to be transmitted and a non-transmissive area different from the transmissive area, a pixel array layer including a plurality of subpixels and a plurality of signal lines, and a code pattern layer in which a photoactive material responsive to light having a second wavelength different from the first wavelength is disposed, the light having the second wavelength being incident from outside of the display device. In one or more aspects, after outputting light having the second wavelength to the display device, the pen can receive the light having the second wavelength or light having one or more wavelengths different from the second wavelength redirected by the display device, and output sensing data to the display device.

In one or more aspects, the photoactive material may be disposed only at the plurality of code points, disposed at points other than the plurality of code points, or disposed such that the photoactive material disposed at the plurality of code points is thinner than the photoactive material disposed at the points other than the plurality of code points.

In one or more aspects, the plurality of code points may be located in the non-transmissive area.

In one or more aspects, the code pattern layer may include a photoactive layer including the photoactive material. In one or more aspects, the photoactive layer may be located in a non-light emitting area, and include a plurality of openings spaced apart from each other.

In one or more aspects, the transmissive area may allow not only the light having the second wavelength but also the light having the first wavelength to be transmitted.

In one or more aspects, the code pattern layer may include a plurality of data cell areas arranged in rows and columns, a plurality of first cell guide lines disposed between adjacent data cell areas in the row direction, and a plurality of second cell guide lines disposed between adjacent data cell areas in the column direction.

In one or more aspects, a plurality of code patterns corresponding to the plurality of code points may include a plurality of first guide code patterns for representing of the plurality of first cell guide lines, respectively, a plurality of second guide code patterns for representing the plurality of second cell guide lines, respectively, and a plurality of data code patterns disposed in the plurality of data cell areas, respectively, and arranged in rows and columns.

In one or more aspects, a pattern in which the plurality of data code patterns are arranged may be different for each data cell area. In one or more aspects, the plurality of data code patterns respectively included in the plurality of data cell areas may be an encrypted pattern representing a unique coordinate pair, and have unique disposition location patterns corresponding to unique coordinates.

According to the aspects described herein, a display device and a pen touch system may be provided that are capable of more accurately sensing a pen touch based on an optical technique.

According to the aspects described herein, a transparent display device and a pen touch system may be provided that are capable of sensing a pen touch based on an optical technique.

According to the aspects described herein, a transparent display device and a pen touch system may be provided that are capable of sensing a pen touch based on an optical technique without deteriorating transparency, as code patterns for pen touch sensing based on the optical technique are disposed in a non-transmissive area.

According to the aspects described herein, a display device and a pen touch system may be provided that include a display panel in which a light control structure capable of allowing a pen to sense a touch is integrated.

According to the aspects described herein, a display device and a pen touch system may be provided that include a display panel in which a light control structure configured not to affect light emitting performance for image display is integrated.

According to the aspects described herein, a display device and a pen touch system may be provided that include a display panel in which as a light control structure configured to enable pen touch sensing, a reflection structure and an absorption structure (or a radiation structure) are integrated.

According to the aspects described herein, a display device and a pen touch system may be provided that include a display panel in which a pixel array layer used as a reflection structure is disposed, thereby, enabling pen touch sensing.

According to the aspects described herein, a display device and a pen touch system may be provided that include a display panel in which a light control structure configured to allow a pen to sense a touch is integrated, and thereby, provide advantages of reducing the thickness of the display device and helping to simplify the assembly process of the display device. Thus, the aspects described herein can help to reduce the weight and optimize the process of the display device.

According to the aspects described herein, a display device and a pen touch system may be provided that include a display panel including a pixel array layer and having a reflection structure for pen touch sensing using the pixel array layer, and thereby, provide advantages of further helping to reduce the weight of the display device.

The example embodiments of the present disclosure described above have been described for illustrative purposes; those skilled in the art will appreciate that various modifications, additions and substitutions are possible, without departing from the scope and spirit of the invention as disclosed in the accompanying claims. Although the example embodiments have been described for illustrative purposes, a person skilled in the art will appreciate that various modifications and applications are possible without departing from the essential characteristics of the present disclosure. For example, the specific components of the exemplary embodiments may be variously modified.

The above description and the accompanying drawings provide an example of the technical idea of the present invention for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims.

The scope of protection of the present disclosure is to be construed according to the claims, and all technical ideas within the scope of the claims should be interpreted as being included in the scope of the present invention.

What is claimed is:

1. A display device comprising:
   a display panel configured to display an image, the display panel comprising:
      a first substrate comprising a transmissive area that allows light having a first wavelength to transmit through the transmissive area from a back surface of the display panel to a front surface of the display panel and a non-transmissive area that is different from the transmissive area;
      a pixel array layer in the non-transmissive area, the pixel array layer comprising a plurality of subpixels and a plurality of signal lines; and
      a code pattern layer including a plurality of code points in the non-transmissive area but not the transmissive area and a photoactive material that is responsive to light having a second wavelength that is different from the first wavelength,
      wherein the light having the second wavelength is incident on the display device from outside of the display device.

2. The display device of claim 1, wherein the light having the second wavelength is reflected from the pixel array layer.

3. The display device of claim 1, wherein the photoactive material is located at the plurality of code points, and
   wherein the photoactive material comprises a plurality of photoactive patterns that are spaced apart from each other, and each of the plurality of photoactive patterns is located at a corresponding code point from the plurality of code points.

4. The display device of claim 3, wherein the light having the second wavelength passes through a space between the plurality of photoactive patterns, and each of the plurality of photoactive patterns absorbs the light having the second wavelength or converts the light having the second wavelength to light having another wavelength and radiates the light having the other wavelength.

5. The display device of claim 3, wherein the photoactive material is located at remaining locations of the code pattern layer that exclude the plurality of code points, and
   wherein the photoactive layer comprises a plurality of openings, and the plurality of openings are at the plurality of code points in the non-transmissive area.

6. The display device of claim 5, wherein the light having the second wavelength passes through the plurality of openings and the photoactive material absorbs the light having the second wavelength or converts the light having the second wavelength to light having another wavelength and radiates the light having the other wavelength.

7. The display device of claim 1, wherein a portion of the photoactive material that is at the plurality of code points is thinner than remaining portions of the photoactive material at other locations of the code pattern layer, and
   wherein the code pattern layer comprises a plurality of transparent patterns that are spaced apart from each other and located at the plurality of code points in the non-transmissive area, and the portion of the photoactive material that is thinner than the remaining portions of the photoactive material are over an upper surface of the plurality of transparent patterns.

8. The display device of claim 7, wherein the light having the second wavelength passes through the plurality of transparent patterns and the photoactive material absorbs the light having the second wavelength or converts the light having the second wavelength to light having another wavelength and radiates the light having the other wavelength.

9. The display device of claim 1, further comprising:
a plurality of color filters between the pixel array layer and the code pattern layer in the non-transmissive area,
wherein the plurality of color filters comprises a material that transmits the light having the second wavelength.

10. The display device of claim 1, further comprising:
a plurality of color filters in the pixel array layer,
wherein the plurality of color filters allow the light having the second wavelength to be transmitted through the plurality of color filters.

11. The display device of claim 1, wherein at a first point of the code pattern layer at which the photoactive material is located, the light having the second wavelength incident on the display panel is absorbed by the photoactive material or is converted to light having another wavelength by the photoactive material and the light having the other wavelength is radiated, and
wherein at a second point of the code pattern layer that lacks the photoactive material, the light having the second wavelength incident on the display panel passes through the code pattern layer and is reflected by the pixel array layer.

12. The display device of claim 1, wherein the code pattern layer is on the pixel array layer, and the photoactive material transmits the light having the first wavelength emitted from a light emitting element included in each of the plurality of subpixels, and
further comprising:
an encapsulation layer on the pixel array layer,
wherein the code pattern layer is on the encapsulation layer or between the pixel array layer and the encapsulation layer.

13. The display device of claim 11, wherein the code pattern layer is inside the pixel array layer or under the pixel array layer.

14. The display device of claim 1, wherein at least one or more of the plurality of code points in the non-transmissive area overlaps with one or more of light emitting areas in the non-transmissive area, or
wherein at least one or more of the plurality of code points in the non-transmissive area overlaps with a non-light emitting area in the non-transmissive area.

15. A pen touch system comprising:
the display device of claim 1;
a pen configured to output the light having the second wavelength to the display device, receive the light having the second wavelength or light having another wavelength that is different from the second wavelength and redirected by the display device, and output sensing data to the display device based on the received light.

16. A pen touching system, comprising:
a display panel comprising a pixel array layer including a plurality of subpixels that emit light having a first wavelength and a code pattern layer that overlaps the pixel array layer, the code pattern layer including a photoactive material that is responsive to light having a second wavelength that is different from the first wavelength and a plurality of data cell areas that each include a different pattern of code points; and
a pen configured to output the light having the second wavelength to the display panel and sense its location according to a pattern of light received from the display panel, the pattern of light received responsive to the light outputted by the pen interacting with the code pattern layer,
wherein the display panel includes a transmissive area allowing light having a first wavelength to transmit through the transmissive area from a back surface of the display panel to a front surface of the display panel, and a non-transmissive area different from the transmissive area, the code pattern layer including a different pattern of code points in the non-transmissive area but not in the transmissive area.

17. The pen touching system of claim 16, wherein the photoactive material comprises a plurality of photoactive patterns that are spaced apart from each other, and each of the plurality of photoactive patterns is located at a corresponding code point from the different pattern of code points of each of the plurality of data cell areas, and
wherein the light output by the pen passes through a space between the plurality of photoactive patterns and is reflected back to the pen by the pixel array layer as the pattern of light, and each of the plurality of photoactive patterns absorbs the light having the second wavelength.

18. The pen touching system of claim 16, wherein the photoactive material comprises a plurality of openings and each of the plurality of openings is located at a corresponding code point from the different pattern of code points of each of the plurality of data cell areas, and the photoactive material is located at remaining locations of the code pattern layer that exclude the different pattern of code points,
wherein the light output by the pen passes through the plurality of openings and is reflected back to the pen by the pixel array layer as the pattern of light, and the photoactive material absorbs the light having the second wavelength.

19. The pen touching system of claim 16, wherein the code pattern layer comprises a plurality of transparent patterns that are spaced apart from each other and located at the different pattern of code points of each of the plurality of data cell areas, and the photoactive material is over upper surfaces of the plurality of transparent patterns such that portions of the photoactive material that are over the upper surfaces of the plurality of transparent patterns are thinner than remaining portions of the photoactive material,
wherein the light output by the pen passes through the plurality of transparent patterns and the portions of the photoactive material that are over the upper surfaces of the plurality of transparent patterns and is reflected to the pen as the pattern of light and the remaining portions of photoactive material absorb the light output by the pen.

20. The pen touching system of claim 16, wherein the plurality of data cell areas are arranged in rows and columns and the code pattern layer further comprises:
a plurality of first cell guide lines, each first cell guide line between adjacent data cell areas from the plurality of data cell areas in a row direction; and
a plurality of second cell guide lines, each second cell guide line between adjacent data cell areas from the plurality of data cell areas in a column direction,

wherein the different pattern of code points for at least one of the plurality of data cell areas include:

a plurality of first guide code patterns along the plurality of first cell guide lines;

a plurality of second guide code patterns along the plurality of second cell guide lines; and a plurality of data code patterns in the data cell area and arranged in rows and columns, wherein an arrangement of the plurality of data code patterns in the data cell area is unique to the data cell area from the plurality of data cell areas and corresponds to coordinates of the data cell area.

* * * * *